United States Patent [19]

Abe et al.

[11] Patent Number: 4,833,531
[45] Date of Patent: May 23, 1989

[54] TECHNIQUE FOR INTERPOLATING A COLOR IMAGE FOR IMAGE ENLARGEMENT OR REDUCTION BASED ON LOOK-UP TABLES STORED IN MEMORY

[75] Inventors: Yoshinori Abe; Masahiko Matsunawa, both of Hino, Japan

[73] Assignee: Konishiroku Photo Industry Co., Ltd., Tokyo, Japan

[21] Appl. No.: 39,678

[22] Filed: Apr. 16, 1987

[30] Foreign Application Priority Data

| Apr. 21, 1986 | [JP] | Japan | 61-91951 |
| Apr. 21, 1986 | [JP] | Japan | 61-91952 |
| Apr. 25, 1986 | [JP] | Japan | 61-94425 |
| Apr. 25, 1986 | [JP] | Japan | 61-96207 |
| May 12, 1986 | [JP] | Japan | 61-107869 |

[51] Int. Cl.$^4$ ............................................. H04N 1/393
[52] U.S. Cl. ........................................ 358/77; 358/287; 382/47
[58] Field of Search ............ 358/77, 75, 80, 280, 358/283, 287, 298; 382/47

[56] References Cited

U.S. PATENT DOCUMENTS

| 3,976,982 | 8/1976 | Eiselen | 340/172.5 |
| 4,127,870 | 11/1978 | Colditz | 358/77 |
| 4,275,450 | 6/1981 | Potter | 364/515 |
| 4,305,093 | 12/1981 | Nasu | 358/75 |
| 4,520,399 | 5/1985 | Iida | 358/287 |
| 4,528,693 | 7/1985 | Pearson | 382/47 |
| 4,536,802 | 8/1985 | Kurata | 358/287 |
| 4,569,081 | 2/1986 | Mintzer | 382/47 |
| 4,587,621 | 5/1986 | DuVall | 382/47 |
| 4,633,503 | 12/1986 | Kinnman | 382/47 |
| 4,682,243 | 6/1987 | Hatayama | 358/287 |
| 4,686,580 | 8/1987 | Kato | 358/287 |
| 4,712,141 | 12/1987 | Tomohisa et al. | 358/280 |
| 4,725,892 | 2/1988 | Suzuki et al. | 358/287 |

FOREIGN PATENT DOCUMENTS 210767 12/1982 Japan .

Primary Examiner—James J. Groody
Assistant Examiner—Robert M. Bauer
Attorney, Agent, or Firm—Frishauf, Holtz, Goodman & Woodward

[57] ABSTRACT

An image processing system capable of image enlargement and reduction. Interpolation data is stored in memory in the form of look-up tables for producing image data interpolating between adjacent pixels. The interpolation is carried out based on a selection signal determined in accordance with the designated magnification. The stored interpolation data has a plurality of data tables having distinctive conversion characteristics. A particular data table can be selected in accordance with a property of the original image.

11 Claims, 44 Drawing Sheets

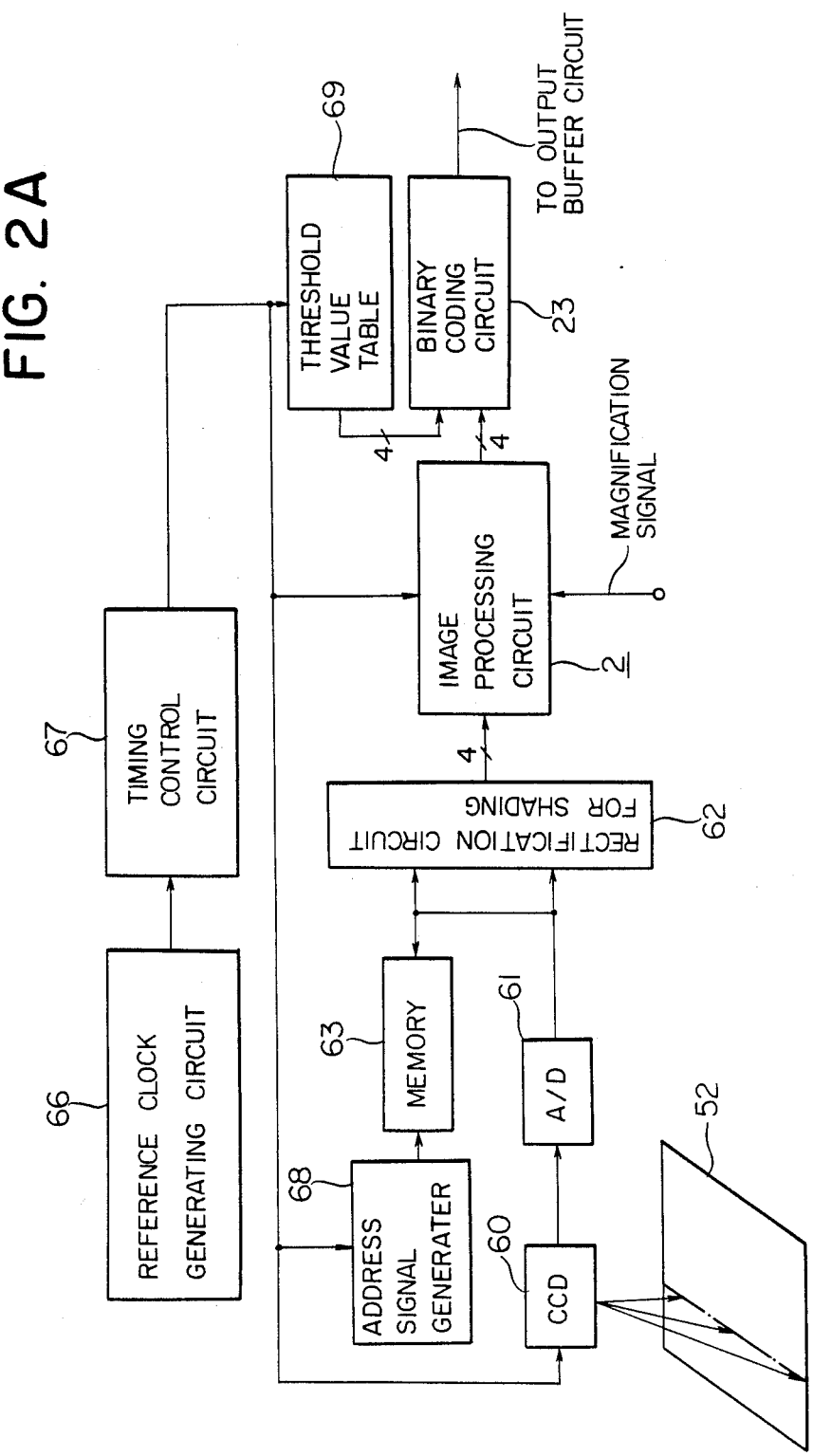

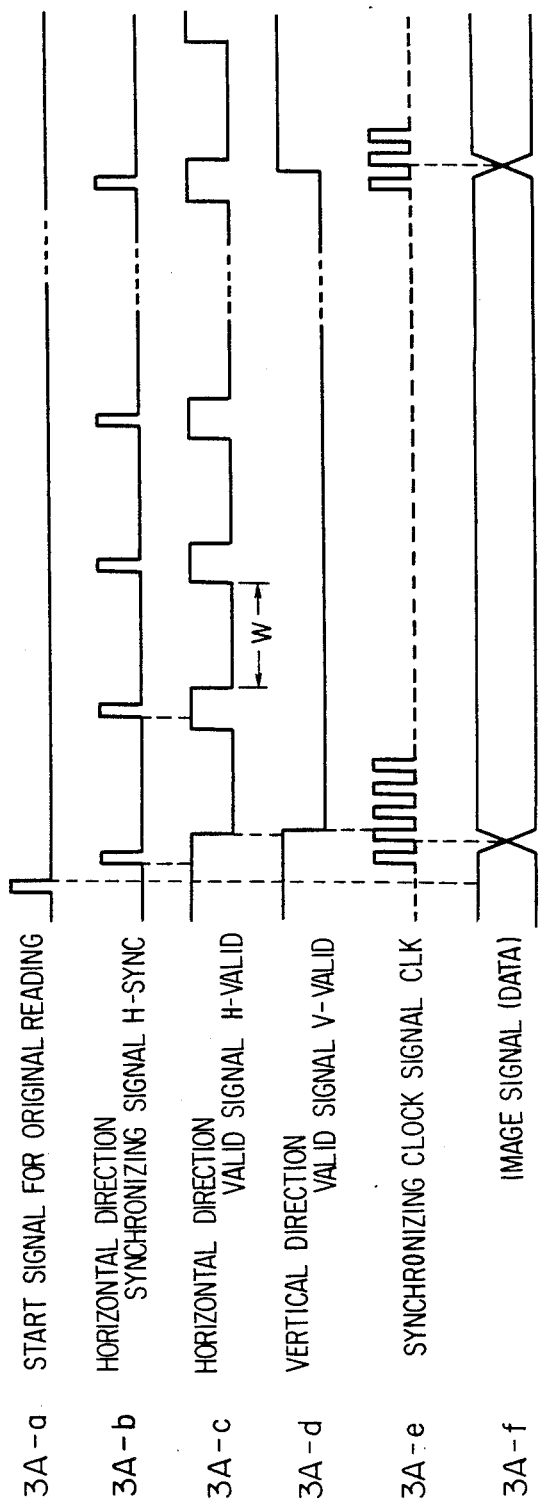

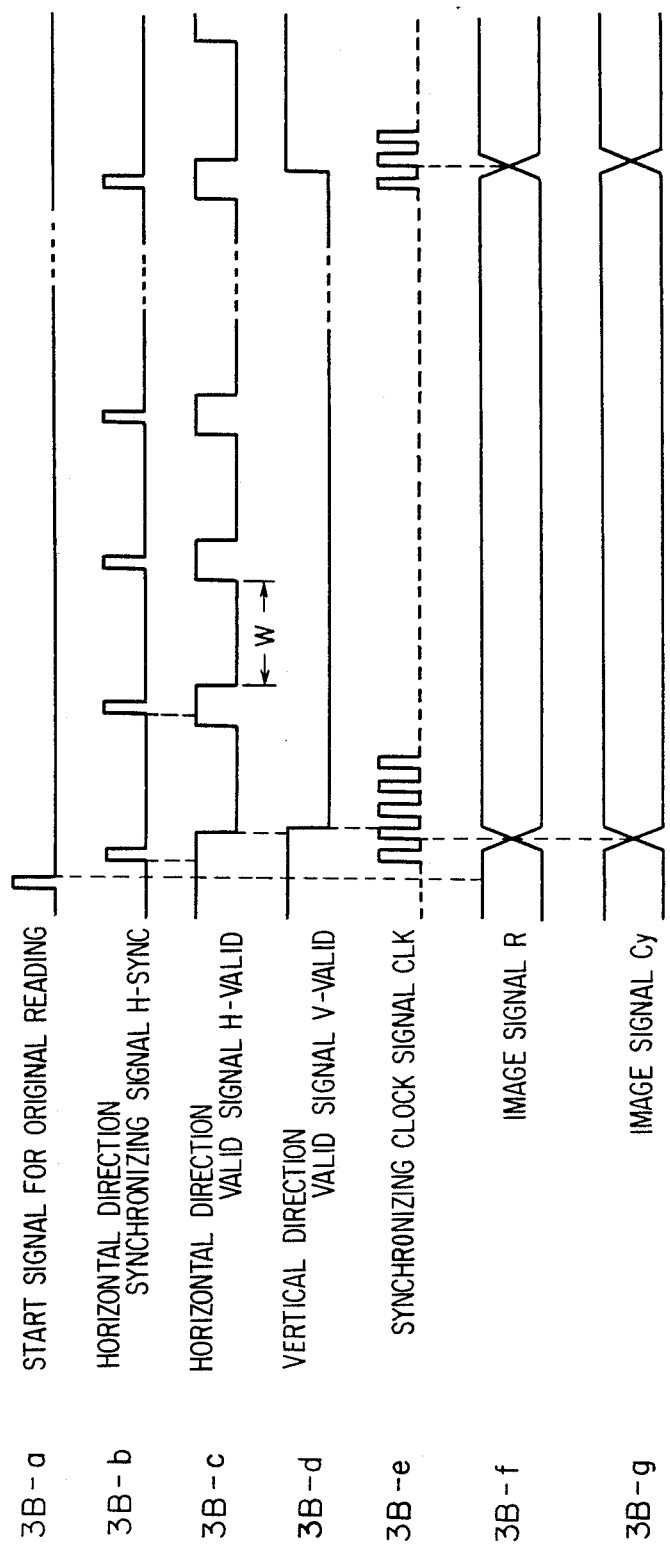

FIG. 15

CONTENTS OF INTERPOLATION DATA MEMORY 13

DATA SELECTION SIGNAL SD → STEP

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|-----|
| 400 | 4 | 4 | 4 | 3 | 3 | 3 | 3 | 2 | 2 | 2 | 2 | — | — | — | — | 0 |
| 410 | 4 | 4 | 4 | 4 | 3 | 3 | 3 | 3 | 3 | 2 | 2 | 2 | — | — | — | 1 |
| 420 | 4 | 4 | 4 | 4 | 4 | 3 | 3 | 3 | 3 | 3 | 3 | 2 | 2 | 2 | 2 | 2 |
| 430 | 4 | 4 | 4 | 4 | 4 | 4 | 4 | 3 | 4 | 4 | 3 | 3 | 3 | 3 | 3 | 3 |
| 440 | 4 | 4 | 4 | 4 | 4 | 4 | 4 | 4 | 4 | 4 | 4 | 4 | 4 | 4 | 4 | 4 |
| 450 | 4 | 4 | 4 | 5 | 5 | 5 | 5 | 5 | 5 | 5 | 5 | 5 | 5 | 5 | 5 | 5 |
| 460 | 4 | 4 | 5 | 5 | 5 | 5 | 5 | 6 | 6 | 6 | 6 | 6 | 6 | 6 | 6 | 6 |
| 470 | 4 | 4 | 5 | 5 | 5 | 6 | 6 | 6 | 6 | 6 | 7 | 7 | 7 | 7 | 7 | 7 |
| 480 | 4 | 4 | 5 | 5 | 5 | 6 | 6 | 7 | 7 | 7 | 7 | 8 | 8 | 8 | 8 | 8 |
| 490 | 4 | 5 | 5 | 5 | 6 | 6 | 6 | 7 | 8 | 8 | 8 | 9 | 9 | 9 | 9 | 9 |
| 4A0 | 4 | 5 | 5 | 5 | 6 | 7 | 7 | 8 | 9 | 9 | 9 | A | A | A | A | A |
| 4B0 | 4 | 5 | 5 | 5 | 6 | 7 | 7 | 8 | 9 | A | A | B | B | B | B | B |
| 4C0 | 4 | 5 | 5 | 5 | 6 | 7 | 7 | 8 | 9 | A | B | C | C | C | C | C |
| 4D0 | 4 | 5 | 5 | 5 | 6 | 7 | 7 | 8 | 9 | A | B | C | D | D | D | C |
| 4E0 | 4 | 5 | 5 | 5 | 6 | 7 | 7 | 8 | 9 | A | B | C | D | E | D | D |
| 4F0 | 4 | 5 | 5 | 5 | 7 | 7 | 8 | 9 | A | A | B | C | D | D | E | E |

IMAGE DATA D0 — IMAGE DATA D1 — INTERPOLATION DATA S

FIG. 16

| Processing Order | Sampling Position | | Data Selection Signal SD | |
|---|---|---|---|---|
| 0 | 0.00000 → | 0.51613 | 0→ | 8 |
| 1 | 1.03226 ⇄ | 1.54839 | 0⇄ | 8 |
| 2 | 2.06452 | 2.58085 | 1 | 9 |
| 3 | 3.09677 | 3.61291 | 1 | 9 |
| 4 | 4.12903 | 4.64517 | 2 | A |
| 5 | 5.16129 | 5.67743 | 2 | A |
| 6 | 6.19355 | 6.70969 | 3 | B |
| 7 | 7.22581 | 7.74195 | 3 | B |
| 8 | 8.25806 | 8.77421 | 4 | C |
| 9 | 9.29032 | 9.80647 | 4 | C |
| 10 | 10.32260 | 10.83870 | 5 | D |
| 11 | 11.35480 | 11.87100 | 5 | D |
| 12 | 12.38710 | 12.90320 | 6 | E |
| 13 | 13.41940 | 12.93550 | 6 | E |
| 14 | 14.45160 | 14.96770 | 7 | F |
| 15 | 15.48390 | * | 7 | 0 |
| 16 | 16.00000 | 16.51610 | 0 | 8 |
| 17 | 17.03230 | 17.54840 | 0 | 8 |
| 18 | 18.06450 | 18.58060 | 1 | 9 |
| 19 | 19.09680 | 19.61290 | 1 | 9 |
| 20 | 20.12900 | 20.64520 | 2 | A |
| 21 | 21.16130 | 21.67740 | 2 | A |
| 22 | 22.19350 | 22.70970 | 3 | B |
| 23 | 23.22580 | 23.74190 | 3 | B |
| 24 | 24.25810 | 24.77420 | 4 | C |
| 25 | 25.29030 | 25.80640 | 4 | C |
| 26 | 26.32260 | 26.83870 | 5 | D |
| 27 | 27.35480 | 27.87100 | 5 | D |
| 28 | 28.38710 | 28.90320 | 6 | E |
| 29 | 29.41930 | 29.93550 | 6 | E |
| 30 | 30.45160 | 30.96770 | 7 | F |
| 31 | 31.48390 | 32.00000 | 7 | F |
| 32 | 32.51610 | * | 8 | 0 |
| 33 | 33.03230 | 33.54840 | 0 | 8 |
| 34 | 34.06450 | 34.58060 | 1 | 9 |
| 35 | 35.09630 | 35.61290 | 1 | 9 |
| 36 | 36.12900 | 36.64520 | 2 | A |
| 37 | 37.16130 | 37.67740 | 2 | A |
| 38 | 38.19350 | 38.70970 | 3 | B |
| 39 | 39.22580 | 39.74190 | 3 | B |
| 40 | 40.25800 | 40.77420 | 4 | C |
| 41 | 41.29030 | 41.80640 | 4 | C |
| 42 | 42.32260 | 42.83870 | 5 | D |
| 43 | 43.35480 | 43.87090 | 5 | D |
| 44 | 44.38710 | 44.90320 | 6 | E |
| 45 | 45.41930 | 45.93550 | 6 | E |
| 46 | 46.45160 | 46.96770 | 7 | F |
| 47 | 47.48380 | 48.00000 | 7 | F |
| 48 | 48.51610 | * | 8 | 0 |
| 49 | 49.03220 | 49.54840 | 0 | 8 |
| 50 | 50.06450 | 50.58060 | 1 | 9 |
| 51 | 51.09670 | 51.61290 | 1 | 0 |
| 52 | 52.12900 | 52.64510 | 2 | A |
| 53 | 53.16130 | 53.67740 | 2 | A |
| 54 | 54.19350 | 54.70960 | 3 | B |
| 55 | 55.22580 | 55.74190 | 3 | B |
| 56 | 56.25800 | 56.77420 | 4 | C |
| 57 | 57.29030 | 57.80640 | 4 | C |
| 58 | 58.32250 | 58.83870 | 5 | D |
| 59 | 59.35480 | 59.87090 | 5 | D |
| 60 | 60.38710 | 60.90320 | 6 | E |
| 61 | 61.41930 | 81.93540 | 6 | E |
| 62 | 62.45160 ⇄ | 62.96770 | 7⇄ | F |
| 63 | 63.48380 ⇄ | 64.00000 | 7⇄ | F |

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|----|
| 2D00 | 01 | 81 | 01 | 81 | 11 | 91 | 11 | 91 | 21 | A1 | 21 | A1 | 31 | B1 | 31 | B1 |
| 2D10 | 41 | C1 | 41 | C1 | 51 | D1 | 51 | D1 | 61 | E1 | 61 | E1 | 71 | F1 | 71 | 00 |
| 2D20 | 01 | 81 | 01 | 81 | 11 | 91 | 11 | 91 | 21 | A1 | 21 | A1 | 31 | B1 | 31 | B1 |
| 2D30 | 41 | C1 | 41 | C1 | 51 | D1 | 51 | D1 | 61 | E1 | 61 | E1 | 71 | F1 | 71 | F1 |
| 2D40 | 81 | 00 | 81 | C1 | 11 | 91 | 11 | 91 | 21 | A1 | 21 | A1 | 31 | B1 | 31 | B1 |
| 2D50 | 41 | C1 | 41 | C1 | 51 | D1 | 51 | D1 | 61 | E1 | 61 | E1 | 71 | F1 | 71 | F1 |
| 2D60 | 81 | 00 | 81 | C1 | 11 | 81 | 11 | 91 | 21 | A1 | 21 | A1 | 31 | B1 | 31 | B1 |
| 2D70 | 41 | C1 | 41 | C1 | 51 | D1 | 51 | D1 | 21 | 91 | 21 | A1 | 31 | B1 | 31 | B1 |
| 2D80 | 01 | 81 | 01 | B1 | 51 | C1 | 41 | C1 | — | — | — | 41 | — | 41 | 21 | A1 |
| 2D90 | 31 | E1 | 31 | E1 | 31 | F1 | 71 | A1 | 71 | D1 | 41 | D1 | 51 | D1 | 51 | D1 |
| 2DA0 | 61 | — | 61 | C1 | 61 | 91 | 21 | D1 | 21 | 81 | 81 | 81 | 01 | 81 | 01 | 81 |
| 2DB0 | 11 | E1 | 11 | E1 | 71 | D1 | 51 | 81 | 51 | B1 | 61 | 00 | 31 | E1 | 51 | E1 |
| 2DC0 | 41 | C1 | 41 | C1 | 41 | 91 | 31 | B1 | 31 | E1 | 01 | E1 | 61 | 91 | 61 | 91 |
| 2DD0 | 71 | F1 | 71 | F1 | 21 | D1 | 61 | E1 | 61 | B1 | 31 | C1 | 11 | C1 | 11 | C1 |
| 2DE0 | 21 | A1 | 21 | A1 | 51 | E1 | 31 | B1 | 31 | E1 | 71 | F1 | 41 | 91 | 41 | 91 |
| 2DF0 | 51 | D1 | 51 | D1 | — | E1 | 61 | E1 | 61 | E1 | 71 | F1 | 71 | F1 | 71 | 00 |

124/64 : 2D00 – 2D70
125/64 : 2D80 – 2DF0

DATA SELECTION SIGNAL SD  
PROCESSING-TIMING SIGNAL TD  
→ STEP  
INVALID DATA

CONTENTS OF INTERPOLATION DATA-SELECTION SIGNAL MEMORY 16

FIG. 18

| Processing Order | Sampling Position | Data Selection Signal SD | | Processing Order | Sampling Position | Data Selection Signal SD |
|---|---|---|---|---|---|---|
| 0 | 0.00000 | 0 | | 40 | 40.72730 | B |
| 1 | 1.93939 | F | | 41 | 42.66670 | * |
| 2 | 3.87879 | * | | 42 | 42.66670 | A |
| 3 | 3.87879 | E | | 43 | 44.60810 | * |
| 4 | 5.81818 | * | | 44 | 44.60610 | 9 |
| 5 | 5.81818 | D | | 45 | 46.54550 | * |
| 6 | 7.75758 | * | | 46 | 46.54550 | 8 |
| 7 | 7.75758 | C | | 47 | 48.48490 | * |
| 8 | 9.69687 | * | | 48 | 48.48490 | 7 |
| 9 | 9.69697 | B | | 49 | 50.42430 | * |
| 10 | 11.63640 | * | | 50 | 50.42430 | 6 |
| 11 | 11.83640 | A | | 51 | 52.36370 | * |
| 12 | 13.57580 | * | | 52 | 52.36370 | 5 |
| 13 | 13.57580 | 9 | | 53 | 54.30310 | * |
| 14 | 15.51520 | * | | 54 | 54.30310 | 4 |
| 15 | 15.51620 | 8 | | 55 | 56.24240 | * |
| 16 | 17.45450 | * | | 56 | 58.24240 | 3 |
| 17 | 17.45450 | 7 | | 57 | 58.18180 | * |
| 18 | 19.39390 | * | | 58 | 58.18180 | 2 |
| 19 | 19.39390 | 6 | | 59 | 60.12120 | * |
| 20 | 21.33330 | * | | 60 | 60.12120 | 1 |
| 21 | 21.33330 | 5 | | 61 | 62.06060 | * |
| 22 | 23.27270 | * | | 62 | 62.06060 | 0 |
| 23 | 23.27270 | 4 | | 63 | 64.00000 | * |
| 24 | 25.21210 | * | | | | |
| 25 | 25.21210 | 3 | | | | |
| 26 | 27.15150 | * | | | | |
| 27 | 27.15150 | 2 | | | | |
| 28 | 29.09090 | * | | | | |
| 29 | 29.09090 | 1 | | | | |
| 30 | 31.03030 | * | | | M = 33/64 | |
| 31 | 31.03030 | 0 | | | | |
| 32 | 32.96970 | F | | | | |
| 33 | 34.90910 | * | | | | |
| 34 | 34.90910 | E | | | | |
| 35 | 38.84850 | * | | | | |
| 36 | 36.84850 | D | | | | |
| 37 | 38.78790 | * | ← INVALID DATA | | | |
| 38 | 38.78790 | C | | | | |
| 39 | 40.72730 | * | | | | |

FIG. 24
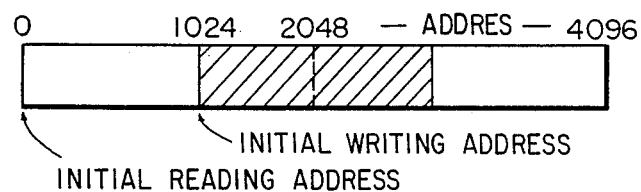
24-a REDUCING OPERATION
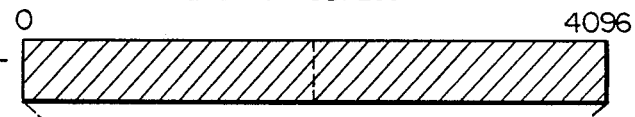
24-b RECORD OF ENLARGING OPERATION
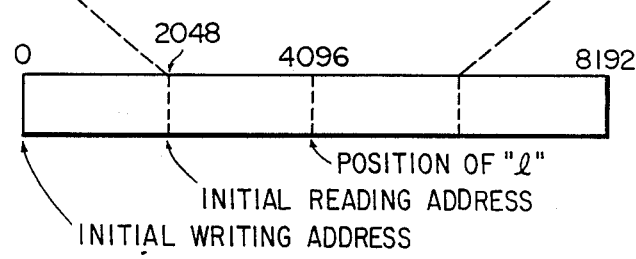
24-c ENLARGING OPERATION
FIG. 25
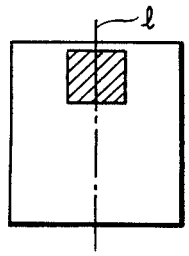
25-a REDUCING
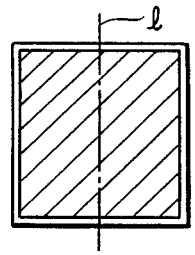
25-b ENLARGING
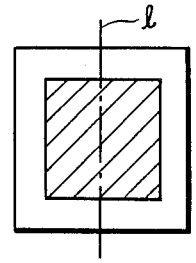
25-c SAME MAGNIFICATION

FIG. 26

| MAGNIFICATION M | INITIAL WRITING ADDRESS | INITIAL READING ADDRESS |
|---|---|---|
| 32/64 | 1024 | 0 |
| 33/64 | 992 | 0 |
| 34/64 | 960 | 0 |
| ⋮ | ⋮ | ⋮ |
| 64/64 | 0 | 0 |
| 65/64 | 0 | 32 |
| ⋮ | ⋮ | ⋮ |
| 126/64 | 0 | 1984 |
| 127/64 | 0 | 2016 |
| 128/64 | 0 | 2048 |

FIG. 35

| MAGNIFI-CATION M | INITIAL WRITING ADDRESS | INITIAL READING ADDRESS |
|---|---|---|
| 32/64 | 0 | 184 |
| 33/64 | 0 | 190 |
| 34/64 | 0 | 196 |
| ⋮ | ⋮ | ⋮ |
| 64/64 | 0 | 368 |
| ⋮ | ⋮ | ⋮ |
| 126/64 | 0 | 724 |
| 127/64 | 0 | 730 |
| 128/64 | 0 | 736 |

FIG. 37

| MAGNIFI-CATION M | INITIAL WRITING ADDRESS | INITIAL READING ADDRESS |
|---|---|---|
| 32/64 | 1208 | 0 |
| 33/64 | 1182 | 0 |
| 34/64 | 1156 | 0 |
| ⋮ | ⋮ | ⋮ |
| 64/64 | 368 | 0 |
| ⋮ | ⋮ | ⋮ |
| 126/64 | 0 | 1260 |
| 127/64 | 0 | 1286 |
| 128/64 | 0 | 1312 |

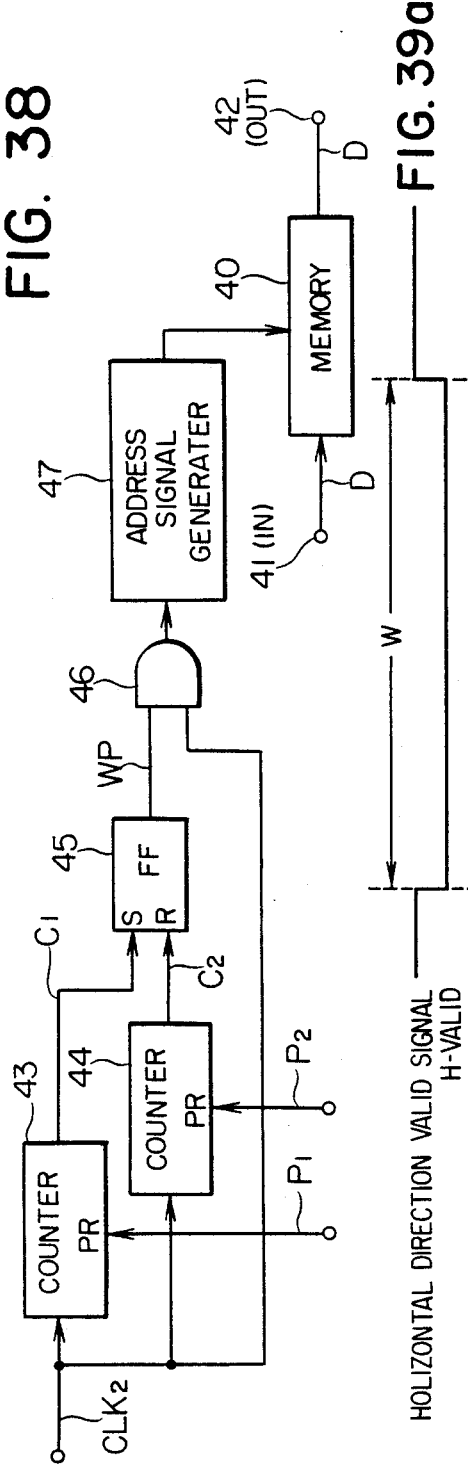

41-a REDUCING 41-b SAME SCALE RATIO 41-c ENLARGING

FIG. 42
42-a 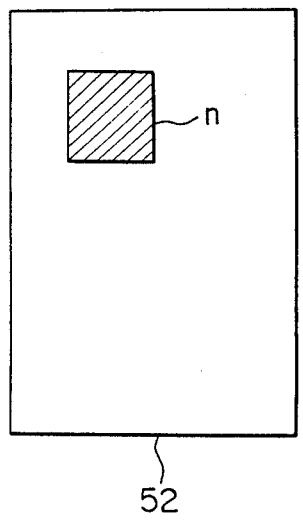 42-b 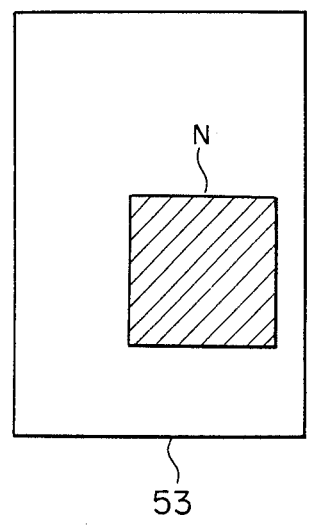
FIG. 43
| DENSITY | THRESHOLD VALUE |
|---------|-----------------|
| LOW     | 2 H             |
|         | 5 H             |
| REGULAR | 8 H             |
|         | B H             |
| HIGH    | E H             |

44-a

| D | 5 | C | 3 |
|---|---|---|---|
| 1 | 9 | 0 | 7 |
| A | 2 | B | 4 |
| 0 | 6 | 1 | 8 |

44-b

| F | 7 | D | 5 |
|---|---|---|---|
| 3 | B | 1 | 9 |
| C | 4 | E | 6 |
| 0 | 8 | 2 | A |

44-c

| F | 9 | E | 7 |
|---|---|---|---|
| 5 | D | 3 | B |
| E | 6 | F | 8 |
| 2 | A | 4 | C |

GRADATION CONVERSION CHARACTERISTIC

ONE EXAMPLE OF HIGH CONTRAST

FIG. 53

INTERPOLATION DATA ROM
OF HIGH CONTRAST CONVERSION

| ADRS | 0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| 400 | 4 | 4 | 4 | 3 | 3 | 3 | 3 | 2 | 2 | 2 | 2 | 1 | 1 | 1 | 1 | 0 |
| 410 | 4 | 4 | 4 | 3 | 3 | 3 | 3 | 3 | 3 | 2 | 2 | 2 | 2 | 2 | 1 | 1 |
| 420 | 4 | 4 | 4 | 4 | 4 | 3 | 3 | 3 | 3 | 3 | 3 | 3 | 3 | 2 | 2 | 2 |
| 430 | 4 | 4 | 4 | 4 | 4 | 4 | 4 | 4 | 4 | 3 | 3 | 3 | 3 | 3 | 3 | 3 |
| 440 | 4 | 4 | 4 | 4 | 4 | 4 | 4 | 4 | 4 | 4 | 4 | 4 | 4 | 4 | 4 | 4 |
| 450 | 4 | 4 | 4 | 4 | 4 | 4 | 4 | 5 | 5 | 5 | 5 | 5 | 5 | 5 | 5 | 5 |
| 460 | 4 | 4 | 4 | 4 | 5 | 5 | 5 | 5 | 5 | 5 | 5 | 5 | 6 | 6 | 6 | 6 |
| 470 | 4 | 4 | 4 | 5 | 5 | 5 | 5 | 5 | 6 | 6 | 6 | 6 | 6 | 6 | 7 | 7 |
| 480 | 4 | 4 | 5 | 5 | 5 | 5 | 6 | 6 | 6 | 6 | 7 | 7 | 7 | 7 | 8 | 8 |
| 490 | 4 | 4 | 5 | 5 | 5 | 6 | 6 | 6 | 7 | 7 | 7 | 7 | 8 | 8 | 8 | 9 |
| 4A0 | 4 | 4 | 5 | 5 | 6 | 6 | 6 | 7 | 7 | 7 | 8 | 8 | 9 | 9 | 9 | A |
| 4B0 | 4 | 4 | 5 | 5 | 6 | 6 | 7 | 7 | 8 | 8 | 8 | 9 | 9 | A | A | B |
| 4C0 | 4 | 5 | 5 | 6 | 6 | 7 | 7 | 8 | 8 | 9 | 9 | A | A | B | B | C |
| 4D0 | 4 | 5 | 5 | 6 | 6 | 7 | 7 | 8 | 8 | 9 | A | A | B | B | C | C |
| 4E0 | 4 | 5 | 5 | 6 | 7 | 7 | 8 | 8 | 9 | A | A | B | C | C | D | D |
| 4F0 | 4 | 5 | 5 | 6 | 7 | 7 | 8 | 9 | A | A | B | C | C | D | E | E |

D0 D1   S: INTERPOLATION DATA
ADJACENT ORIGINAL
IMAGE DATA

FIG. 54

INTERPOLATION DATA ROM
OF EXAMPLE 2

LEVEL DIFFERENCE BETWEEN 2 DATA : 1

| ADRS | 0 | +1 | +2 | +3 | +4 | +5 | +6 | +7 | +8 | +9 | +A | +B | +C | +D | +E | +F |   |
|---|---|---|---|---|---|---|---|---|---|---|---|---|---|---|---|---|---|
| 400 | 4 | 4 | 4 | 3 | 3 | 3 | 3 | 2 | 2 | 2 | 2 | 1 | 1 | 1 | 1 | 0 | |
| 410 | 4 | 4 | 4 | 3 | 3 | 3 | 3 | 3 | 3 | 2 | 2 | 2 | 2 | 2 | 1 | 1 | |
| 420 | 4 | 4 | 4 | 4 | 4 | 3 | 3 | 3 | 3 | 3 | 3 | 3 | 3 | 2 | 2 | 2 | |
| 430 | 4 | 4 | 4 | 4 | 4 | 4 | 4 | 4 | 4 | 3 | 3 | 3 | 3 | 3 | 3 | 3 | =4 |
| 440 | 4 | 4 | 4 | 4 | 4 | 4 | 4 | 4 | 4 | 4 | 4 | 4 | 4 | 4 | 4 | 4 | |
| 450 | 4 | 4 | 4 | 4 | 4 | 4 | 4 | 4 | 5 | 5 | 5 | 5 | 5 | 5 | 5 | 5 | =4 |
| 460 | 4 | 4 | 4 | 4 | 5 | 5 | 5 | 5 | 5 | 5 | 5 | 5 | 6 | 6 | 6 | 6 | |
| 470 | 4 | 4 | 4 | 5 | 5 | 5 | 5 | 5 | 6 | 6 | 6 | 6 | 6 | 6 | 7 | 7 | |
| 480 | 4 | 4 | 5 | 5 | 5 | 5 | 6 | 6 | 6 | 6 | 7 | 7 | 7 | 7 | 8 | 8 | |
| 490 | 4 | 4 | 5 | 5 | 5 | 6 | 6 | 6 | 7 | 7 | 7 | 7 | 8 | 8 | 8 | 9 | |
| 4A0 | 4 | 4 | 5 | 5 | 6 | 6 | 6 | 7 | 7 | 7 | 8 | 8 | 9 | 9 | 9 | A | |
| 4B0 | 4 | 4 | 5 | 5 | 6 | 6 | 7 | 7 | 8 | 8 | 8 | 9 | 9 | A | A | B | |
| 4C0 | 4 | 5 | 5 | 6 | 6 | 7 | 7 | 8 | 8 | 9 | 9 | A | A | B | B | C | |
| 4D0 | 4 | 5 | 5 | 6 | 6 | 7 | 7 | 8 | 9 | 9 | A | A | B | B | C | C | |
| 4E0 | 4 | 5 | 5 | 6 | 7 | 7 | 8 | 8 | 9 | A | A | B | C | C | D | D | |
| 4F0 | 4 | 5 | 5 | 6 | 7 | 7 | 8 | 9 | A | A | B | C | C | D | E | E | |

D0 D1

TECHNIQUE FOR INTERPOLATING A COLOR IMAGE FOR IMAGE ENLARGEMENT OR REDUCTION BASED ON LOOK-UP TABLES STORED IN MEMORY

BACKGROUND OF THE INVENTION

The present invention relates to an image processing system, being capable of designating a recording position, which can enlarge and reduce an original image by using data interpolation and can arbitrarily designate the position on a recording paper where the image is recorded.

The invention relates to an image processing system which enlarges and reduces the information of an original draft by interpolation, and in particular to an image processing system being capable of changing the contents of an interpolation table in accordance with the characteristics of an image.

The invention relates to a color image recording system, being applicable to simple electrophotographic color copying machines and the like, and being capable of enlarging and reducing an image in a specified color.

With an image processing system being capable of enlarging and reducing an original image, the output devices such as a display, recording device and the like usually display or record the image comprising only two types of binary codes respectively representing "black" and "white".

As a method to represent pseudo-halftone with such output devices, the dither method and the like are known in the art. The dither method is one type of area gradation method, and represents an halftone image by varying the quantity of dots being recording in a specific area (matrix).

Accordingly, in the dither method, an area corresponding with one pixel in an original draft is recorded as one dot, by using a specific threshold value matrix as shown in FIG. 45. By this arrangment, binary coded output data are available. Such output data represent a pseudo-halftone image in the two types of binary data, "white" and "black".

Of color image processing systems having such a type of output devices, the similar systems being capable of recording, through enlarging or reducing operation with an externally designated magnification, an original image obtained via an image reading means such as CCD or the like have been developed.

With these systems, an enlarged or reduced image, as required, is obtained principally by varying the frequency of a clock signal (transfer clock signal) for image reading, by a CCD in accordance with a magnification.

With an output device, if a scanning time needed for scanning one line in the main scanning direction is TW, and if the number of pixels involved for scanning one line is N, the frequency of transfer clock signal f0 of the device is expressed, below;

$$F0 = N/TW$$

Similarly, if the frequency of transfer clock signal from a CCD is f, and if the time needed for the CCD to scan one line is T, then;

$$f = N/T$$

Accordingly, when $f > f0$, an original image is recorded through reduction, and when $f < f0$, the image is recorded through enlargement.

The above-mentioned conventional image processing systems, however, have the following disadvantages, since they involve the transfer clock signal, for a CCD, whose frequency can be varied in accordance with a magnification.

Firstly, because of an arrangement to vary the transfer clock signal being fed into the CCD, the control for not only the transfer clock signal but the exposure of an exposing lamp is required. Accordingly, it is necessary to incorporate a circuit for controlling the exposure.

Additionally, as the frequency of transfer clock signal being fed into the CCD must be varied in correspondence with a magnification, it is also necessary to use a variable type clock signal generator. In this case, if an arrangement to set a magnification in greater precision is incorporated, the frequency of transfer clock signal must be regulated with higher precision, resulting in a complicated circuit in the variable type clock signal generator.

Furthermore, varying the transfer clock, which is fed into the CCD, in accordance with a magnification is tantamount to varying the sampling position, in relation to an original image, in accordance with the magnification. Accordingly, the same data corresponding to the same sampling position of an original image are repeatedly used in the enlarging operation, and, in contrast, a part of the data is thinned out in the reducing operation. As a disadvantageous result, a recorded image which is an exact enlargement or reduction of an original image cannot be obtained.

On top of this, the method fails to provide a recorded image having satisfactory quality, because the enlarging and reducing operations are carried out simply based on the data sampling.

To eliminate such disadvantages, an enlarged or reduced image is produced by adding or thinning out the data related to a pair of adjacent image data, on the basis of levels of these neighboring data, after an original image data are generated.

For this purpose, the inventors have proposed an interpolation method, wherein the enlarging and reducing operations are carried out, by previously providing interpolation data within a ROM in order to interpolate the data between neighboring pixels within the read-out image information, and by reading out the above-mentioned interpolation data, based on both the read-out image data and the interpolation data selection data corresponding with the predetermined magnification.

Involving no need for varying a transfer clock signal in accordance with a magnification, this method eliminates a complicated clock generating circuit, and does not need the control of exposure, and can provide a high quality image.

This method, however, having only one type of interpolation table where data for interpolation is stored, cannot realize an image quality suitable for representing characteristics of original draft, that is, whether the draft is of a line drawing, photograph or the like.

The object of the invention is, in order to give the solution to the above-mentioned disadvantages, to provide an image processing system which can produce processed image with an excellent quality by satisfactorily emphasizing the edges in a line drawing or by giving sufficient tone representation in a photograph.

Furthermore, for such type of data interpolation, the image data (interpolation data) in accordance with a sampling position corresponding with a magnification must be provided as a ROM table. Setting a magnification to a higher precision or obtaining a good image quality which corresponds to the characteristic of the original accordingly requires an increased amount of data provided in the ROM table, resulting in a large capacity memory and hence an increased cost.

Therefore, it is an object of the present invention to eliminate the disadvantages of conventional image processing systems, that is, a complicated peripheral circuitry for enlarging and reducing, as well as a deteriorated quality of recorded image, and to provide an image processing system, being capable of enlarging and reducing operations, which realizes a smaller size of interpolation table even if such a system generates interpolation data for enlarging and reducing operations by interpolation methods.

As stated above, of color image processing systems having output devices, those having the features to record an original image via enlarging and reducing operations with an externally designated magnification have been developed. These systems generate signals corresponding to an enlarged or reduced image by adding or thinning out appropriate image data, in accordance with a magnification, to or from image data of an original image being read with an image reading means, such as a CCD.

However, such enlarging and reducing operations only treat binary coded image signal. In another method, a signal transmitted from a CCD and processed for enlarging or reducing is separated into a plurality of color signals necessary for recording a colored image.

The above-mentioned conventional color image processing systems, however, produce an image of significantly deteriorated quality, since they carry out image processing, such as an enlarging or reducing operation, based on binary coded image data.

More specifically, in an enlarging or reducing operation, which is an image processing to add or thin out image data, the data solely comprising "1"s and "0"s are added to or thinned out from binary coded image data. Accordingly, when an image, for example, an oblique line, is enlarged, the ruggedness in an enlarged image is emphasized.

If an image processing, such as an enlarging or reducing, is carried out prior to the separation into a plurality of color signals, the color separation properties may deteriorate depending on a designated magnification, or, in the worst case, the color separation characteristics must be changed, in accordance with a magnification.

This is because the separation of an original color image into a plurality of color signals is effected by selecting specific colors with reference to a color separation map which stores the color separation data for the equal scale ratio. Accordingly, it is impossible to refer to the color data corresponding to the original color image when a non-equal magnification, that is, a magnification for enlarging or reducing is used.

Naturally, the color separation properties deteriorate if only one color separation map is used. If a plurality of color separation maps respectively corresponding to each magnification are provided, complicated control system for the maps are required.

Therefore, the present invention provides a color image processing system being capable of enlarging and reducing operations, which does not cause the quality of a recorded image to deteriorate or the color separation properties to degrade.

As also stated above, with an image processing system being capable of enlarging and reducing an original image, if a photoelectric conversion element such as a CCD is used as an image reading means, the image signal with enlargement or reduction incorporated is obtained usually by adding to or thinning out from the image pixel data of the original image being read with the photoelectric conversion element, in accordance with an enlarging or reducing magnification.

FIG. 38 is a schematic diagram illustrating one example of the principal area of a processing system being capable of enlarging and reducing operations and being used in such an image processing system.

In this figure, numeral 40 is a memory for image data. Into an input terminal 41 of the memory 40, the image data read by an image reading means are fed after incorporating enlarging or reducing. The output image data transmitted from an output terminal 42 are fed into a recording device and the like, where the enlarged or reduced image is reproduced.

In an enlarging or reducing operation, the amount of image data transmitted to the memory 40 is limited by the recording width of a recording device. In this case, the generating timing of address signal generated by an address signal generator 47 and fed into the memory 40 is controlled in accordance with the operation mode, whether an enlarging or reducing operation.

For controlling this timing, first and second counters 43 and 44 capable of presetting are provided. When the clock signal CLK2 (FIG. 39-c) is counted to the preset values P1 and P2, respectively of the counters 43 and 44, the first and second output pulses C1 and C2 are generated (FIGS. 39-d and -e). The first output pulse C1 sets a flip flop 45 and the second output pulse C2 resets the flip flop. This, in turn, forms a window pulse WP shown in FIG. 39-f. The window pulse WP is supplied to a gate circuit 46 as a gate pulse, and the clock signal CLK2 is fed into the address signal generator 47 in accordance with the width W1 of the window pulse WP. The clock signal CLK2, however, is a clock synchronous with the enlarged or reduced image data.

Consequently, as the address data fed into the memory 40 is generated for the duration W1, only an image data D corresponding to the duration W1, among the image data (FIG. 39-b) controlled by a horizontal direction valid signal (H-VALID) of FIG. 39-a, is written into the memory 40 (see FIG. 39-g).

For this reason, varying the preset values P1 and P2 in accordance with a magnification for enlarging or reducing operation proportionally varies the width W1 of window pulse WP, thus regulating the size of image data being written into the memory 40.

In a reducing operation, the width of window pulse WP is treated as same as that of the horizontal direction valid signal (H-VALID). In contrast, in an enlarging operation which involves increased image data, the total size of data is reduced to cope with the increase by reducing in advance the width of the window pulse WP in relation to the width of the horizontal direction valid signal (H-VALID).

Incidentally, the above mentioned conventional color image processing systems have the following disadvantages.

With the similar systems having the constitution in FIG. 38, though the amount of image data being written into the memory 40 is regulated in accordance with an enlarging or reducing magnification, the first address (0th address) is, regardless of the magnification, always designated the initial writing address. This may cause the image to be recorded off the transfer area of an recording paper, if such a constitution is applied, especially, to an image processing system whose reading or recording device reads or records an original draft based on the center line of an original draft or recording paper.

As shown in FIG. 40, for example, in an image processing system which reads the image data of an original draft 52 based on the center line 1 on a draft deck 51 and records the image based on the center line 1, and when assuming W to be a maximum reading width of an image reading means, the image is recorded as shown in FIG. 41-a in an reducing operation, though the image is recorded as shown in FIG. 41-b in a same-magnification operation.

This is because the initial writing address in the memory 40, that is, the 0th address, corresponds to the initial writing position of an output device (a recording device such as a laser printer). Accordingly, if the size of a recording paper 53 to record the image is too small, the image is recorded off the transfer area of the recording paper, thus the reduced image cannot be correctly recorded on the recording paper.

If the recording paper is too large in size, there is a disadvantage too; the reduced image is recorded as shifted to one corner of the recording paper.

Furthermore, in an enlarging operation, the blank area of an original draft is also enlarged, resulting in the enlarged image shown in FIG. 41-c. This may prevent the necessary area of an image from being recorded on the recording paper 53 having a specific area.

Some of such color image processing systems have a provision which allows an operator to externally designate a recording position. These are color image processing systems which can record an enlarged image N in the designated position on a recording paper 53 shown, for example in FIG. 42-b, by enlarging an area n in an original draft 52 shown in FIG. 42-a.

With such color image processing systems, it is necessary not only to control the initial writing address of the memory 40 in compliance with a designated magnification but to control the width of horizontal direction valid signal (H-VALID) in compliance with the width of designated reading area.

As a result, the conventional color image processing systems inevitably require a complicated constitution and control of an additional circuit to designate a recording position.

Therefore, it is the object of the present invention to provide an image processing system capable of designating a recording position and accompanying a simplified constitution and control of a circuit to designate a recording position, in order to solve the above-mentioned disadvantages in the conventional systems.

Furthermore, the conventional color image processing systems, though being capable of recording a color image in compliance with an original color draft, fail to record the image whose colors are replaced with specific colors designated externally.

Externally effected arbitrary designation of colors, according to which the image is recorded, enlarges for a color image processing system the scope of application, and, accordingly, its value of utilization.

Therefore, it is the object of the invention to provide a color image processing system capable of recording specified image area in a specified color.

SUMMARY OF THE INVENTION

The invention has made the content of an interpolation table selectable for an image processing system having an interpolation table to carry out, in accordance with an enlarging or reducing magnification, interpolation for a plural group of image information read from an original draft by a photoelectric conversion element.

According to the invention, an image processing system, being capable of enlarging and reducing operations and having both an interpolation table storing interpolation data to estimate values between plural sets of adjacent image information and a data selection table storing data selection signals to select the interpolation data from the interpolation table, and referring to the interpolation data stored in the interpolation table in accordance with an enlarging or reducing magnification, is configured as follows.

The data selection table comprises a data selection signal writing circuit and a data selection memory.

In the writing circuit, the data selection signals selected in advance in accordance with a magnification are stored, and a part of the data selection signals stored in the writing with a designated magnification.

The data selection signals stored in the data selection memory are used as reference signals for interpolation data.

According to the invention, an image processing system is characterized by its constitution comprising an image reading device to separate image information into a plurality of independent color images and the convert the plurality of independent color images into image signals, a means for separating colors based on the image signals from the image reading device, an image processing circuit to enlarge or reduce an image based on a plural types of color signals obtained from the means for color separation, and a multiple-value-coding circuit subjecting each type of color signals having incorporated an enlargement or reduction to multiple-value-coding based on threshold values respectively provided for each type of color signals.

According to the invention, an image processing system enlarging and reducing an image, by using the image data read out by photoelectrically converting image information, is characterized by its capability not only to sample the image information only in a designated reading area and subject the sampled image data to enlarging or reducing, but to record in a designated recording position the enlarged or reduced data.

According to the invention, a color image recording system to record a specified color image on a recording member by forming independent electrostatic latent images, corresponding as a whole to an original color image, on an image forming member having a photoconductive photosensitive surface layer and by sequentially developing the latent images is characterized in that the system is provided with a means for designating image-processing area and a means for designating a recording color, and that the system can record an image area designated by the means for designating image-processing area in a color designated by the means for designating a recording color.

BRIEF DESCRIPTION OF THE DRAWINGS

FIGS. 3-A and 3-B are waveform diagrams jointly illustrating the operation of the example;

FIG. 15 illustrates one example of a group of interpolation data used in the same operation, above;

FIG. 16 illustrates one example of a group of selection data used in an image enlarging operation;

FIG. 17 illustrates the contents of a data table comprising data selection signals and processing-timing signals used in this operation;

FIG. 18 illustrates one example of a group of data selection signals used in an image reducing operation;

FIG. 24 is a diagram describing a line memory;

FIG. 25 is an explanatory drawing illustrating a recorded image;

FIGS. 26, 35 and 37 independently illustrate examples of initial writing addresses and others;

FIG. 38 is a schematic diagram illustrating one example of the principal area of a conventional image processing system being capable of enlarging and reducing operations;

FIGS. 39a-g are waveform diagrams describing the function of this system;

FIG. 42 is an explanatory diagram of a recorded image provided by designating the recording position;

FIG. 43 is a table listing a group of threshold value data used for a line drawing;

FIG. 53 illustrates one example of interpolation data high contrast conversion;

FIG. 54 illustrates other example of interpolation data according to the tone modification.

DETAILED DESCRIPTION OF THE INVENTION

Figure 1:
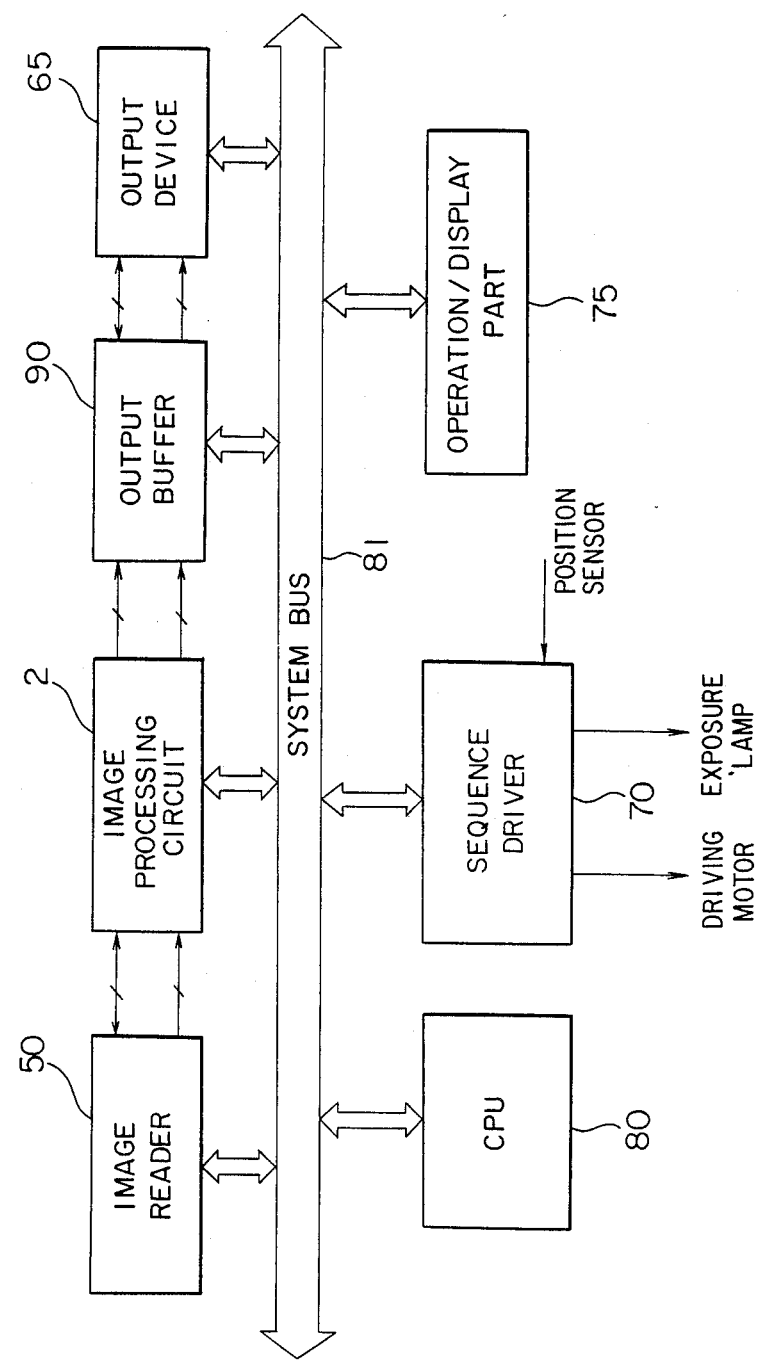
FIG. 1 is a schematic diagram outlining an image processing system according to the invention.

Now, one example of color image processing system according to the invention, in which an image is processed based on the center line l, and a recording position can be externally and arbitrarily designated, is described in detail, with reference to the drawings starting from FIG. 1.

FIG. 1 illustrates the outline of a color image processing system according to the invention.

The image information on an original draft 52 and the like is converted into image data comprising specific bit numbers corresponding to each color signal, for example, the image data having 16 tones levels (0 to F), by way of color separation, A/D conversion and other image processing steps. Each group of image data is, after being processed for enlarging or reducing by an image processing circuit 2, processed by an output buffer circuit 90, subjected to the processes including image recording based on the center line and other processed based on a designated recording mode, as described later.

These processes are effected by controlling addresses for writing into and reading from a line memory provided in the output buffer circuit 90. Each group of image data corresponding to a specific color and being read from the output buffer circuit 90 is supplied into an output device 65, where the image is recorded with an externally designated magnification or in an externally designated position.

An image reader 50 is provided with a driving motor, exposure lamp and other components to actuate an image reading means. These are controlled to a specific timing by control signals obtainable from a sequence control circuit (sequence driver) 70. Into the sequence control circuit 70, data from a position sensor (not shown) is inputted.

With an operation/display part 75, various input data for designating a magnification, recording position, recoding color and the like are entered and the contents of the similar data are displayed. The operation/display part 75 also serves as a designation means for a recording position (processing area) of an image as well as for a recording color. As a display means, an element such as an LED is used.

For controlling various operations as well as the image processing device as a whole, and for monitoring the status of operation and device, the control is effected by means of a system control circuit 80. For this purpose, the system control circuit 80 should be a microcomputer comprising a CPU.

The drawing illustrates one example controlled by a microcomputer. The control circuit 80 and various circuits, mentioned above, are linked with a system bus 81 in order to communicate the needed image processing data as well as control data.

More detailed description is as follows.

Into the image reading circuit 50 are fed an image reading start signal, start signal for shading-rectificating, recording color designation signal and the like, via the system bus 81.

Into the image processing circuit 2 are fed, after being transferred into the control circuit 80, a magnification data for designating a magnification being set at the operation/display part 75, a threshold value selection data to select a threshold value for binary-coding image data, and recording position designation data if the recording position is designated, via the system bus 81.

Into the output buffer circuit 90 is inputted an initial address to write into or read from the line memory provided in the same circuit 90. The initial writing address or initial reading address being set in the line memory varies according to a designated magnification, the recording position designation data or the like.

Into the output device 65 are supplied a start signal for recording an image, a designation signal for the size of recording paper, and the like.

FIG. 2A shows a typical example of an image reader 50.

The image information on an original draft 52 is read and converted into analog image signals by a reading means 60 such as a CCD. FIG. 3A illustrates the correlation between an image signal and various timing signals, wherein a horizontal direction valid signal (H-VALID) (3A-c in the same figure) corresponds to a maximum draft reading width W of the CCD 60 and an image signal 3A-f in the same figure is read out synchronously with a synchronizing clock signal CLK (3A-e in the same figure).

The horizontal synchronizing clock signals H-SYNC are generated by counting the clock signals CLK1. The signals H-SYNC contain the read start shift pulses for the CCD. Two signals, respectively having a frequency being ½ of the image transfer clock signal CLK and being out-of-phase with each other, can be used as clock signals respectively to shift even area and odd area of analog shift registers for the CCD. The read-image data signals (DATA) from the CCD 60 are read, starting at the first image data corresponding to the output of the shift pulse, and the reading further continues with the 2nd, third, . . . up to the 5000th bit. However, the first through fourth bits of the data signals are dummy pixels of the CCD, and the main direction scanning valid signal H-VALID corresponding to the fifth through 4756th bits is set active and fetched. Pulses for resetting shift registers for the CCD 60 shift by shift are generated corresponding to trailing edges of image data. A shading start signal is generated in correspondence to the section of the signal H-VALID, for the first line, which becomes active immediately after the image reading has started. In relation to the timing of sub-scanning direction, the sub-scanning direction valid signal V-VALID is set active in correspondence to the section for reading an original draft.

In relation to FIG. 2A, the image signal is converted into image data having, for example, 16 tone levels (0 through F) by an A/D converter 61. The image data is subjected to shading rectification in a rectificating circuit 62 for shading.

This arrangement is for rectifying the shading caused by the uneven sensitivity of CCD 60, the heterogeneousness in optical system, the uneven irradiation of exposure lamp and the like. For this purpose, the information (for one line) of an even density plate (white board or the like) provided in the non-image area of an image reader is read by the CCD 60 prior to the reading of image information, and the obtained data is stored in a memory 63 as an uneveness data.

The uneveness data for rectifying shading is, together with the image data, fed into the rectification circuit 62 where the rectification for shading is carried out on pixel-by-pixel basis.

Figure 49:
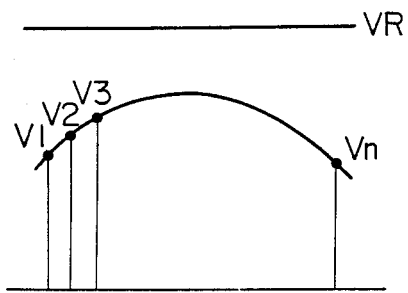
FIG. 49 is an explanatory diagram illustrating the principle of shading rectification.

Now, the principle of the shading rectification will be further explained, referring FIG. 49. In a system reading an image by irradiating an original draft with a lamp and collecting reflected light with a lens, an uneveness in an optical image called shading occurs due to optical characteristics of a lamp, lens and the like. In FIG. 49, if image data in the main scanning direction are assumed to be V1, V2, ... Vn, the levels at the both ends are low. Accordingly, to rectify them, the rectification circuit 62 for shading functions in the following manner. In FIG. 49, VR indicates the maximum value of image levels, and V1 is the image level for the first bit when "white" in an unshown white board having a uniform density as a reference is read in. Assuming the image level to be $d_1$ when the image is actually read, the tone level $d_1'$ of the rectified image is as follows;

$$d_1' = d_1 \times VR/V_1$$

To allow this rectification formula to hold, the rectification is carried out on bit-by-bit basis.

Figure 50:
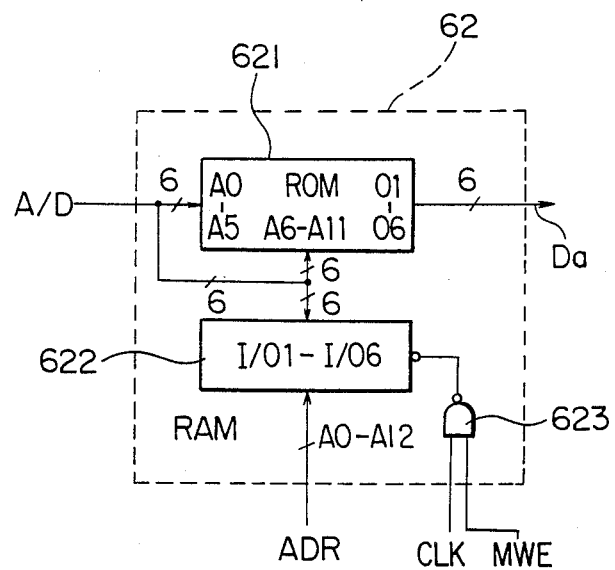
FIG. 50 is a detailed diagram showing the rectificating circuit for shading.

FIG. 50 shows the internal constitution of the rectification circuit 62 for shading. Numeral 622 represents a memory RAM for the size of shading, which corresponds to the memory 63 in FIG. 2A and is used to read one line of signals corresponding to the white board. Numeral 621 represents a rectification ROM for shading, which is used to rectify the image signals based on the information stored in the memory RAM 622 for the size of shading, during the image reading.

In shading rectification the read-image data for one line of the white board are at first stored in the memory RAM 622 for the size of shading. Then, the timing control circuit 67 inputs the shading start signal MWE, the address signal ADR and the image transfer clock signals CLK1 into the rectification circuit 62. Among these signals, the signals MWE, clock signals CLK1 are supplied to the write enable terminal W of the memory RAM 622 for the size of shading via a NAND gate 623, and the above-mentioned read image data are stored in the address designated by the address signals ADR.

Next, during the reading of original draft, the A/D-converted image data are inputted to the address terminals A0 through A5 on the rectification ROM 621 for shading. Simultaneously, the shading data stored in the memory RAM 622 for the size of rectification are being controlled with the address signals ADR, outputted respectively from terminals I/01 through I/06 to corresponding terminals A6 through A11 on the rectification ROM 621 for shading. Into the rectification ROM for shading, arithmetically processed data have been written in advance, in order to enable the arithmetic operation with the previously mentioned rectification formula.

Consequently, the rectification ROM 621 for shading is accessed by using the address signals comprising the read-image data and the shading data, and the original image data Da having incorporated shading rectification are obtained from the output terminals 01 through 06.

Now, referring FIG. 2A the image data having incorporated the rectification for shading is fed into the image processing circuit 2 where an enlarging or reducing with a designated magnification is carried out on real-time basis.

The processed image data is binary coded by a binary coding circuit 23 with the reference to the threshold value data (for example, dither matrix data) stored in a threshold value table 69. The binary coded image data is supplied into an output buffer circuit 90 (see FIG. 32).

The image data from the output buffer circuit 90 is supplied into an output device 65 where the image information is recorded as required. As the output device 65, a recording system involving a laser printer, LED printer or the like can be used.

Numeral 66 represents a reference clock generating circuit. The reference clock signal generated by the reference clock generating circuit 66 is fed into a timing control circuit 67 where various timing signals necessary for image processing are generated. In other words, in addition to the timing signals (a transfer clock signal and others) for driving the CCD the timing signals for driving an address signal generator 68 controlling the memory 63, the timing signals for the image processing circuit 2, the timing signals for the threshold value table 69 for binary coding, and others are generated.

As the output device 65, an electrophotographic color copying machine or the like can be used.

Figure 8:
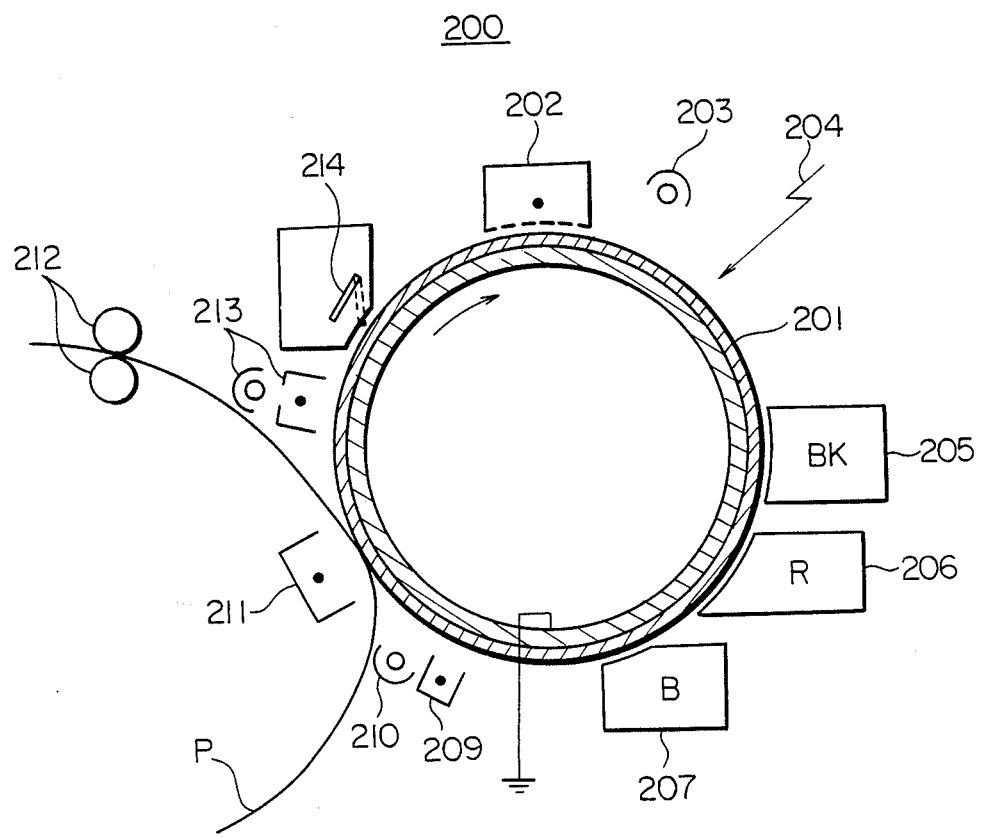
FIG. 8 is a block diagram illustrating one example of a simple electrophotographic color copying machine.

For convenience, one example of the constitution of a simple color copying machine applicable to the invention is described with the reference to the figures starting with FIG. 8.

A simple color copying machine records a color image by separating color information into about three types of color information. The three types of color information into which the original information is separated are, in this example, "black" BK, "red" R and "blue" B.

In FIG. 8, numeral 200 represents one example of the principal area of a color copying machine. Numeral 201 represents an image forming member having a drum-like shape, on the surface of which a photoconductive photosensitive layer made of selenium Se is provided in order to form an electrostatic image (electrostatic latent image) can be formed in correspondence to an optical image.

Around the outer circumferential surface of the image forming member 201 are sequentially provided the members, along the direction of its rotation, as described below.

The surface of the image forming member 201 is uniformly electrified by an electrifier 202, then uniformly exposed by an exposure lamp 203 to light having small intensity. The electrified and exposed surface of image forming member 201 is subjected to the imagewise exposure (the resultant optical image is represented by numeral 204) based on each separated color image.

After the imagewise exposure, each independent color image is developed by a corresponding developing device. The number of provided developing devices are equal to the number of separated color images. In this example, a developing device 205 filled with developer of black toner, a developing device 206 filled with developer of red toner and a developing device 207 filled with developer of blue toner are, in this order to the direction of rotation of the image forming member 201, are disposed as facing to the surface of image forming member 201.

The developing devices 205 through 207 are sequentially actuated synchronously with the rotation of the image forming member 201. For example, selectively actuating the developing device 205 causes the toner to be adhered to an electrostatic image based on an independent black image, thus developing the independent black image.

To the side of developing device 207 are provided a pre-transfer electrifier 209 and a pre-transfer exposure lamp 210, both of which allow easier transfer of a color image to a recording member P. The pre-transfer electrifier 209 and the pre-transfer exposure lamp 210 are provided according to a requirement.

The developed color image on the image forming member 201 is transferred on the recording member P by a transfer device 211. The recording member having received the image is fixed by a fixing device 212 in the after stage, then being ejected.

A neutralizing device 213 comprises one of neutralizing lamp and corona discharger for neutralization, or both of them.

A cleaning device 214 comprises a cleaning blade and a fur brush both of which jointly remove the residue toner adhered on the surface of drum after the color image on the image forming member 201 is transferred.

It is well known in the art that these toner removing means are designed not to come in contact with the surface of the image forming member 201 until the portion of the surface already developed reaches them.

As the electrifier 202, a Scorotron corona discharger or the like can be used. With this type of discharger, the influence of prior electrification is small, and the image forming member 201 can be electrified stably.

For the imagewise exposure 204, an imagewise exposure obtainable from a laser beam scanner is used. A laser beam scanner can, as described later, record a well-defined color image.

Figure 9:
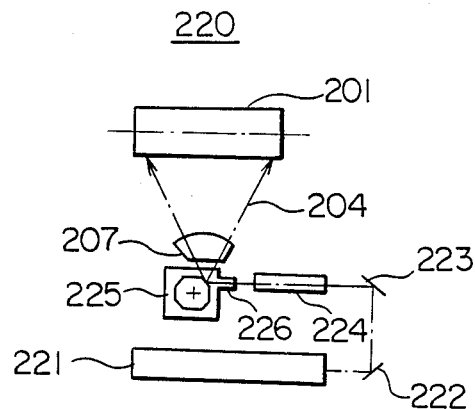
FIG. 9 is a block diagram illustrating one example of beam scanner.

An image exposure means in FIG. 9 is one example of a laser beam scanner.

The laser beam scanner 220 has a laser 221, which is a He-Ne laser or the like. A laser beam emitted from the laser 221 reaches an audio/optical modulator 224 via mirrors 222 and 223, and this arrangement turns on and off the laser beam based on an independent color image (for example, binary coded data). The laser beam being turned on and off is defected by a mirror scanner 225 comprising a rotatable octahedron mirror, and is irradiated on the surface of the image forming member 201 via an f-0 lens 207 for forming an image.

By the mirror scanner 225, the laser beam is allowed to scan the surface of image forming member 201 in a specified direction at a specific speed. This scanning enables the image exposure in accordance with a specific independent color image.

When the laser beam scanner 220 is used, a sharp color image can be formed, since latent images respectively of each independent color image can be easily formed as being staggered with each other.

A magnification lens 226 works, in advance, to enlarge the diameter of beam coming into the f-0 lens 207 for forming an image, so as to reduce the diameter of beam on the image forming member 201.

The image data from the image processing circuit 2, for example, binary coded dither output, is supplied into the beam scanner 220 comprising a portion of an output device 65, then the audio/optical modulator 224 is modulated with the binary coded output, causing the image exposure to be effected, as mentioned above.

The developing devices 205 through 207 have an identical constitution. Using the developing device 205 as an example, their constitution is described, below.

Figure 10:
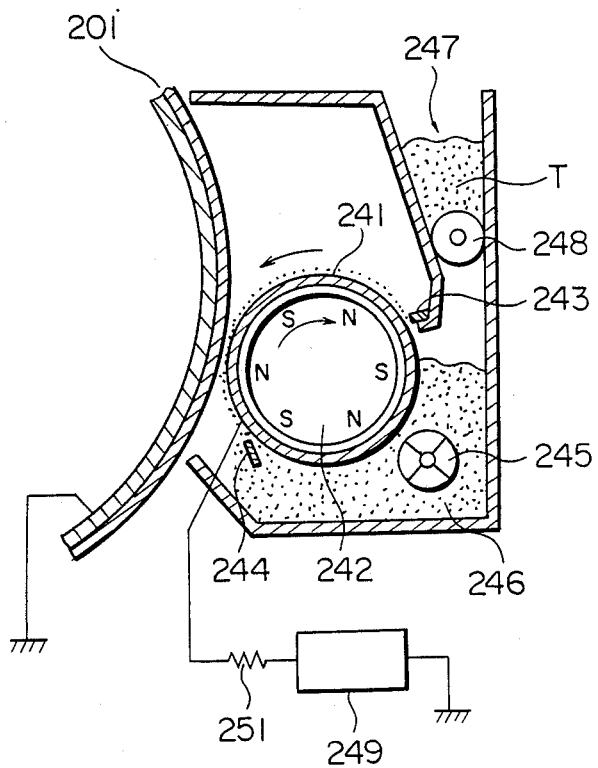
FIG. 10 is a block diagram illustrating one example of a developing machine.

FIG. 10 illustrate one example of the developing device 205.

In this figure, numeral 241 represents a development sleeve, having a tubular configuration and comprising a nonmagnetic material such as aluminum, stainless steel or the like, which cosely faces the outer circumferential surface of the image forming member 201. In the development sleeve 241 is provided a magnetic member 242 having a plurality of magnetic poles arranged along the circumferential direction of the sleeve. The magnetic member 242 attracts developer (toner T) contained in a developer reservoir 246 onto the surface of development sleeve 241. A layer thickness regulating blade 243 facing the circumferential outer surface of development sleeve 241 regulates the thickness of developer layer. A scraper blade 244 removes the developer layer, already used for development, from the surface of development sleeve.

In the developer reservoir 246 is provided an agitating rotator 245. Numeral 247 represents a toner hopper, and numeral 248 represents a toner supplying roller.

Numeral 249 is a power source for forming electric field. The power source 249 applies a bias having a specific voltage upon the development sleeve 241 via a protective resistor 251. By this arrangement, the behavior of toner T between the development sleeve 241 and the image forming member 201 is controlled in accordance with the electric field of a specific intensity.

In this type of developing device 205, each magnetic pole of the magnetic member 242 is usually magnetized to have the flux density of 500 to 1500 Gauss, accordingly the developer is attracted to the surface of development sleeve 241 by the magnetic force, and the layer thickness of attracted developer is regulated by the blade 243. Consequently, the developer layer whose thickness being regulated moves in a direction either identical or reverse to that of the image forming member 201 (an identical direction, in this figure), and an electrostatic image on the image forming member 201 is developed in the developing area where the surface of development sleeve 241 faces the surface of image forming member 201. The rest of developer layer is removed from the surface of development sleeve 241 by the blade 244 and collected into the developer reservoir 246.

In the second and following development steps for overlapping a required number of color toner images, an arrangement should be incorporated to prevent toner T, already deposited on the image forming member 201 in the last development, from being slipped in the course of additional development. In view of this, each development should be carried out preferably in compliance with requirements for non-contactive jumping development. FIG. 10 illustrates a developing device which develops an image in compliance with the requirements for non-contactive jumping development.

A preferred toner being used is the so-called two component developer comprising a blend of non-magnetic toner and magnetic carrier. This is because the two component developer features well defined colors as well as easy control in toner electrification.

Figure 2B:
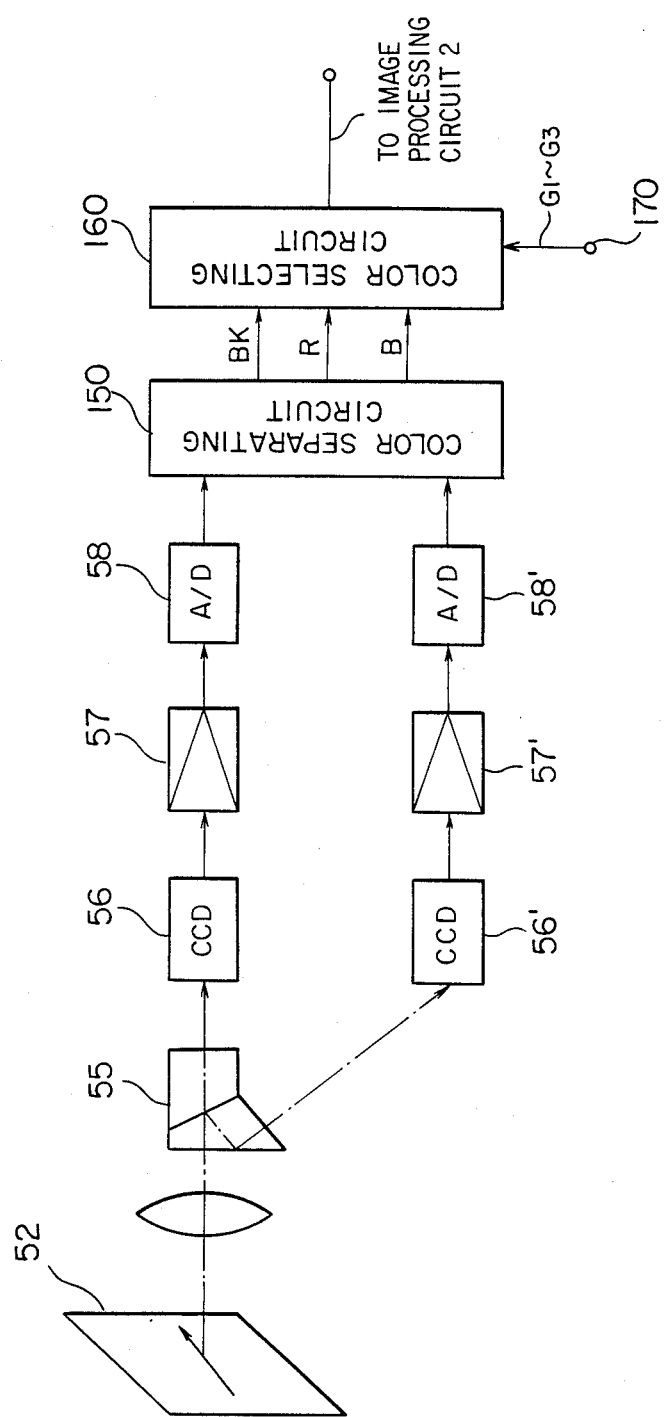
FIGS. 2-A and 2-B are schematic diagrams jointly illustrating one example of an image reader.

FIG. 2B illustrates one example of an image reader 50.

In this figure, color image information (an optical image) of an original draft 52 is separated into two independent color images, in this case, a red image R and a cyan image Cy, by a dichroic mirror 55. For this purpose, a dichroic mirror 55 having a cutoff frequency of approximately 600 nm is used. By this arrangement, the red component is made a transmitted light, and the cyan component is made a reflected light.

Separated red R and cyan Cy images are fed independently into image reading means 56 and 56' respectively comprising a CCD, for example, and each reading means independently outputs image signal solely comprising red component R or cyan component Cy.

FIG. 3B illustrates the correlation between the image signals R and Cy, and various timing signals. The horizontal direction valid signal (H-VALID) (3B-c in the figure) corresponds to the maximum draft reading width W of the CCDs 56 and 56', and the image signals R and Cy individually shown by 3B-f and 3B-g in the same figure are read in synchronously with the synchronizing clock signal CLK (E in the figure).

These image signals R and Cy are, via amplifiers 57 and 57 for normalization, individually fed into A/D converters 58 and 58', and converted into digital signals respectively comprising a specific number of bits. The digitized color image signal is fed into a color separating circuit 150 in the next stage, where being separated into plural types of color signals necessary for recording a color image.

As this example illustrates a simple recording device which records a color image in three colors, that is, red R, blue B and black BK, the digitized color image signal is separated into three types of color signals R, B and BK by the color separating circuit 150. The detail of color separation is described later.

At the color selecting circuit 160, one of color signal is selected from the color signals R, B and BK. As described above, this is because of the use of image forming process, wherein one color image of an independent color is developed per rotation of the image forming member 201. Accordingly, when one of the developing devices 205 through 207 is selectively actuated synchronously with the rotation of image forming member 201, a color signal corresponding to the selected developing device is selected by the color selecting circuit 160.

To a terminal 170 are supplied selection signals G1 through G3. These selection signals G1 through G3 are, as described later, used to select the color signals being outputted, depending on whether the tricolor recording which is the ordinary recording mode or the monocolor recording which is the color-designated recording mode, and are supplied from a system control circuit 80.

The color separation to separate an original color draft into color signals for three colors is carried out once per rotation of the image forming member 201.

The color separation (color separation from two color image components to three color signals), mentioned above, is effected based on the following principle.

Figure 11:
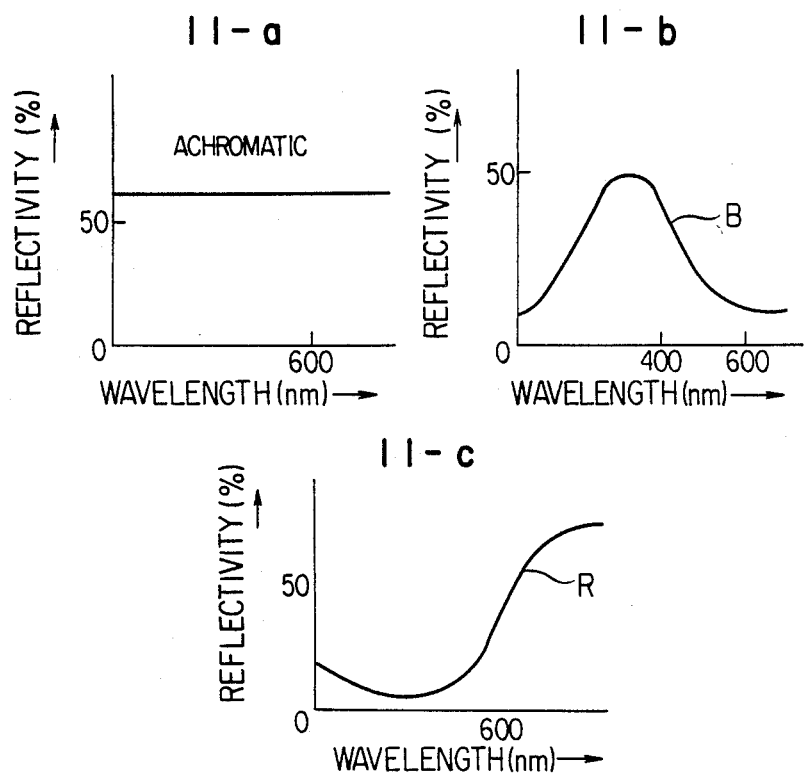
FIGS. 11 and 12 are drawings jointly used to describe color separation.

FIG. 11 schematically describes the spectral reflective characteristics of a color chart for color components. 11-a in the figure illustrates achromatic spectral reflective characteristics. 11-b in the figure illustrates blue-spectral reflective characteristics. 11-c in the figure illustrates red-spectral reflective characteristics. Each abscissa axis represents a wavelength (nm), and each ordinate axis represents a reflectivity (%).

Accordingly, if the cutoff of dichroic mirror 55 is 600 nm, the red component R is allowed to pass through, and the cyan component Cy is reflected.

Assuming the level of red signal R is VR and the level of cyan signal Cy is VC when the both signals are normalized based on white, and by establishing a coordinate system using these signals VR and VC, the colors, red, blue and black, can be separated based on the produced color separation map. In determining the axis of coordinate, the following must be considered. I. To incorporate a concept of reflectivity (reflective density) of original draft 52 comparable to the luminance signal among television signals, in order to represent a halftone. II. To incorporate a concept of color difference (including hue and chroma) of red, cyan and the like.

Accordingly, as luminance signal information (for example, 5-bit digital signal) and color-difference signal information (similarly, 5-bit digital signal), the following, for example, may be used.

$$\text{Luminance signal information} = VR + VC \quad (1)$$

where, $$0 \leq VC \leq 1.0 \quad (2)$$

$$0 \leq VR \leq 1.0 \quad (3)$$

$$0 \leq VR + VC \leq 2.0 \quad (4)$$

The sum of VR and VC (VR+VC) corresponds to a black level (=0) through a white level (=2.0), therefore, any color is within the range 0 to 2.0.

$$\text{Color-difference signal information} = VR/(VR+VC), \text{ or } VC/(VR+VC) \quad (5)$$

In an achromatic, the proportion of a red level VR or a cyan level VC both included in the total level (VR+VC) is constant, accordingly;

$$VR/(VR+VC) = VC/(VR+VC) = 0.5 \quad (6)$$

In contrast, in the case of chromatic, the proportion can be expressed as follows: with a red hue color;

$$0.5 < VR/(VR+VC) \leq 1.0 \quad (7)$$

$$0 \leq VR/(VR+VC) < 0.5 \quad (8)$$

with a cyan hue color;

$$0 \leq VR/(VR+VC) < 0.5 \quad (9)$$

$$0.5 < VR/(VR+VC) \leq 1.0 \quad (10)$$

Accordingly, by using a coordinate system having two axes (VR+VC) and VR/(VR+VC), or (VR+VC) and VC/(VR+VC), chromatic colors (red hue and cyan hue) and achromatic color can be definitely separated.

Figure 12:
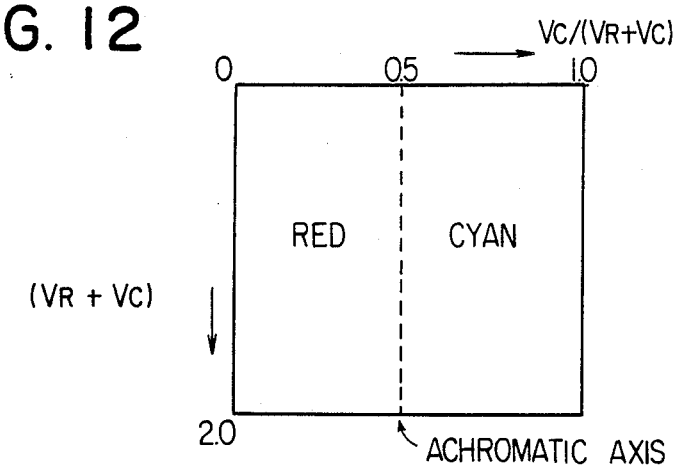

FIG. 12 shows a coordinate system, wherein its ordinate axis represents a luminance signal component (VR+VC) and its abscissa axis represents a color-difference signal component.

When VC/(VR+VC) is used as a color difference signal component, the area smaller than 0.5 represents red hue R, and the area greater than 0.5 represents cyan hue Cy. In the vicinity, where color-difference signal information=0.5, as well as in the area having smaller amount of luminance signal information, achromatic color exists.

Figure 13:
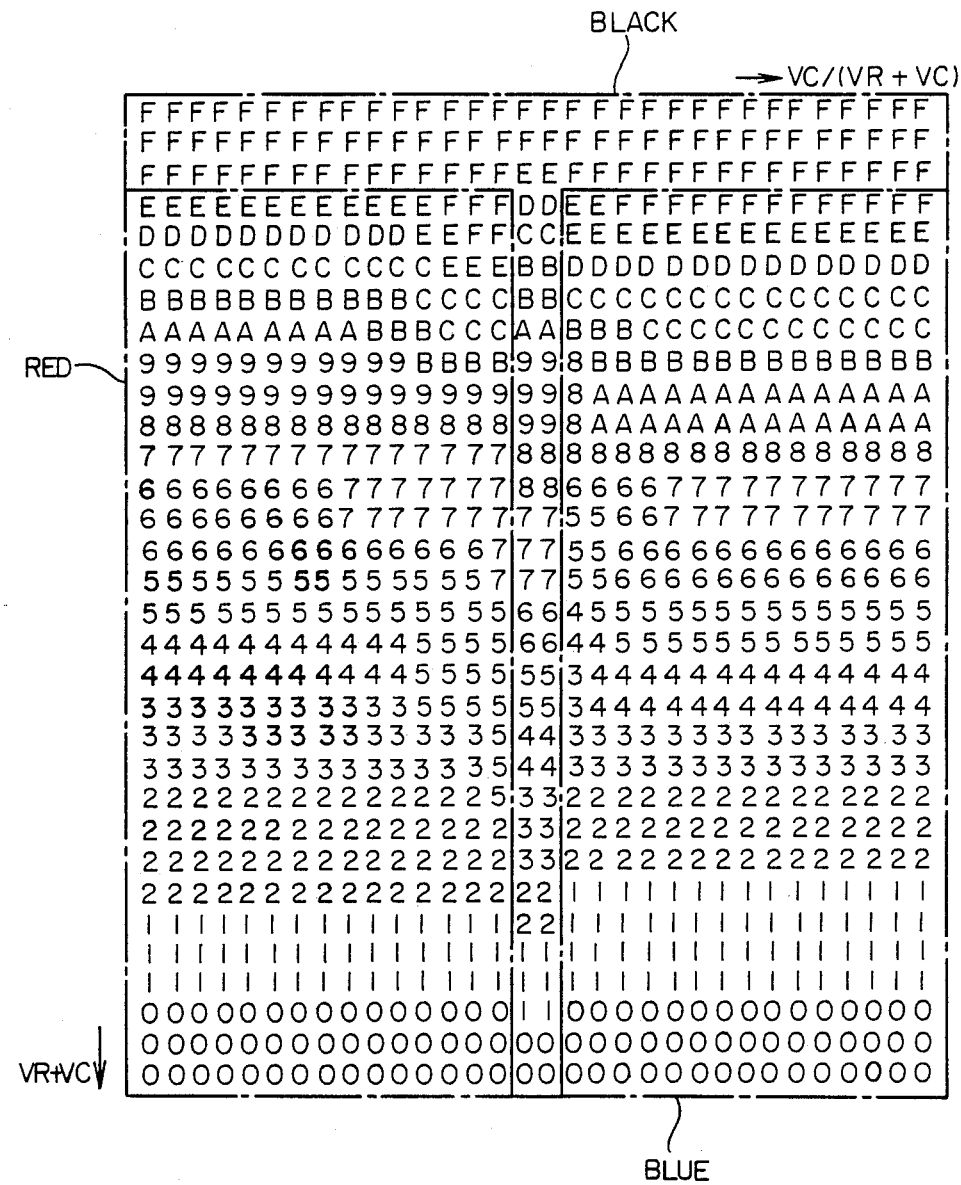
FIG. 13 illustrates one example of a color separation map.

FIG. 13 illustrates a typical example of color separation map, in which color segmentation is incorporated. As a color separation map, a ROM table is used. The figure shows one example having 32×32 blocks. For this reason, in relation to the number of address bits for this ROM table, a 5-bit column address and 5-bit row address are used. In the ROM table are stored the quantized values generated in correspondence to reflective densities of an original draft.

Figure 4:
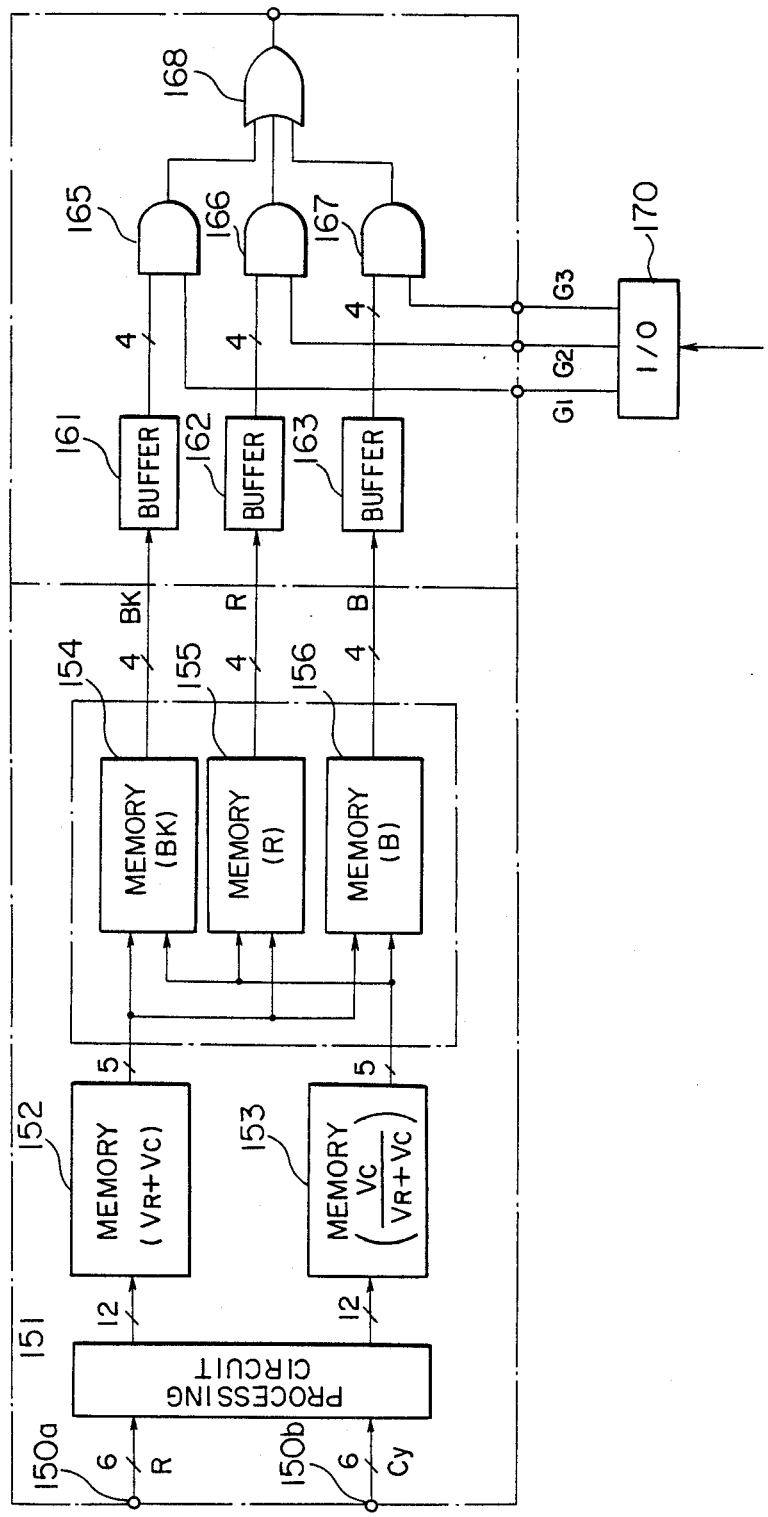
FIG. 4 is a schematic diagram illustrating a color separating circuit as ell as a color selecting circuit.

FIG. 4 is a schematic diagram illustrating one example of a color separating circuit 150 and one example of color selecting circuit 160, both of which being necessary for separating colors, as described above.

Into terminals 150a and 150b are fed red signal R and cyan signal Cy before they are separated into three colors. An arithmetic processing circuit 151 performs tone modulation, γ-rectification, and also carries out other processes. The data, after an arithmetic operation, is used as an address signal for the memory 152 having stored the arithmetic results of (VR+VC) for determining luminance signal data, and is also used as an address signal for the memory 153 having stored the arithmetic results of color-difference signal data VC/(VR+VC).

Each output of these memories 152 and 153 is used as an address signal for the memories 154 through 156. The memories 154 through 156 independently use a data table where the data of a color is stored separation map corresponding to a specific color. The memory 154 is for the black signal BK. The memory 155 is for the red signal R. The memory 156 is for the blue signal B.

As can be understood from the color separation map in FIG. 13, by detecting the levels of red signal R and cyan signal Cy, the color signals, R, B and BK respectively for red, blue and black, can be separately outputted based on the color information of an original color draft.

A specific color signal being read out from each of memories 154 through 156 is fed into the color selecting circuit 160.

The color selecting circuit 160 includes buffer circuits 161 through 163 independently corresponding to each color. The color signals, independently obtained from the buffer circuits, are supplied respectively into AND gates 165 through 167, where only a required color signal is outputted. The output is supplied into the image processing circuit 2 via an OR gate 168. In reality, into the AND and OR gates 165 through 168 are inputted 4-bit data.

The above-mentioned gate signals G1 through G3 are supplied into the AND gates 165 through 167. The gate signals G1 through G3 are supplied from the system control circuit 80 via an I/O port 170.

Figure 5:
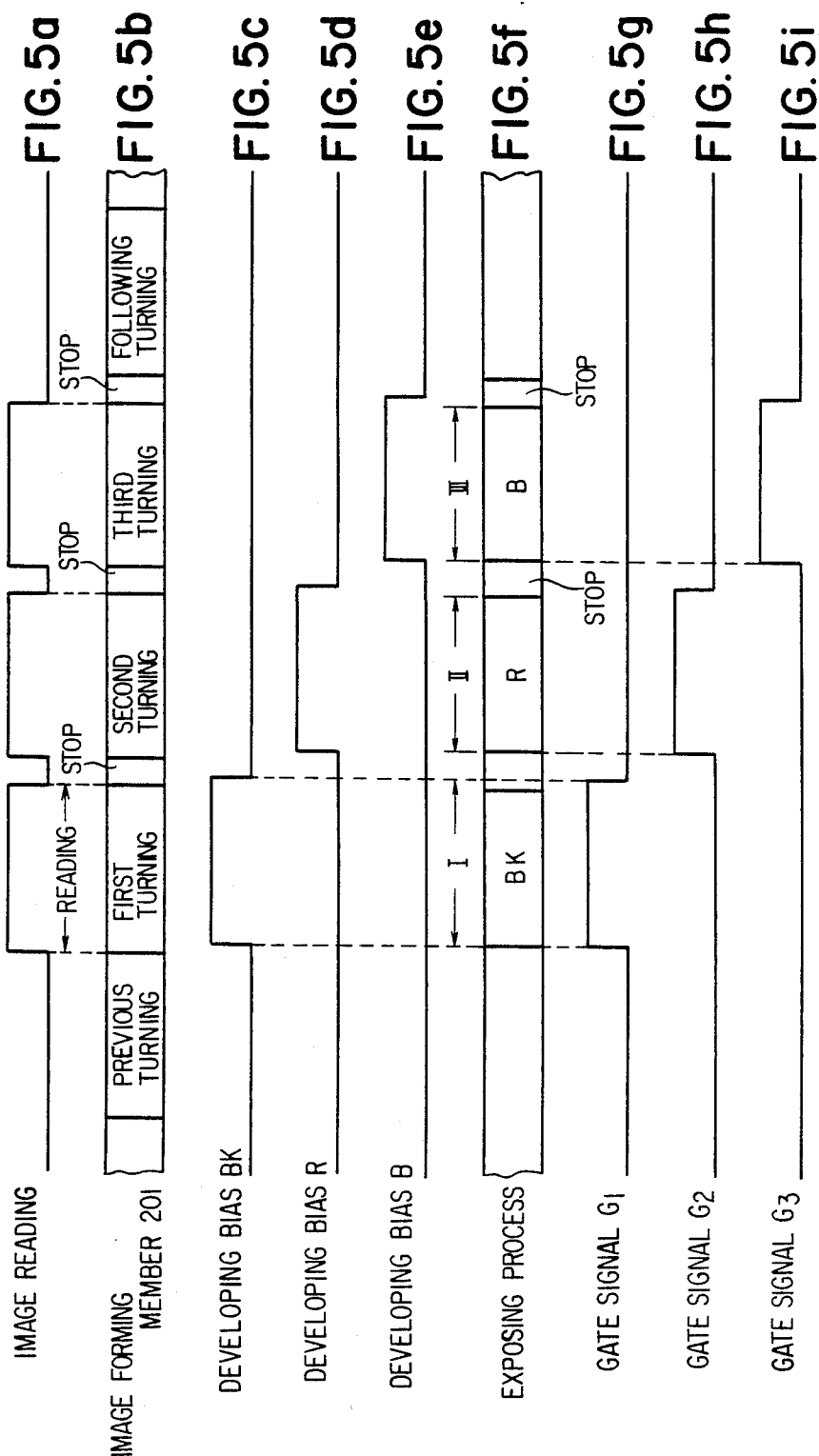
FIGS. 5a-5i and 6a-6i are explanatory drawings jointly illustrating one example of image forming process.

The gate signals correspond respectively to each color signal. In an ordinary color recording mode, the gate signals G1 through G3 comprising three phases and being synchronous with the rotation of image forming member 201 are generated (FIGS. 5, 5-g to 5-i). Simultaneously, developing biases shown by 5-c through 5-e in FIG. 5 and being synchronous with the rotation of image forming member 201 are supplied respectively into the developing devices 205 through 207.

Consequently, in accordance with each of exposing processes I through III (5-f in the figure) respectively corresponding to respective color, the exposing and developing are sequentially carried out.

Figure 6:
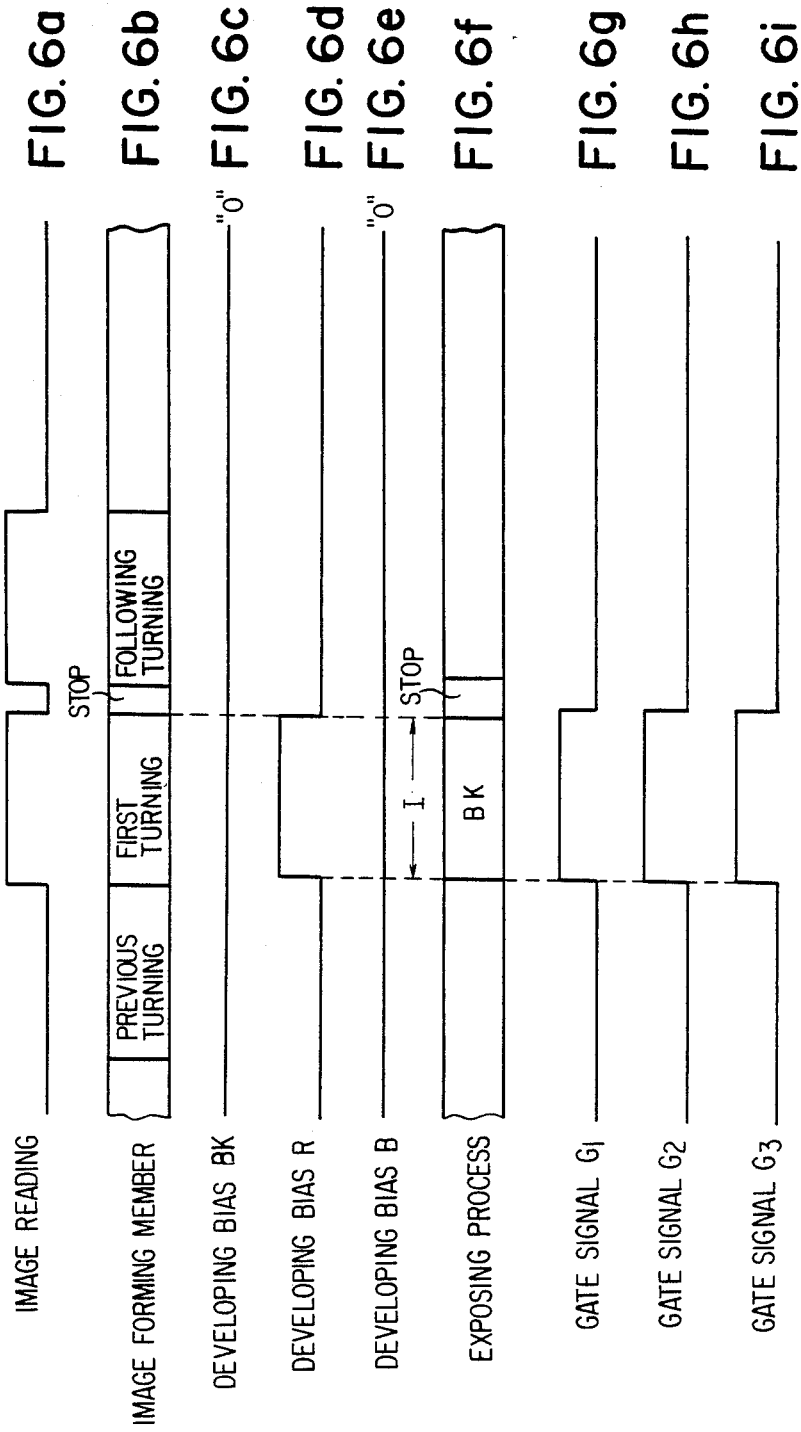

In contrast, in a color-designated recording mode, a designated image forming process with an specific color is carried out. Accordingly, the three selecting signals G1 through G3 (6-g through 6-i in the figure) are generated, in a common phase, regardless of a designated color signal. The example in FIG. 6 illustrates a mode where red has been designated. In this way, all the color signals as synthesized into one are supplied into the image processing circuit 2.

At the same time, a developing bias (6-d in FIG. 6) is supplied only into the corresponding developing device, activating it. Accordingly, only the developing device 206 containing red toner (developer) is driven to record a red image, regardless of the color information on the original color draft 52.

The image forming process with another designated color (black or blue) is identical to that of red color, accordingly, detailed description is omitted.

Usually, a plurality of developing devices are sequentially and selectively driven in correspondence to a plurality of color signals, so as to execute image forming processes such as exposure and development.

However, once a designation is effected with a recording color designation means, the image forming process with only one color is carried out. Once this type of color designated recording mode is selected, the output status of a plurality of separated color signals are controlled by control signals from the recording-color designation means, and, simultaneously, a developing device corresponding t the recording color is designated.

For instance, if red is selected with the recording-color designation means, one color signal synthesized from a plurality of color signals is outputted. Simultaneously, a developing device containing a developer (toner) of red is selectively driven.

In this case, therefore, even if an original color draft contains a plural type of color information, the designated image area is uniformly recorded in red.

Figure 7:
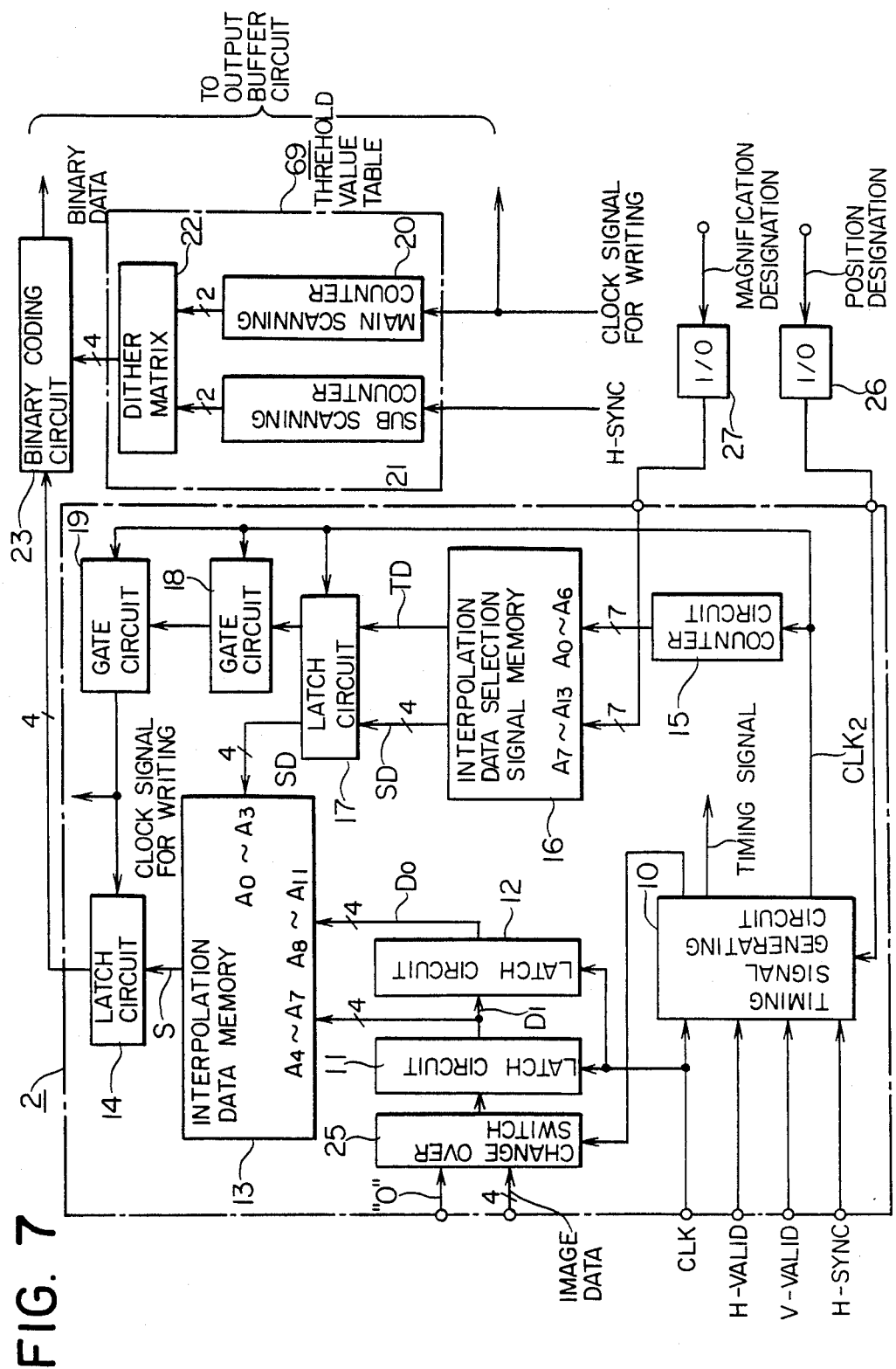
FIG. 7 is a schematic diagram illustrating an image processing circuit.

FIG. 7 is a block diagram illustrating one example of an image processing circuit 2.

In this case, an enlarging or reducing operation is possible with the magnification within the range of 0.5 to 2.0 in of 1.5% (as an approximation of 1/64) increments.

Figure 40:
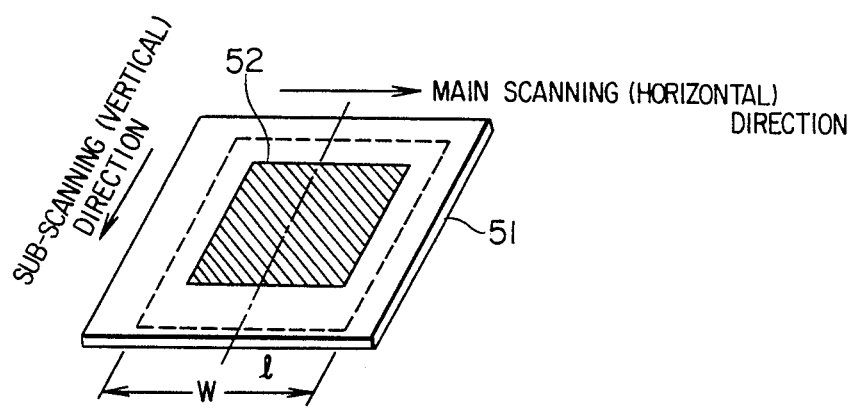
FIG. 40 is an explanatory diagram of an image reading system.
Figure 41:
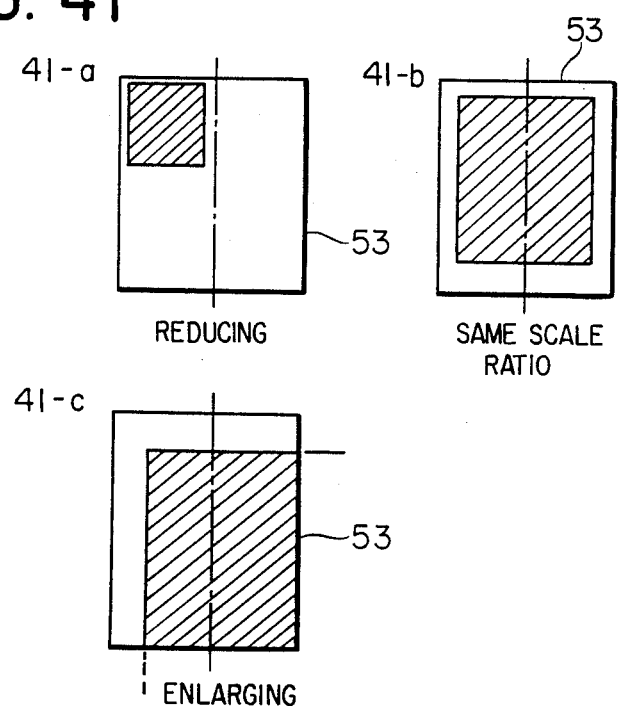
FIG. 41 is one example of a recorded image of this system.

In principle, the invention also employs the interpolation method, where image data is added for an enlarging operation and thinned out for a reducing operation. Electrical signal-processing is used for enlarging or reducing in the main scanning direction shown in FIG. 40. For enlarging or reducing in the sub-scanning direction, the shifting speed of an photoelectric conversion element or image information is changed while the exposure time of the photoelectric conversion element is set constant.

A slower shifting in the sub-scanning direction enlarges an original image, and a faster shifting reduces the image.

In FIG. 7, a timing signal generating circuit 10 generates a timing signal and the like to control the processing-timing of the image processing circuit as a whole. Into the circuit 10, like into CCDs 56 and 56', are supplied a synchronizing clock signal (CLK), horizontal direction valid signal (H-VALID), vertical direction valid signal (V-VALID) and horizontal direction synchronizing signal (H-SYNC) are supplied.

The outputs of timing signal generating circuit 10 include, other than the timing signals, mentioned above, a clock signal CLK2 having a frequency, twice that of the synchronizing clock signal CLK, to enable the real-time processing with a magnification up to 2.0.

The image data having 16 tone levels transmitted from the color selecting circuit is fed into a pair of latch circuits 11 and 12 being connected in series by a switching circuit 25, and, among 4-bit configured image data, image data D1 and D2 respectively representing one of neighboring two pixels are latched at the timing corresponding to the synchronizing clock signal.

The switching circuit 25 is used for truncating the image information other than for a designated area if an image area is designated for reading, as shown in FIG. 42. Accordingly, the switching circuit 25 is controlled so that "0" data (data for a white image) are latched in the non-designated area. The control signal for switching circuit 25 is generated by the timing signal generating circuit 10. Of course, the circuit 10 is also controlled based on the reading-area designating data supplied via an I/O port 26.

The image data D0 and D1 latched by the latch circuits 11 and 12 are used as address data for an interpolation data memory 13.

The interpolation data memory 13 is a data table, in the form of a ROM or the like, storing new image data (which is, hereinafter, called interpolation data) being referred based on pairs of adjacent image data.

As address data for the interpolation memory 13, a data selection signal SD is used in addition to a pair of latch data D0 and D1, mentioned above.

The data selection signal SD is used as address data to determine data among a group of data tables selected by a pair of latch data D0 and D1, which data should be used as interpolation data.

The data selection signal SD is, as described later, determined by a designated magnification for enlarging or reducing operation.

Figure 14:
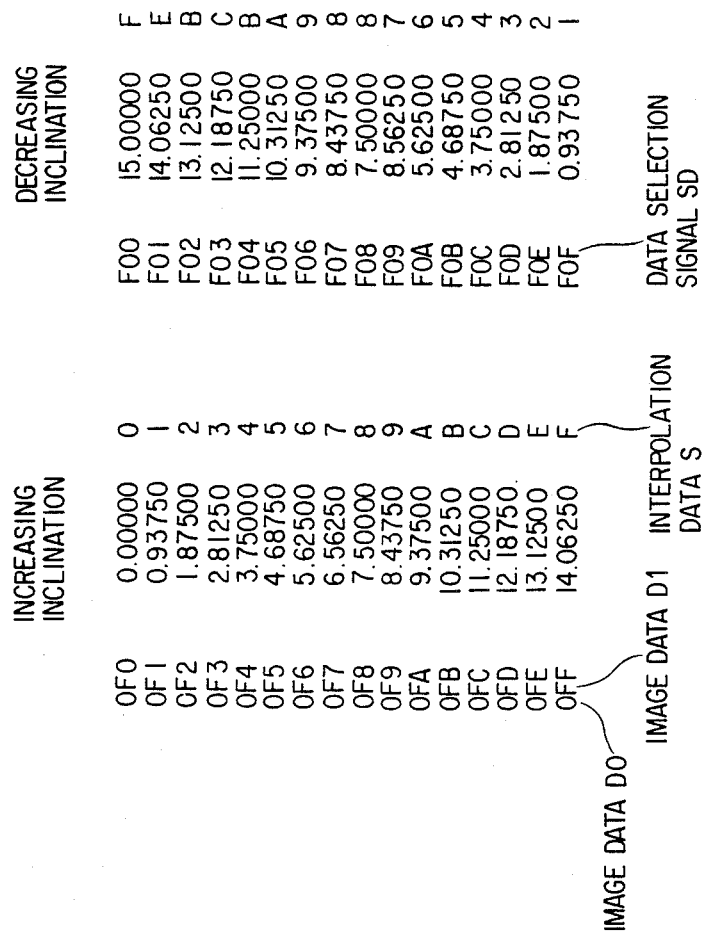
FIG. 14 illustrates one example of a group of interpolation data used in an image enlarging operation.

FIG. 14 illustrates one example of a group of interpolation data S selected by latch data D0 and D1, and data selection signal SD. In this embodiment of the invention, the values estimated through linear interpolation based on data D0 and D1 are used as interpolation data.

In FIG. 14, interpolation data (4-bit) S is outputted in 16 tone levels. The image data D0 and D1 independently have 16 tone levels. Consequently, the interpolation data S involve 16×16=256 forms of data blocks.

With the assumption that D0=0, and D1=F, FIG. 14 lists, for both the increasing and decreasing inclinations, the theoretical values (five-digit fraction) independently corresponding to each step in linear interpolation and the real values of interpolation data S stored in the memory.

In reality, the interpolation data S are stored in the forms shown in FIG. 15. However, the data are examples, where D0=0 and D1=0 to F.

In FIG. 15, ADRS means a base address. Under the assumption that D1 has a level ranging from 0 to F when D0=4, the figure illustrates the correlation between the data selection signal SD (data 0 through F arranged horizontally) and the interpolation data S to be outputted. An address data ADRS being added to a corresponding value of data selection signal SD in the horizontal axis makes the real address for the interpolation data memory 13.

For example, in the case where D0=4 and D1=F, if data selection signal SD=0, 4F0 is addressed and then 4 is outputted as the interpolation data S.

While SD=F, 4FF is addressed and then E is outputted.

The interpolation data S outputted from the interpolation data memory 13 is latched by the latch circuit 14.

Numeral 16 in FIG. 7 designates an interpolation data selection memory storing the data selection signal SD. Data-table forms are used for this memory too. The memory stores data (data selection signal SD) used as addresses for selecting interpolation data.

FIG. 16 shows one portion of data selection signals SD used in an image-enlarging operation. These example data are those when a magnification M is set at 124/64, and the magnification can be set in 1/64 increments. In this figure, the symbol "*" denotes invalid data.

With such an arrangement for setting a magnification in 1/64 increments, the recurring processing cycle comprises 64 phases, as shown in FIG. 16. If a magnification is 124/64, since the numbers of the interpolation data to be outputted during 64 phases are 124 dots, a sampling interval is 64/124 (=0.51613). Accordingly, the correlation between a sampling position (theoretical value) corresponding to a phase (or processing order) in recurring cycle and a data selection signal SD being correspondingly referred is illustrated, here.

In the data selection signal SD at the phase "0" of recurring cycle, the data in the former digit (0) represents the data selection signal SD corresponding to the sampling position (0.0000), and the data in the latter digit (8) represents the data selection signal SD corresponding to the sampling position (0.51613). The values of these data selection signals SD vary according to a phase in the recurring processing cycle.

In phases 15, 32 and 48, there are no values in the latter digit of data selection signal SD. This means there is only one data, respectively in these phases.

The data, mentioned above, are actually stored in the interpolation data selection memory 16 in the form as shown in FIG. 17, wherein a data in the former digit shows the data of data selection signal SD being referred using a base address (in vertical axis) as well as a step number (in horizontal axis), a data in the latter digit is a data (being called processing-timing signal TD) used for controlling writing clock signal.

A processing-timing signal, "1", causes writing possible (writing enable) state, and the signal, "0", causes writing inhibited. Accordingly, the data "00"s in the figure represent invalid data.

FIG. 18 lists one portion of a data table of interpolation data selection signal used in an image reducing operation. These example data are for a reducing magnification 33/64. In this figure, the symbols, "*"s, represent invalid data being thinned out. This data selection signal is also stored, in the memory, in the form shown in FIG. 19.

As shown in FIG. 7, magnification signals predetermined with an operation/display part 75 are supplied as address data into address terminals A7 through A13, for high order seven bits, on the above-mentioned interpolation data selection memory 16, via an I/O port 27. Counter outputs from a counter circuit 15 are supplied as address data into address terminals A0 through A6 for low order seven bits. For this reason, the synchronizing clock signal CLK2 is supplied into the counter circuit 15.

The interpolation data selection signal memory 16 outputs a processing-timing signal TD in addition to the interpolation data selection signal SD.

The processing-timing signal TD is set at "1" level when there is interpolation data, as mentioned above, and at "0" level when there is no interpolation data or data is thinned out.

The data selection signal SD and the processing-timing signal TD are latched by the latch circuit 17. The timing for latching is controlled by the synchronizing clock signal CLK2.

The processing-timing signals TD control the timing for latching the interpolation data S being latched by the latch circuit 14. Accordingly, the processing-timing signals TD are supplied to the latch circuit 18, where delayed for an access time of the interpolation data memory 13.

The processing-timing signals delayed by a specific duration (one cycle of the synchronizing clock signal CLK2) are supplied into the gate circuit as its gate signals. To control the gate circuit 19, the synchronizing clock signals CLK2 are supplied into the circuit, so that it opens when the processing-timing signal TD is at "1" level and closes when the same signal is at "0" level. Therefore, the circuit outputs a clock signal only when the signal TD is "1".

The writing clock signal outputted from the gate circuit 19 is used as a latch pulse for the latch circuit 14, which in turn latches only the valid data among interpolation data S outputted from the interpolation data memory 13. The writing clock signal is also used as a writing clock signal for an output buffer circuit 90 in the after stage.

The principal components of the image processing circuit 2 have been described, above. The output data from the image processing circuit 2 is binary coded, then supplied into the output device 65 via the output buffer circuit 90 (whose details are given later).

One example of circuit configuration for binary coding is described by referring to FIG. 7 again.

In this figure, a threshold value table 69 comprises a main scanning counter 20 counting the writing clock signal, a sub scanning counter 21 counting the horizontal synchronizing signal, and a dither matrix 22 in the form of a ROM outputting a dither threshold value based on the values counted by these counters 20 and 21.

In a binary coding circuit 23, the image data is binary-coded pixel by pixel by comparing the image data outputted from a latch circuit 14 to the dither threshold values from a dither matrix.

The threshold value data is selected based on the control signal from a system control circuit 80. More specifically, if an original draft being read is a line drawing, the data of specific threshold value corresponding to its density is used. FIG. 43 lists one group of threshold value data which are hexadecimal values.

Figure 46:
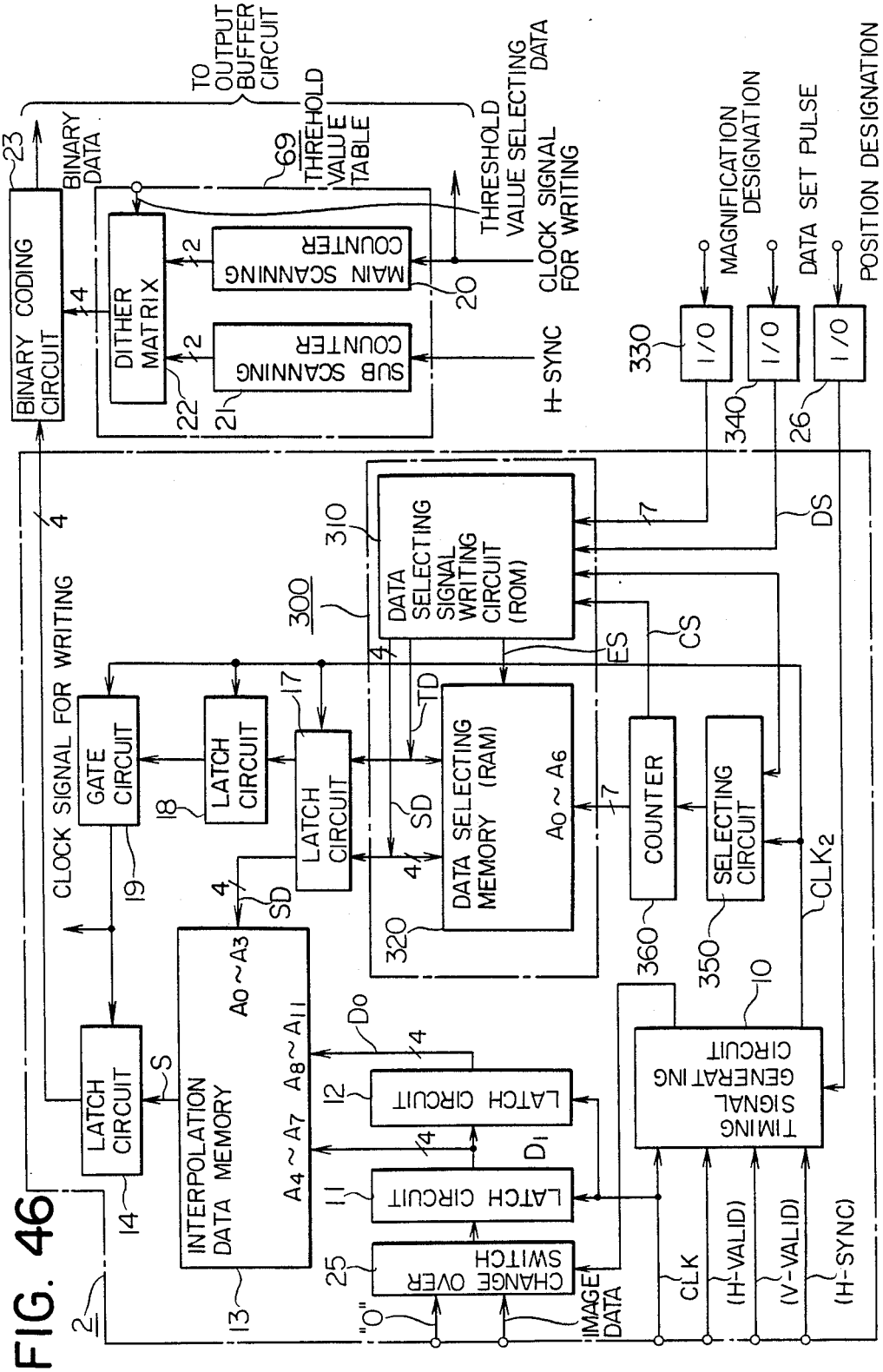
FIG. 46 is a schematic diagram illustrating the image processing circuit in FIG. 7 into which an improvement has been incorporated.

In this case, threshold values are also respectively selected as per color signals R, B and BK by threshold value selecting data as shown in FIG. 46, refering the color density of color signals R, B and BK. (Description about FIG. 46 will be followed later in detail.)

Threshold value data may be inputted by operater or also may be automatically inputted according to the result of measurement of respective color density in the time of exposing process.

Additionally, if an original draft is a photographic image or the like, the binary-coding with dither method is preferable. In this example, a dither matrix is used as threshold value data.

Figures 44, 45:
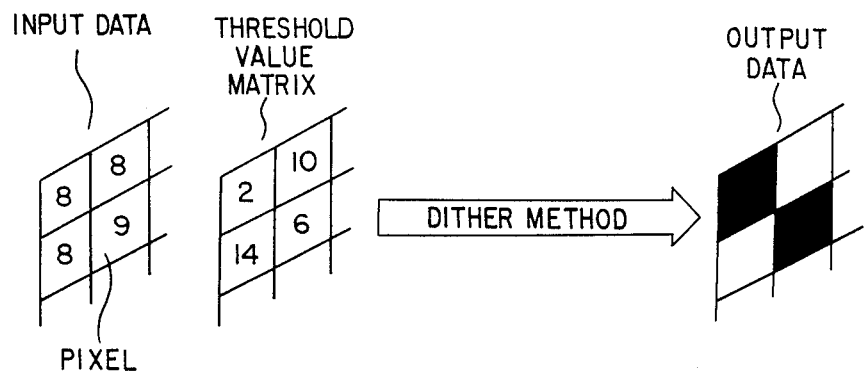
FIG. 44 contains tables independently illustrating one example of threshold value data matrix for a photographic image.
FIG. 45 is an explanatory diagram illustrating one example of recording with a dither image.

As the dither matrix, in this example, three dither matrixes are provided, and one of them is selected according to the density of original draft 52. As the dither matrixes, those independently comprising 4×4 values can be used. When the original draft has a smaller density, a dither matrix in FIG. 44-a is selected. If the density is normal, a matrix in FIG. 44-b is selected. If the density is larger, a matrix in FIG. 44-c is selected.

An operator may, based on the density of an original draft, manually select the threshold data used for a line drawing, or the dither matrix used or a photographic image. However, such a selection can be conveniently effected by an automatic system. With an automatic selection system, the densities on the total area of original draft 52 are detected, and a most proper dither matrix or the like is selected by the control command from the system control circuit 80.

As the dither images based on dither matrixes, a dither image obtained by a systematic dither method, wherein only one threshold value is contained in unit area having a maximum dither matrix area (4×4 unit area in FIG. 44), and a dot dispersion type dither image, wherein threshold values can be dispersed evenly into a dot arrangement, are favorable, rather than the dither images by the random or conditional dither methods. The Bayer type dither image, wherein the threshold values are completely dispersed, is most favorable.

If binary-coding is effected after an enarging or reducing process, the quality of image does not deteriorate, because an halftone image itself is enlarged or reduced, then binary-coded.

Additionally, the enlarging or reducing is carried out after an original image is separated into a plurality of color signals. This arrangement enables a single separation map to accomplish the enlarging or reducing regardless of a magnification. Accordingly, the color separation characteristics do not vary corresponding to an enlarging or reducing magnification, enabling color separation with a fidelity to an original color image.

Furthermore, by selecting a threshold value table to generate multiple values corresponding to a separated independent color, the color recording with a high fidelity to an original color image can be achieved.

Figure 20:
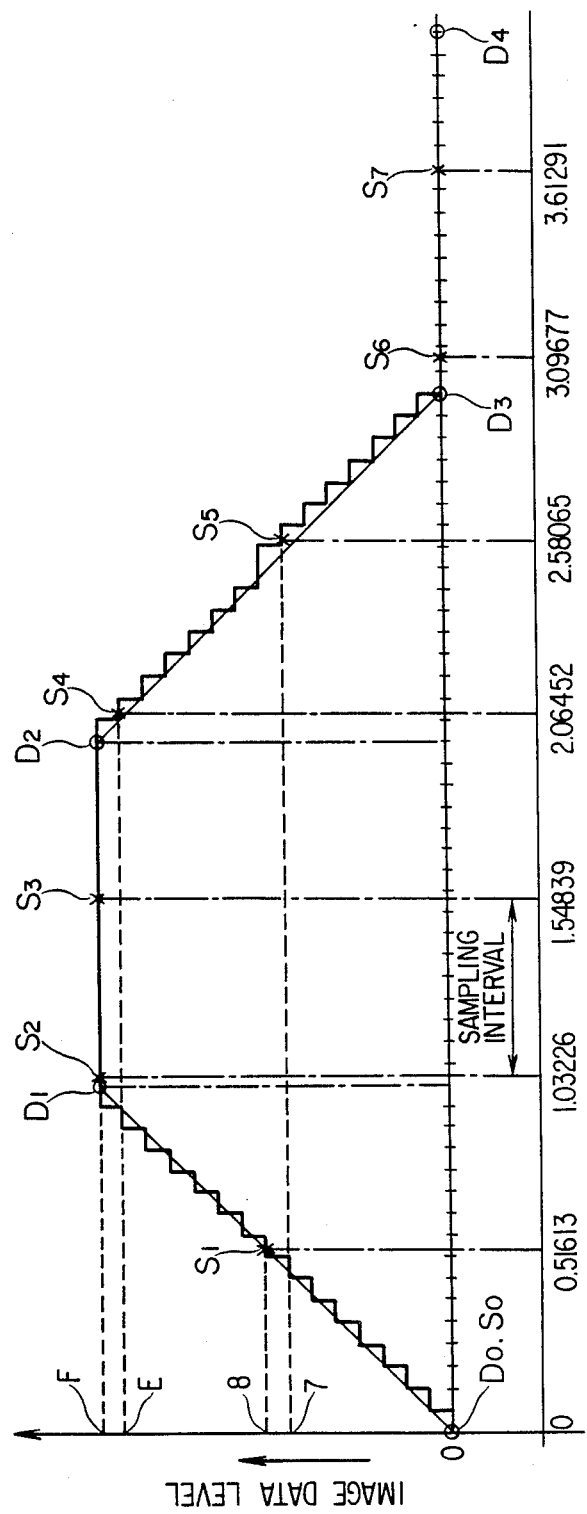
FIG. 20 is a signal waveform diagram describing an image enlarging function.

Next, the image processing operation of the image processing circuit 2 is described in detail, firstly using an enlarging operation with the reference to the figures starting with FIG. 20. For the convenience of discussion, a magnification M is assumed to be 124/64 (=1.94).

FIG. 20 is an analogue presentation of the correlation between the original data and the post-interpolation data, wherein D represents the original data, and S the post-interpolation output data.

In this case, the correlation between the image information levels and the post-interpolation data is identical to that of FIG. 14. Additionally, the correlation between the sampling pitch in interpolation operation and the data selection signals SD is identical to that of FIG. 16.

Figure 21:
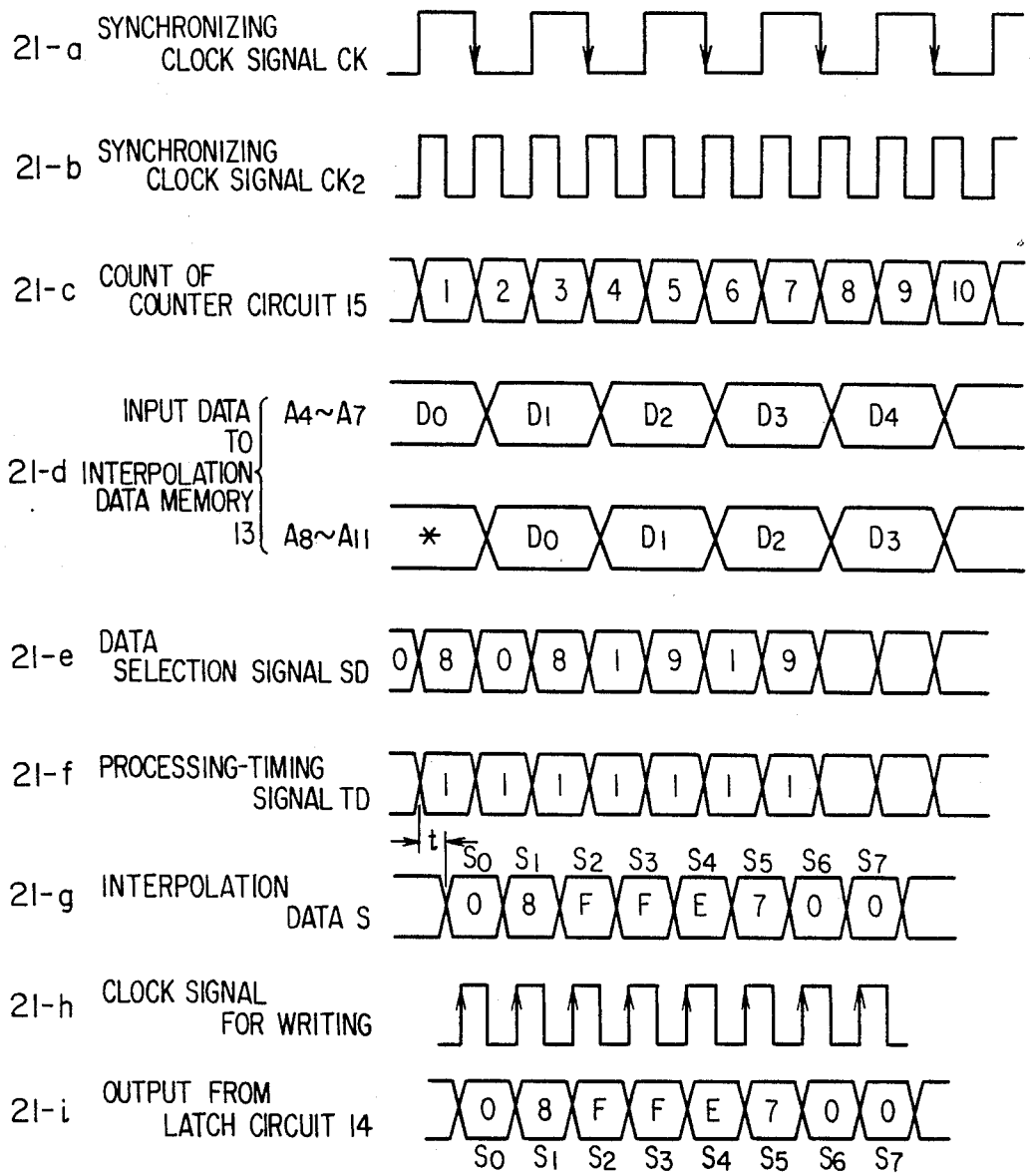
FIG. 21 is a timing chart illustrating this function.

FIG. 21 is the timing chart illustrating the configurations of various signals in this interpolation operation.

Accordingly, the original image data obtained from the color selection circuit 160 are assumed to be D0(0), D1(F), D2(F), D3(o) and D4(0). Being synchronous with the synchronizing clock signal CLK, D1(F) is outputted from the latch circuit 11, and D0(0) from the latch circuit 12.

At the same time, based on the signals for externally designated magnification as well as the output from counter circuit 15, the data table shown in FIG. 16 is referred, and 0,8; 0,8; 1,9; 1,9; ... (FIG. 21-e) are outputted as data selection signals SD. As the processing-timing signals TD, 1, 1, 1, ... (FIG. 21-f) are outputted.

The interpolation data table is referred to based on the image data D0 and D1, and the data selection signals SD, the interpolation data memory 13 outputs the necessary interpolation data S (FIG. 21-g).

The data selection signals SD, between the image data D0(0) and D1(F), are 0 and 8, accordingly, 0 and 8 are outputted as the interpolation data S0 and S1.

The data selection signals SD, between the image data D1(F) and D2(F), are 0 and 8, accordingly, F and F are outputted as the interpolation data S2 and S3. The data selection signals SD, between the image data D2(F) and D3(0), are 1 and 9, accordingly, E and 7 are outputted as the interpolation data S4 and S5. The data selection signals SD, between the image data D3(0) and D4(0), are 1 and 9, accordingly, 0 and 0 are outputted as the interpolation data S6 and S7.

Corresponding to the image data D5, D6, ... following the similar data, above, the interpolation data S are similarly read out.

Consequently, FIG. 20 illustrates the data after interpolation being represented by "x"s. It is apparent from the figure that interpolation image having specific levels have been outputted between the original adjacent image data.

In this way, the interpolation data S0 through S7 obtained by the interpolation method are sequentially read out, and a group of interpolation data S are sequentially transmitted to the latch circuit 14 (21-i in the same figure).

At the same time, the processing-timing signals TD outputted from the latch circuit 17 are delayed for a duration t (see FIG. 21) at the latch circuit 18. The delay time t is, as described previously, a time span necessary for the interpolation data memory 13 to access the data, as well as for the latch circuit 14 to read out the interpolation data S.

The gate circuit 19 is turned on or off by the processing-timing signals TD transmitted from the latch circuit 18. Accordingly, the latch circuit 14 latches data, only when the gate circuit 19 is in the ON state, and otherwise does not latch data.

The reducing operation is described, below.

Figure 22:
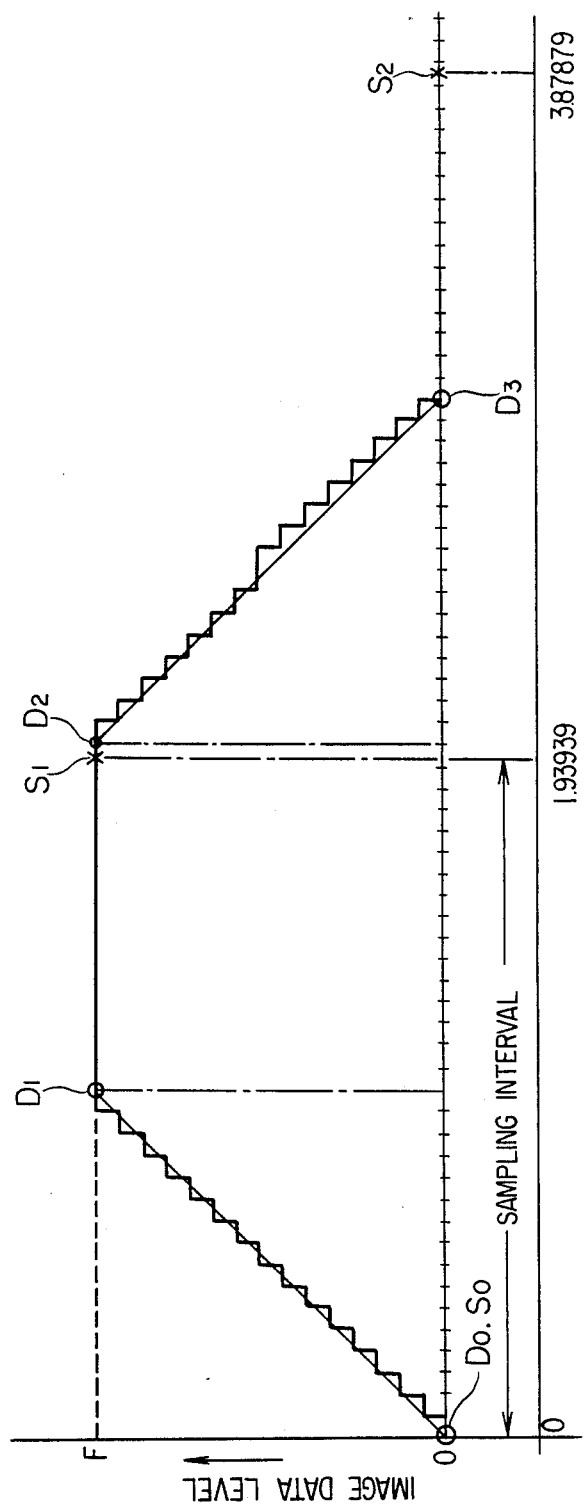
FIG. 22 is a waveform diagram describing an image reducing operation.
Figure 23:
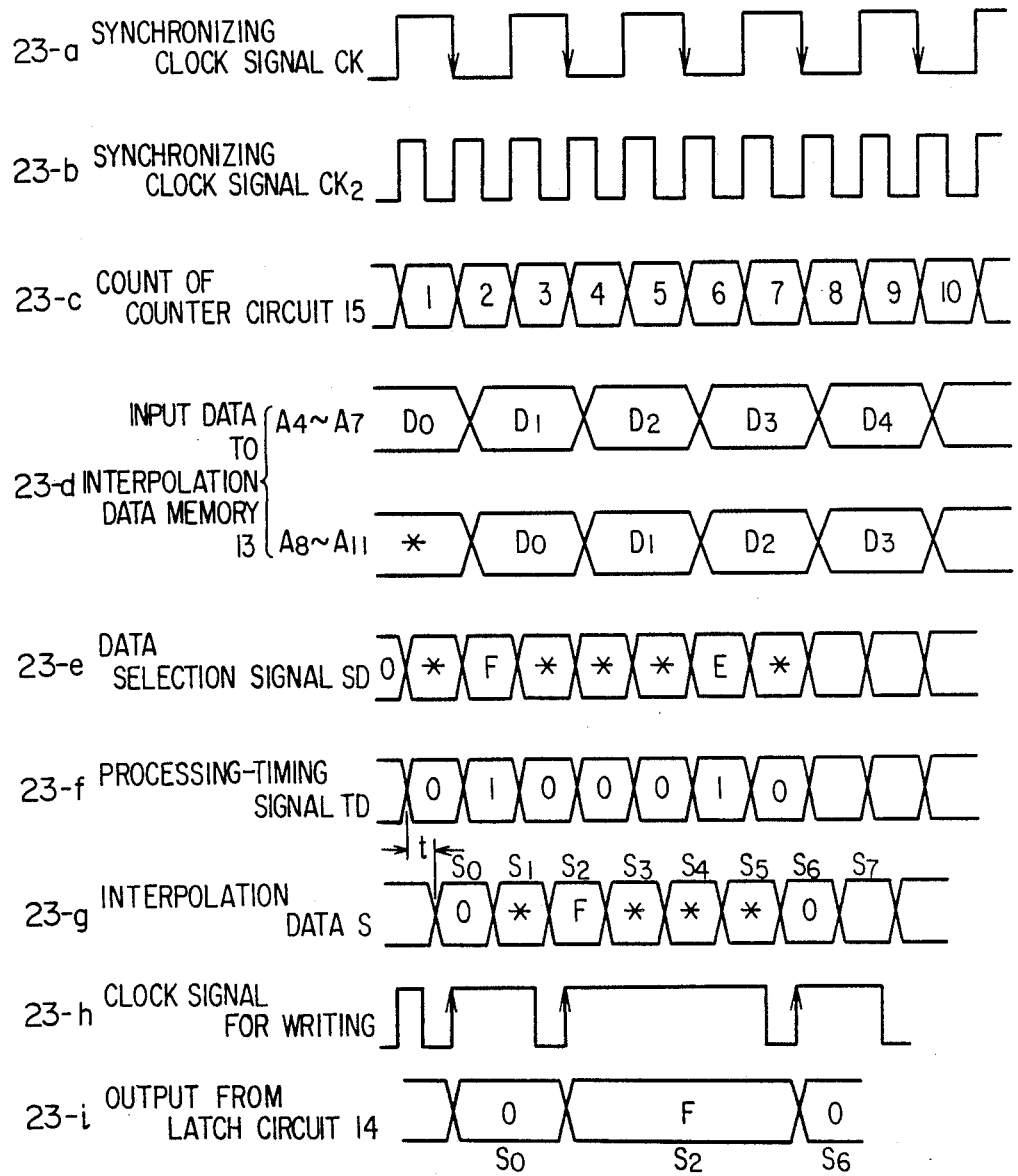
FIG. 23 is a timing chart illustrating this function.

FIG. 22 gives the analog presentation of image signals in a reducing operation, wherein the image data D0, D1, D2, D3, . . . are indicated by "o"s, and the interpoaltion data S0, S1, . . . are indicated by "x"s. FIG. 23 is a timing chart of the signals in this operation. The correlation, between the original image data D in this operation and the interpolation data S, has been already illustrated in FIG. 16. The correlation, between the data selection signal SD and the processing-timing signal TD, has been already illustrated in FIG. 19. Additionally, here, the example magnification M is 33/64, (=0.52) and the tone levels of image data are assumed to be identical to those in the previously mentioned enlarging operation.

The latch circuits 11 and 12 conjunctionally supply a pair of adjacent image data (for example, the image data D1 and D0) as the address signals to the interpolation data memory 13, and the reducing magnification (33/64) externally designated is simultaneously supplied into the interpolation-data selection signal memory 16. Also, the synchronizing clock signals CLK2 are counted by the counter circuit 15. These steps are identical to those of the previously mentioned enlarging operation.

Figure 19:
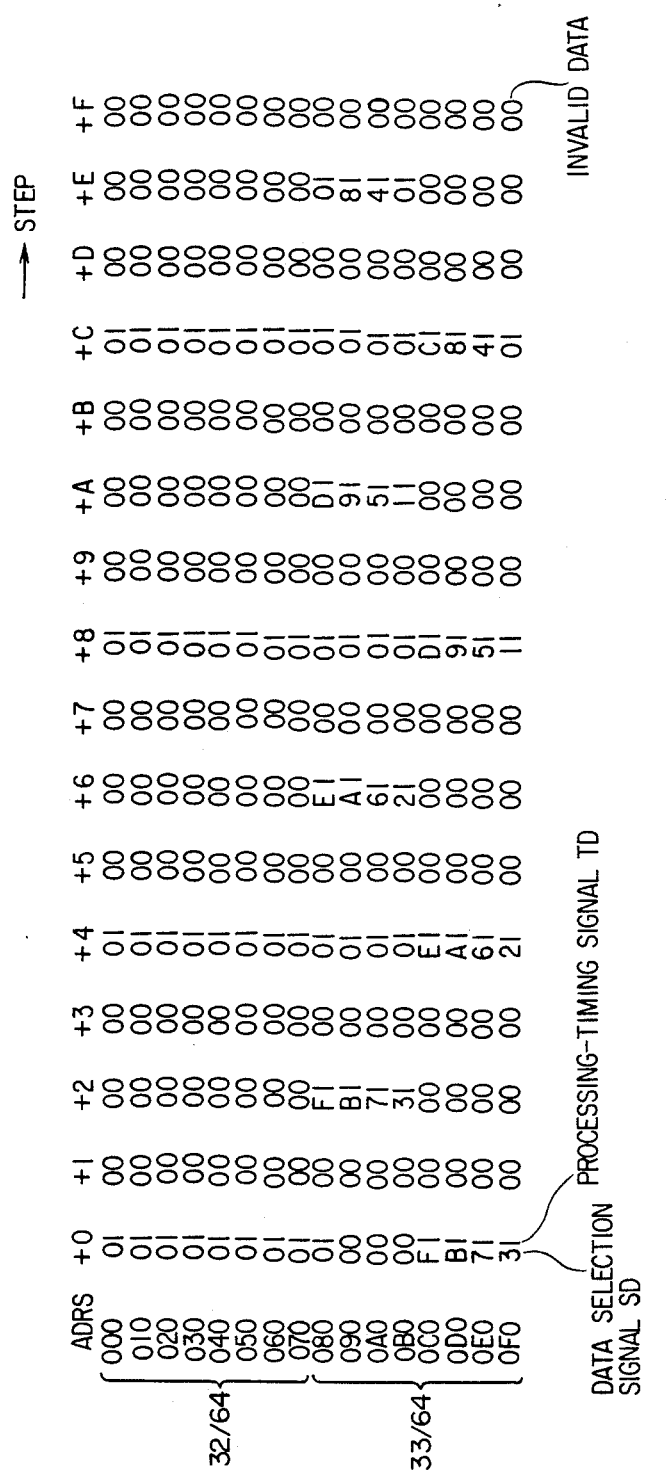
FIG. 19 illustrates the contents of a data table comprising data selection signals and processing-timing signals used in this operation.

As can be understood from FIGS. 18 and 19, the interpolation-data selection signal memory 16 outputs SD, 0,*; F, *; *, *; E, 0; . . . as the data selection signals SD, and 1, 0, 1, 0, 0, 0, 1, . . . as the processing-timing signals TD. However, each "*" indicates an invalid data, and, accordingly the 0 data have been stored in the interpolation-data selection memory 16.

Consequently, the interpolation data S shown in FIG. 22 are outputted from the interpolation data memory 13.

That is, since the data selection signals SD, between the adjacent image data D0(0) and D1(F), are "0" and "*", only "0" is outputted as the interpoaltion data S (=S0).

As the data selection signals SD, between the adjacent image data D1(F) and D2(F), are "F" and "*", only "F" is outputted as the interpolation data S1. As the data selection signals SD, between the adjacent image data D2(F) and D3(0), are "*"s, no interpolation data S are outputted. As the data selection signals SD, between the adjacent image data D3(0) and D4(0), are "E" and "*", only "0" is outputted as the interpolation data S2.

In relation to the image data D4, D5, . . . , following the above data, the interpolation data S are similarly read out.

In this way the estimated data are determined through the interpolation method based on the original image data D0, D1, . . . Accordingly, the interpolation data S0, S1, . . . are sequentially read and the interpolation data S are sequentially transmitted to the latch circuit 14.

At the same time, the processing-timing signals TD are 0, 1, 0, 0, 0, 1, . . . (23-f in the same figure), accordingly the clock signal for writing outputted from the gate circuit 19 appears as shown in FIG. 23-h and the interpolation data S0, S1, . . . after specific data being removed are outputted (23-i in the same figure).

Incidentally, in an enlarging or reducing operation, as mentioned above, new interpolation image data area is added between adjacent original pixels in original image information in order to output the new interpolation image data, or some of the image data of original pixels is thinned out, or the original values are output as they are. These types of output image data are in general called interpolation data.

With the above-mentioned embodiment, it can be understood that changing an enlarging or reducing magnification in turn changes the data selection signals SD outputted from the interpolation-data signal memory 16, and the interpolation data memory 13 is correspondingly addressed, to output the corresponding interpolation data S.

The interpolation for obtaining values between a pair of adjacent pixels, in terms of simple linear interpolation, was described, above. However, such interpolation may fail to improve the quality of resultant image, depending on the nature of an original draft.

For example, the edges should be emphasized for a line drawing (or, characters), and the tone should be more clearly defined for a photographic image.

Figure 51:
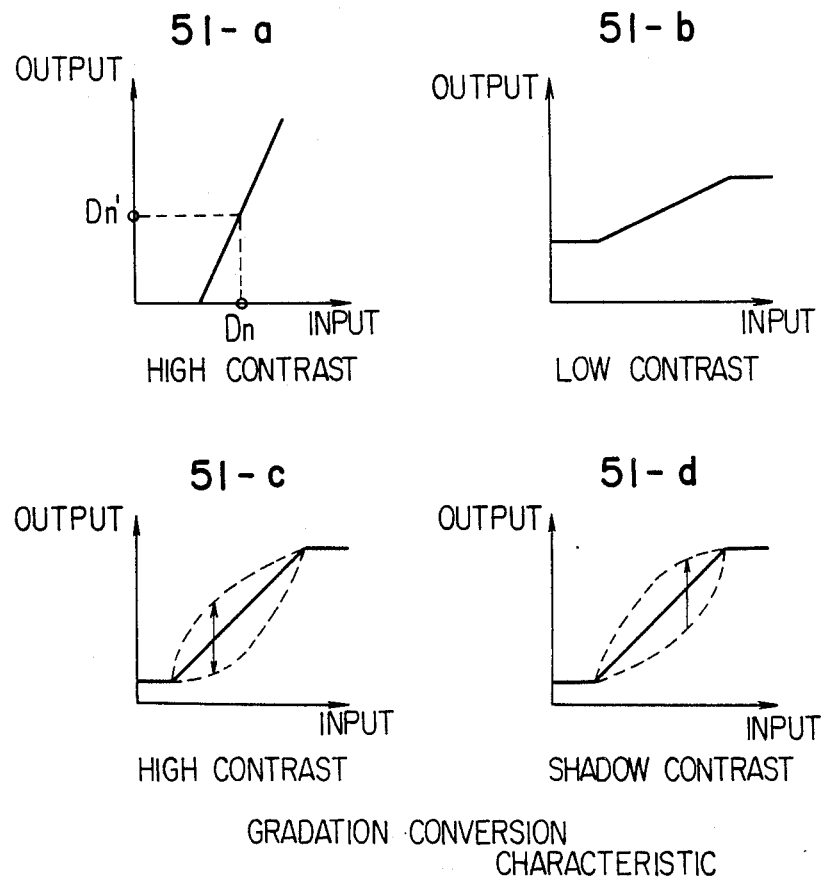
FIGS. 51-a through 51-d illustrate the tone modification characteristics.

FIGS. 51-a through 51-d independently show tone conversion characteristics. FIG. 51-a shows the characteristics with which the image information is reproduced in high contrast. FIG. 51-b shows the characteristics with which the image information is reproduced in low contrast. FIGS. 51-c and 51-d illustrate conversion characteristics with which contrast is controlled (the characteristic curves being indicated by upward and downward arrows) respectively in a highlighted area and a shadowed area.

Figure 52:
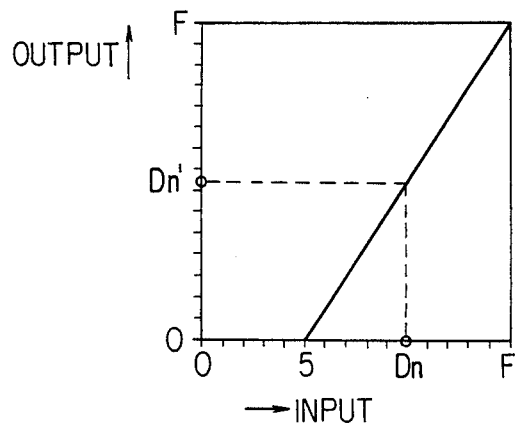
FIG. 52 is a typical graphical presentation of tone modification characteristics in high contrast.

For example, in the case of high contrast (a), the logical values of interpolation ROM 13 indicated in FIG. 15 are converted into the output Dn' on the basis of input Dn. FIG. 52 illustrates actual conversion characteristics. This example is for the case of high contrast. When the data of interpolation ROM 13 indicated in FIG. 15 are converted, by using the characteristics, the results are as shown in FIG. 53. The image processing with the interpolation ROM having such characteristics results in an outputted image having high contrast.

Another example is as follows. According to the principle of this system, the sampling of image after conversion is repeated on the specific position.

Accordingly, if the image has characteristic involving recurring noises, or an original draft actually contains recurring patterns, streaks having an identical width appear at a certain cycle. This is partly because the dither threshold values of the binary coding circuit 23 have periodicity. For example, if an 8×8 dither matrix is used, one cycle comprises eight pixels.

Correspondingly, the output data of interpolation ROM 13 is rectified, in the following manner. If the difference in levels of two adjacent image data is 1, the results of interpolation are allowed to take the levels identical to those with which the data are originally written, regardless of the selection data of data selection ROM 15. FIG. 54 indicates the example where the contents of FIG. 15 have been converted. With this example, in a section where the difference in levels of a pair of adjacent image data (original image data Da1 and Da2) is 1, the data first read is "4", and, accordingly, "4" is treated as the output of the interpolation table. This description holds for the other data.

As described above, by varying the data in the interpolation ROM in accordance with the type and characteristics of an image, it becomes possible to vary the characteristics of an image and to improve the image quality.

The selection of an interpolation table from a plurality of similar tables may be carried out with a keyboard or the like by an operator who has studied an original draft. Or, a specific data table may be selected automatically, by scanning an original draft to check the characteristics of the draft.

Figure 55:
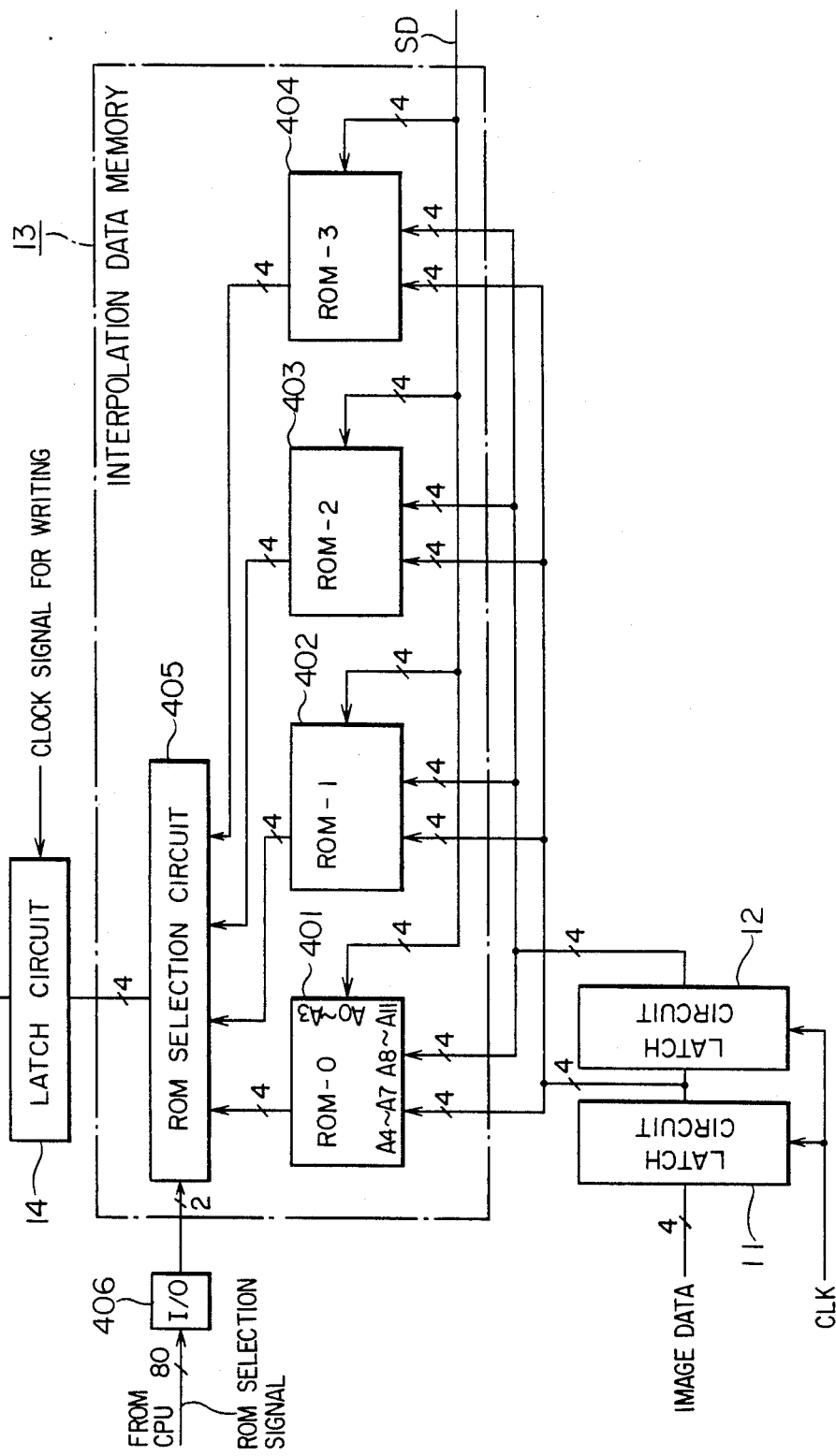
FIG. 55 shows an example of ROM selection circuit for interpolation data memory.

FIG. 55, which can be obtained by improving the interpolation data memory 13 in FIG. 7, shows an example of ROM selection circuit for interpolation data memory.

In FIG. 55, identical circuits with that of FIG. 7 are denoted with same notation.

Interpolation data memory 13 comprises a plurality of interpolation tables being stored in ROM-0 401 to ROM-3 404 which have different gradation conversion characteristics from each other.

These gradation conversion characteristics can be selected by ROM selection circuit 405 in accordance with a ROM selection signal which is inputted through I/O port 406 from CPU 80.

As can be understood from the description, above, the embodiment according to the invention has circuitry involving a ROM table, enabling the simple arrangement for setting the operational timing. Additionally, as the embodiment is provided with information, in correspondence to a magnification, in the form of a data selection ROM, and, accordingly, the operational timing can be set even with a specific magnification. Furthermore, since this embodiment is not of a type which samples, in correspondence to a clock signal of a different frequency, the post-interpolation image data. This precludes the necessity for a very-high-speed ROM as an interpolation ROM or the like. Additionally, since the system of embodiment enlarges or reduces an image using the interpolation data having incorporated correctly estimated data, an image having excellent quality can be produced at high-speed.

According to the invention, as can be understood from the description, above, the contents of interpolation data are selectable, and, accordingly, the image quality reproducing the nature of and original draft, or the image quality as arbitrarily specified can be achieved. This feature can improve the image quality as a whole.

The embodiment having incorporated a further improvement into the image processing circuit in FIG. 7 is presented in FIG. 46.

In FIG. 46, the same members as in FIG. 7 are indicated by the same numerals.

The interpolation data S outputted from an interpolation memory 13 are latched by a latch circuit 14.

Numeral 300 represents a data selection table storing the data selection signal SD. The data selection table 300 comprises a writing circuit 310 for data selection signals and a data selection memory 320. The writing circuit 310 for the data selection signals stores, block by block, the data selection signals SD determined by a specific magnification, as well as the processing-timing signals TD mentioned later. Since the data selection signals SD take a large capacity, the writing circuit 310 for the data selection signals comprises a large capacity ROM.

As the writing circuit 310 for writing data selection signals, a ROM dedicated to storing the data selection signals SD and others can be used, or a ROM for control program and built into a system control circuit 80 may be used.

The data selection memory 320 is used to write, among the data selection signals SD and the processing-timing signals TD both stored in the writing circuit 310 for the data selection signals, data selection signals SD and processing-timing signals TD both corresponding to a designated magnification. Accordingly, as the data selection signals SD in image processing, the similar signals SD written in the data selection memory 320 are used.

For this reason, a RAM being capable of high-speed writing and reading can be used as the data selection memory 320.

The magnification-designating data are, as shown in FIG. 46, supplied into the writing circuit 310 via an I/O port 330, and, simultaneously, the data set pulses DS (FIG. 48-a) are supplied into the writing circuit 310 via an I/O port 340.

At the same time, during the writing of the data selection signals SD and the processing-timing signals TD into the data selection memory 320, the data are written by using the clock pulses on the writing circuit 310 side. Accordingly, as shown in FIG. 46, a clock selection circuit 350 provided on the data selection memory 320 side selects from the synchronizing clock signals CLK2 and the writing clock signals for the writing circuit 310 side. The selected clock signals are counted by a counter 360, and the resultant outputs are supplied as the address data into address terminals A0 through A6, corresponding to 7 bits, on the data selection memory 320.

Figure 48:
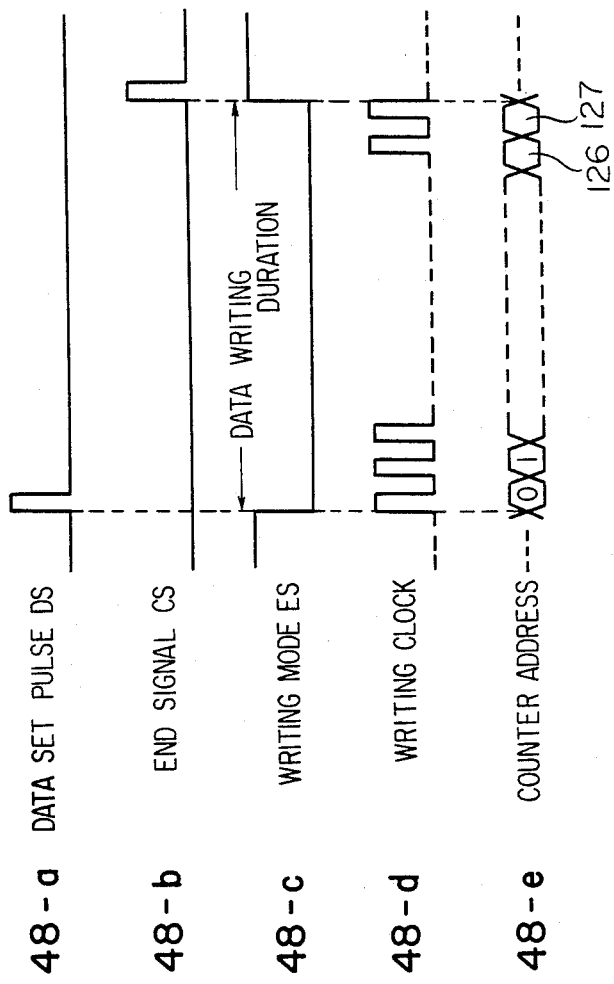
FIG. 48 is a waveform diagram used to describe the function of this circuit.

Now, assuming the sampling cycle comprises 64 phases and a maximum magnification is 2.0, the counter 360 generates carry pulses when it has counted 128 clock pulses (corresponding to the data for 128 pixels). Such carry pulses are used as the writing complete signal CS (FIG. 48-b).

Figure 47:
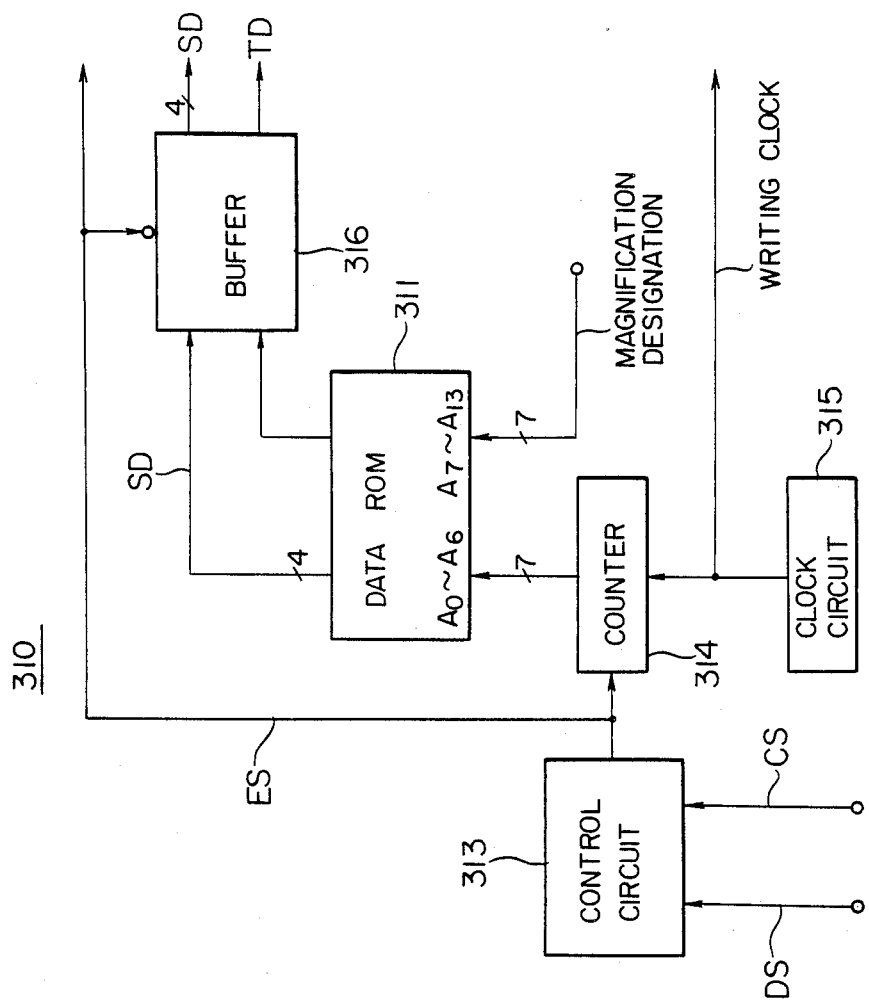
FIG. 47 is a schematic diagram illustrating one example of a data selection signal writing circuit in FIG. 46.

FIG. 47 illustrates one example of the writing circuit 310.

In this figure, numeral 311 represents a data ROM which stores the data selection signals SD and the processing-timing signals TD shown in FIGS. 17 and 19.

The data selection signals SD and others already stored in the writing circuit 310 prior to image reading are, after a magnification is externally designated, transferred based on the data set pulses DS to the data selection memory 320 from the ROM 311. The data set pulses DS are fed into a control circuit 313, shown in FIG. 47, where the control signal ES, in the FIG. 48-c, for enabling writing are generated.

The control signal ES is fed into a counter 314, which controls the counting of writing clock signals being supplied from a clock signal generating circuit 315 into it (FIGS. 48-d and 48-e). During the period T0 where the control signal ES is at "0" level, the data selection signals SD and the processing-timing signals TD both corresponding to a designated magnification are, block by block (data block indicated in FIGS. 17 and 19), synchronously with the writing clock signals from the counter 314, written into the data selection memory 320. The corresponding data are read, synchronously with a clock frequency smaller than a ordinary reading rate, from the data ROM 311 which has a greater access speed. Naturally, the above-mentioned writing timing is synchronized with the writing clock signal from the clock circuit 315.

A buffer circuit 316 is provided in order to prevent, during the image reading, the read-out-data of the data selection memory 320 from adversely affecting the data ROM 311 side. The buffer circuit 316 is active only when the control siganl ES is at "0" level. The control signal ES is also used as an enable signal for enabling data writing into the data selection memory 320 (see FIG. 46).

Once the writing of data selection signals SD into the data selection memory 320 is completed, the counter 360 output the writing complete signal CS to terminate the data writing sequence.

Then the ordinary image processing mode is initiated, and the data selection signals SD and the processing timing signals are read from the data selection memory 320.

By using interpolation data to obtain image data for enlarging or reducing, the interpolation data are obtained based on pairs of adjacent original image data. This arrangement eliminates any possibility of deteriorating the quality of recorded image in an enlarging or reducing operation.

The provisions of a large-capacity ROM as a memory in a writing circuit, as well as a writable high-speed RAM as a data selection memory, can preclude the increased cost even if an arrangement for setting a magnification in high accuracy may be incorporated. This is because the large-capacity ROM can store a large size of data including the control program usually stored in the system control circuit on the image processing system.

Figure 32:
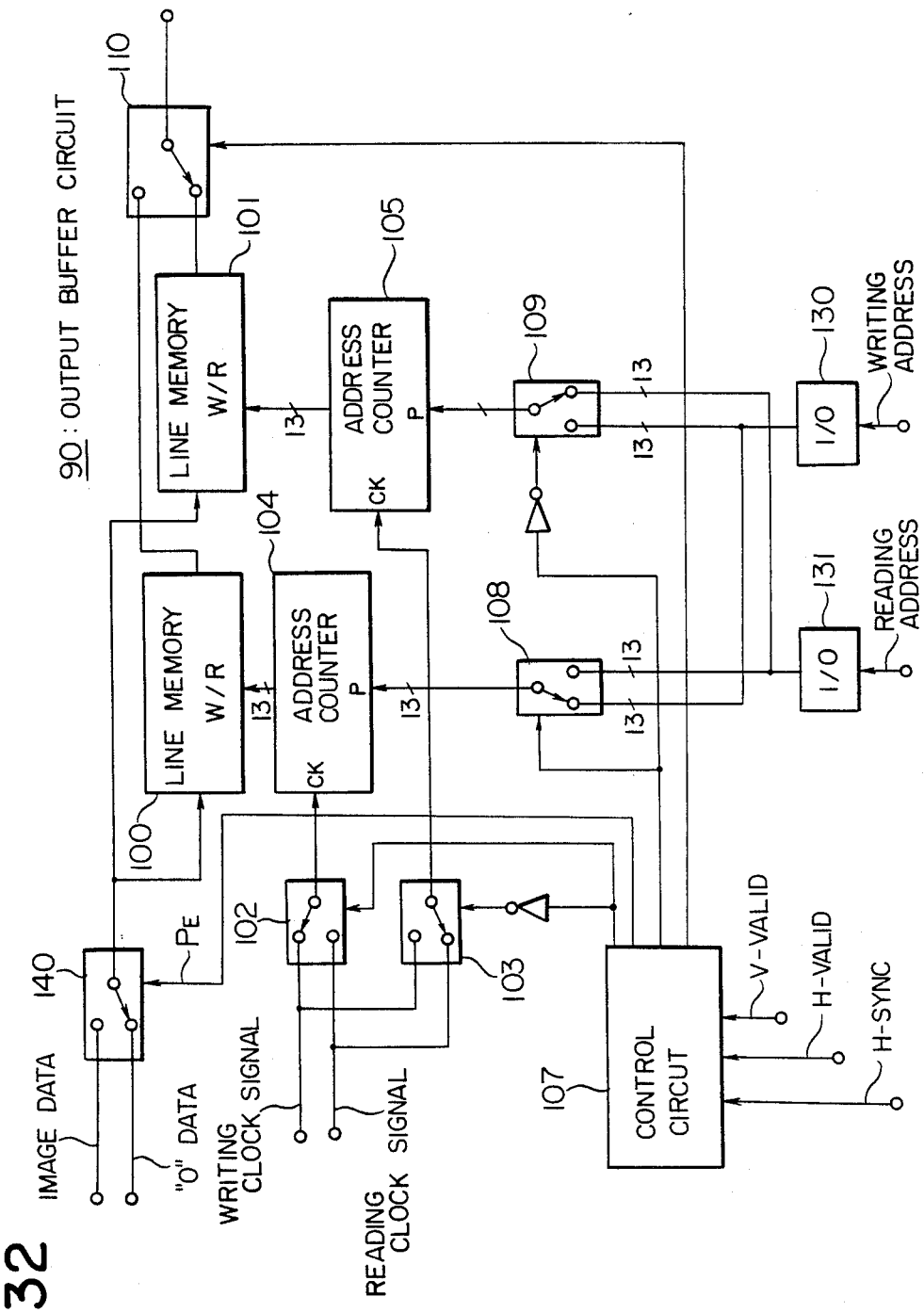
FIG. 32 is a block diagram illustrating one example of output buffer circuit.

The binary coded image data having incorporated the enlarging or reducing are supplied into the output buffer circuit 90 (see FIG. 32). In the buffer circuit 90, an initial address for reading data from or writing data into the line memory provided in the output buffer circuit 90 is controlled depending on the externally designated data including an enlarging or reducing magnification.

Firstly, the reason for controlling the initial address for reading or writing data depending on an designated magnification is described with the reference to FIGS. 24 and 25.

If the maximum image reading size of CCDs 56 and 56' is a B4 standard, and if their resolution is 16 dots/mm, the size of image data per one line is 4096 bits. To cope with a magnification up to 2.0, a line memory for storing image data having 8192-bit capacity, as shown in FIG. 24, is incorporated.

The image data are written or read so that the recorded image depends on the center (the 2048th bit).

Accordingly, in an image reducing operation to reduce an image, for example, to ½, the initial writing address of line memory is set correspondingly at an address (the 1024th address) which is one fourth of the total 4096 bits. In this case, the reduced image data are written into the line memory as shown in FIG. 24-a.

Contrary to this, the initial reading address is set at the 0th address. Correspondingly, a reducing image shown in FIG. 25-a is recorded.

Because, from the addresses 0 through 1023, the image data are uniformly at "0" level and recorded on a recording paper as "white", and the recording based on the reduced image data starts only at the 1024th address.

With the reducing magnification 32/64, for example, the writing of reduced image data starts at the 1024th address. Similarly, with the reducing magnification 33/64, the writing starts at the 992th address. With the reducing magnification 34/64, the writing starts at the 960th address.

In this way, by writing the image data so as to center-adjust the written result, and by reading based on the "0"th address, an image can be recorded on the recording paper 53 based on the center line 1 of the paper.

Consequently, the initial writing address in an reducing operation is determined by the following expression;

$$\text{Initial writing address} = (4096 - 4096 \times \text{reducing scale ratio}) \times \tfrac{1}{2}$$

In an image enlarging operation, contraly to a reducing operation, the initial reading address is regulated, because of increased image data.

When the maximum enlarging magnification is 2.0, the size of image data is double the image data for a same magnification operation.

In this case, the area of an image being recorded quadruples. Accordingly, if a B4-sized original draft is enlarged with the magnification 2.0, and if the maximum recording size of a recording paper is B4, the enlarged image is imperfectly recorded on the recording paper.

Considering this disadvantage, a natural enlarged image can be produced by providing a regulation, depending on the maximum size of a recording paper, to record the processed data of the center area of an original draft.

For this reason, in an image enlarging operation, as shown in FIG. 24-b, the total 4096 bits or 2048 bits each before and after the data corresponding to the half-point (corresponding to the location of the center line 1 of an enlarged image) of the total enlarged image data are read out, based on this half-point data.

Accordingly, with the magnification 128/64, the data in "0"th through 2074th bits, among all the enlarged image data, are ignored, and the reading-out to the line memory starts at the data in 2048th bit, consequently all the 4096-bit image data are read out.

In this case, the initial writing address is set at the address "0".

Similarly, with the magnification 127/64, the reading starts at the 2016th bit. With the magnification 124/64, the reading starts at the 1984th bit, which means the image data comprising total 4096 bits are read out.

With another magnification, naturally, the image data are selected based on the initial reading address corresponding to the magnification.

Consequently, an initial reading address in an enlarging operation is determined by the following expression;

$$\text{Initial reading address} = (4096 \times \text{magnification} - 4096)/2$$

As a result, the initial writing and writing addresses in an enlarging and reducing addresses are determined as shown in FIG. 26.

The examples for setting initial writing and reading addresses, in the case where an image is processed based on the center line, have been thus described.

Next, the example method for controlling an initial writing or reading address, which is necessary to read the image data only for a designated area and record an enlarged or reduced image in a designated recording position, is described, below.

FIG. 27 explains a position designation for recording an image. For the convenience of explanation, the figure describes an image enlarging operation. However, of course the figure can be also used for describing an image reducing operation.

Firstly, it is assumed that the image area being read is marked by n1 and the recording area for enlarged or reduced image is marked by N1. The coordinates on diagonal lines in the image area n1–n4 are (x1, y1) and (x2, y2). Similarly, the smallest coordinate among those located on the diagonal lines in the image recording area N1 is designated (x3, y3). Also, the sizes of data and the numbers of lines, respectively in the main scanning (horizontal scanning) and sub-scanning (vertical scanning) directions, from the base point (one corner of an original draft 52, and is a coordinate (x, y)=(0, 0)) of an image reading area or an image recording area, are I0 and I1, and L0 and L1.

When the image area n1 is designated, the data being inputted are controlled by the timing signal generating circuit 10 in such a manner as a switching circuit 25 in FIG. 7 and FIG. 46 sets the data, other than those in an designated area, at "0" level (white information).

Figure 27A:
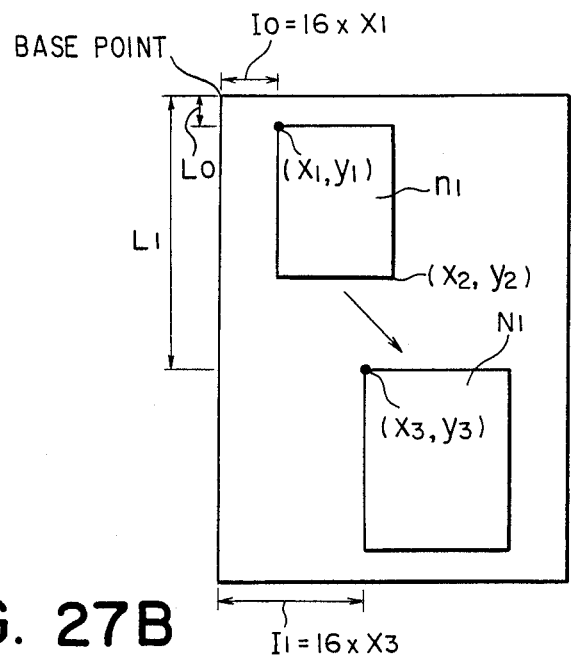
FIGS. 27A-27D are an explanatory drawing illustrating the designation of recording position.
Figure 27B:
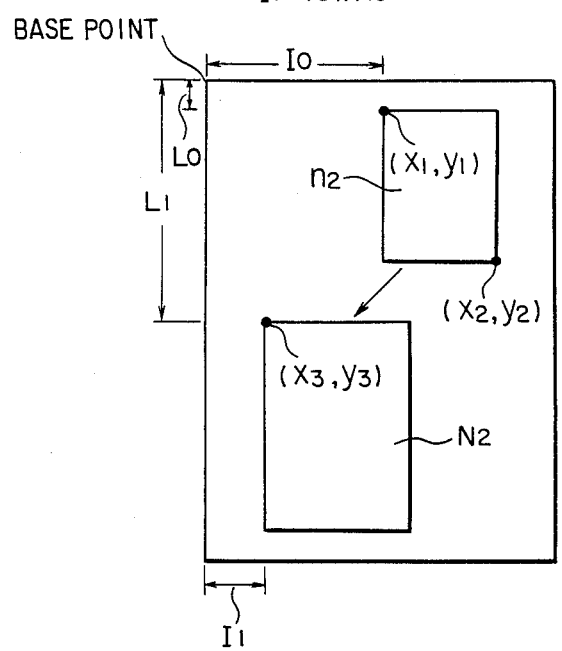
Figure 27C:
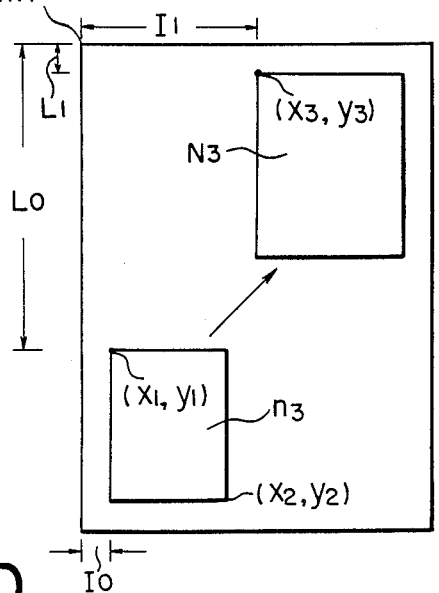
Figure 27D:
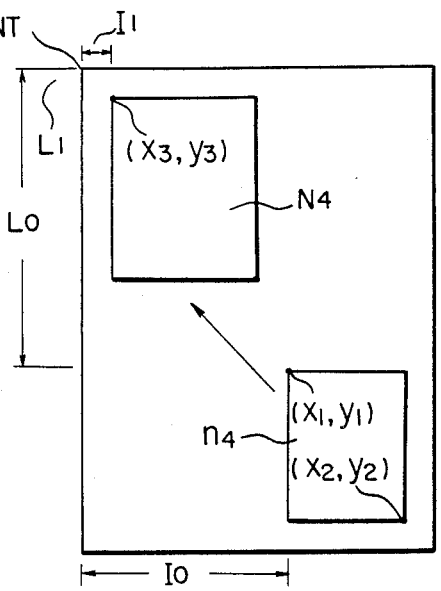

In FIGS. 27A and 27C, I1>I0. In FIGS. 27B and 27D, I1<I0.

Firstly, the cases where I1>I0 are described.

If a recording density is, as mentioned above, 16 dots/mm, I0 and I1 are respectively;

$$I0 = 16 \times x1$$

$$I1 = 16 \times x3$$

whereby, when assuming a designated magnification is m, the image data I0 increases to m·I0 (m×I0). At the same time, I1 is the same as in the expression, above, the correlation between I0 and I1 is illustrated as shown in FIG. 28.

When the image area n1 is recorded, the data I0 are, as mentioned previously, "0"-level data (white information). Additionally, the data I1 in the recording area N1 are "0"-level data, which does not cause recording.

Figure 28:
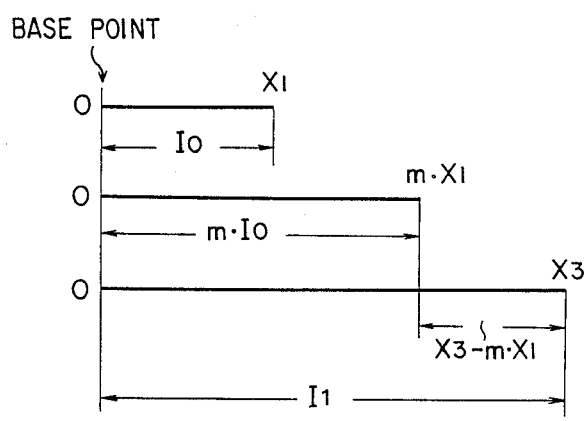
FIGS. 28 through 31 are diagrams illustrating this function.

In the example of FIG. 28, I1>m·I0. In this case, if the enlarged image data are written into a line memory and read out unchanged, the enlarged image data m·(x2−x1) corresponding to the proper image area n1 are recorded before the initial horizontal recording point x3 is reached, resulting in the image recording out of the designated initial recording point.

To prevent this, it is necessary to regulate the initial point to write the enlarged image data into the line memory. In other words, in such an improper recording, above, the amount of deviation of initial recording point is the difference between I1 and m·I0, accordingly, the enlarged image data should be written into the line memory from the point A0 which has incorporated the deviation.

Figure 29:
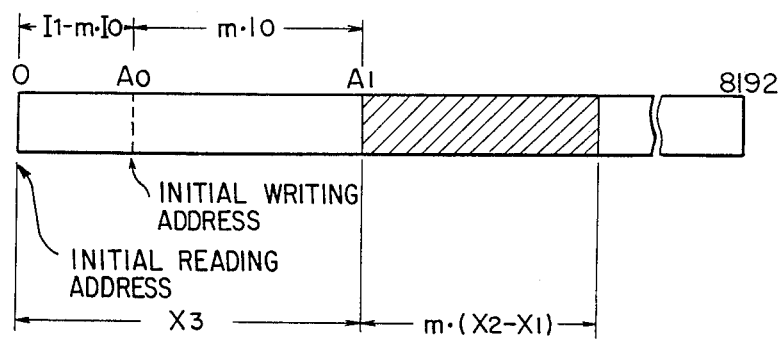

This arrangement makes the address A1, where the designated image data are written, to be as shown in FIG. 29. The data size up to the address A1 is equivalent to I1, which means the data size corresponds to the horizontal coordinate x3 in the recording coordinate system.

Accordingly, if I1>I0, and if I1>m·I0, the writing of enlarged image data starts at the address, below;

$$A0 = I1 - m \cdot I0$$

and, the reading of enlarged image data starts at the "0"th address. As described later, using a period other than an enlarging or reducing process, the line memory is cleared by "0" data (white information). Accordingly "0" data are written from the address 0 to address A0.

Figure 30:
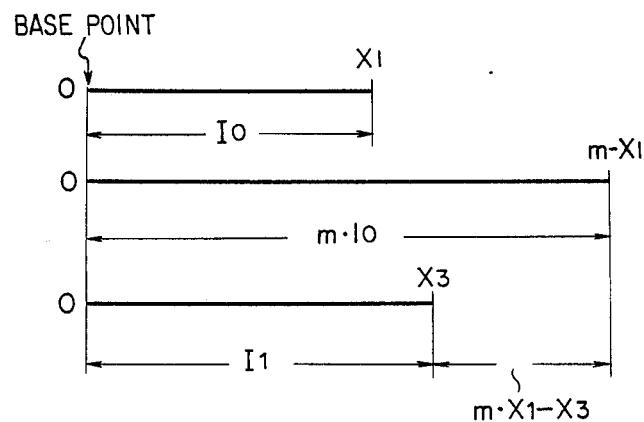
Figure 31:
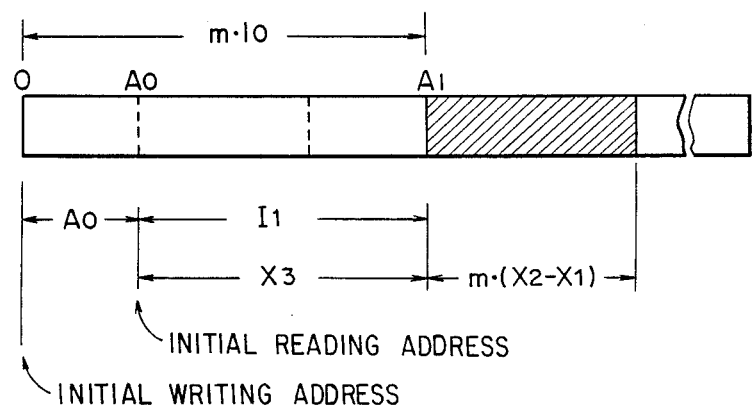

If I1<I0, and if m·I0>I1, the writing of enlarged image data starts, as shown in FIGS. 30 and 31, at the address 0. In contrast, the reading of image data starts at the address, below;

$$A0 = m \cdot I0 - I1$$

This arrangement enables the image to be recorded correctly from the designated horizontal coordinate X3, even if m·I0>I1.

By designating the initial writing or initial reading address for the line memory, above, the horizontal shifting of image recording position is made possible.

The vertical shifting of image recording position can be achieved by controlling the operation timing; for example, to quicken the start of reading for the image reader 50, or the start of writing for the output device 65.

To summarize this:

If L1>L0, the output device 65 is started earlier than normal by the period T0;

$$T0 = (L1 \cdot m - L0) \times \text{main scanning time}$$

wherein a main scanning time means the duration necessary to scan one vertical line.

If L1>L0, the image reader 50 is started earlier than normal by the period T0;

$$T0 = (m \cdot L0 - L1) \times \text{main scanning time}$$

By selecting both the operation timing and the above-mentioned initial writing and reading addresses, an enlarged or reduced image N1, N2 can be correctly recorded in the predetermined recording position (x3, Y3).

As address designation data, those stored in a ROM table or the like provided in the system control circuit 80 can be used.

FIG. 27 illustrates one example of an image enlarging operation. However, it goes without mentioning that the above description for operation can be also applicable not only to an equal magnification operation (m=1.0) where an image is recorded only by moving a recording position, but to a reducing operation where an image is recorded after incorporating reduction (m<1.0).

FIG. 32 is a block diagram illustrating one example for achieving the above-mentioned image recording operation which records an image based on the center line or the designated recording position.

FIG. 32 illustrates one example of an output buffer circuit 90.

The output buffer circuit 90 has a pair of line memories 100 and 101 each of which accept image, line by line. The pair of line memories 100 and 101 are provided in order to enable writing or reading image data on the real time bases, by alternately supplying the image data on a line-by-line basis. The line memories 100 and 101 independently having 8192-bit data capacity are used, as mentioned previously.

In an image recording operation based on the center line, the writing-into and reading-out of line memories 100 and 101 are controlled in the manner, below.

Firstly, in data writing into the line memories, the writing clock signals generated by an image processing circuit 2 are used. In the reading from the line memories, the reading clock signals for an output device 65 are used. Accordingly, these clock signals are supplied into address counters 104 and 105 respectively via first and second switches 102 and 103 for selecting clock signals.

Figure 33:
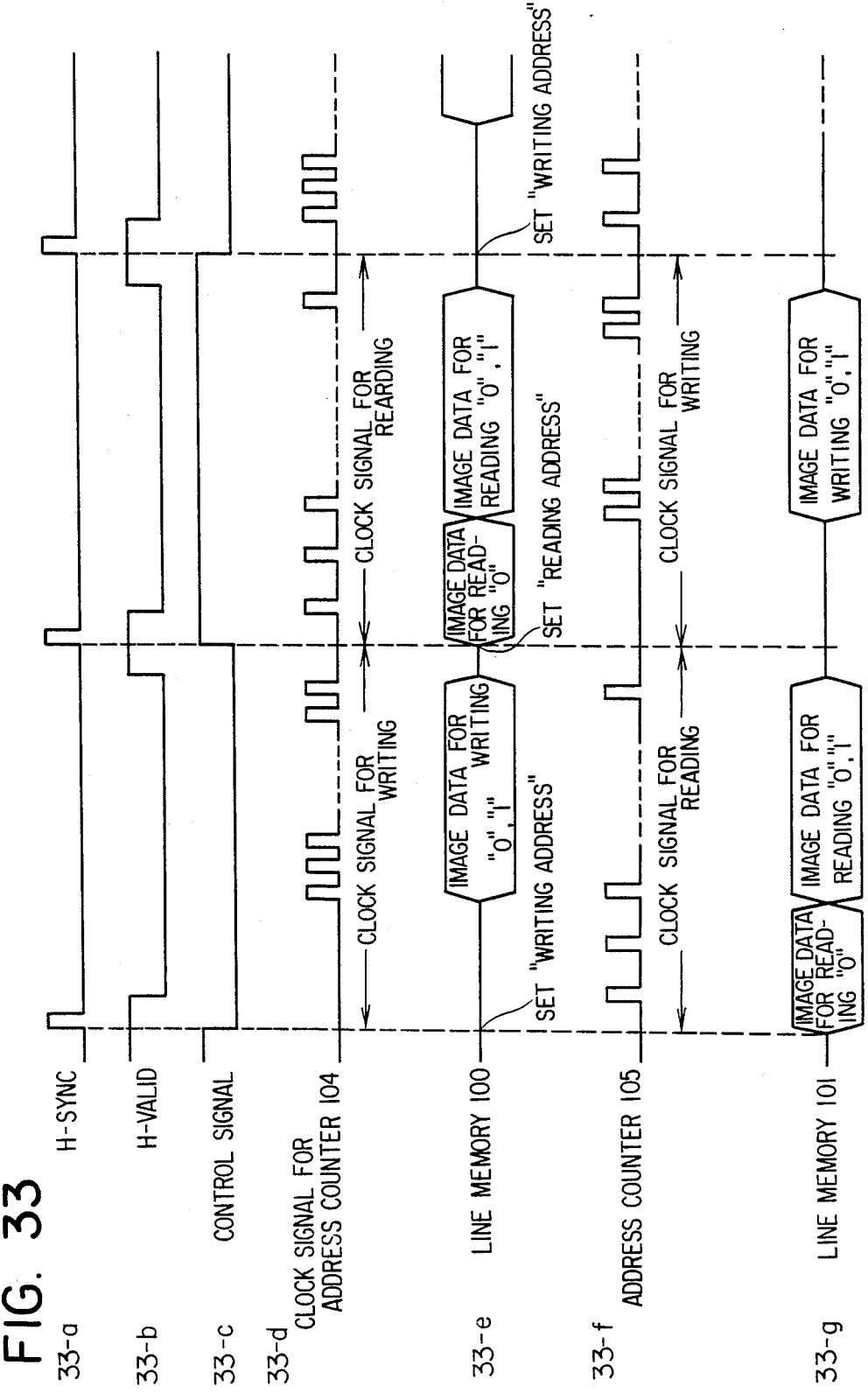
FIG. 33 is a waveform diagram describing the operation of this circuit.

The first and second switches 102 and 103 are complimentarily controlled so that one line memory is in reading mode when the other is in writing mode. For controlling the switches in this manner, the horizontal synchronizing control signals (FIG. 33-c) outputted from a control circuit 107 are used.

Into the address counters 104 and 105, each address data to determine the initial writing and reading address for the line memories 100 and 101 are supplied respectively via the third and fourth switches 108 and 109.

The third and fourth switches 108 and 109 are also complimentarily controlled so that one address counter is in writing mode when the other counter is in reading mode. Additionally, the horizontal synchronizing control signals shown in FIG. 33-c are supplied into these switches 108 and 109.

The initial writing or initial reading address is preset, synchronously with the horizontal synchronizing signals (FIG. 33-a), to the address counter 104 or 105. The above-mentioned initial writing or writing address signals generated by a CPU 80 is supplied into the switches 108 and 109 via a corresponding I/O port 130 or 131.

One of the outputs from the line memories 100 and 101 is selected by the fifth switch 10, and supplied into the above-mentioned output device 65 or an image memory 64. The fifth switch 110 is for selecting the image data in reading mode. Accordingly, signals being 180 degrees out-of-phase to the control signals in FIG. 33-c are used for this switch.

The switch 160 is provided in the data supply line of a pair of line memories 100 and 101, and differentiates the original image data from the "0" data (corresponding to white information). The latter are the data for clearing the line memories 100 and 101, and selected when the original draft is not being read.

In a mode where the recording position is designated, the coordinate (x3, y3) designating the recording position and a designated magnification m are, in addition to the coordinate data (x1, y1) and (x2, y2) indicating the image reading area, entered with the operation/display part 75.

These data entries may be, as mentioned above, directly keyed in by an operator. Or, an arrangement may be provided in order to directly instruct the CPU about the position of an original draft 52 being placed on a pointing device such as a tablet and have it to read the coordinates of position.

Even when the entries are made with a keyboard, an original draft 52 may be inserted into a clear holder having vertical and horizontal ruled lines, in order to designate every coordinate. The use of such a clear holder can expedite the reading of coordinates.

Based on the above-mentioned data entries, addresses are calculated (instead, a ROM table storing addresses may be used), and the initial writing and reading addresses for the line memories 100 and 101 are selected, as specified. Simultaneously, the speed control data are calculated, which are supplied into an actuating motor provided in the image reader 50. This in turn controls the reader 50 to operate at a reading speed corresponding to a designated magnification, and allows the image reading start signal to be supplied into the reader 50.

The recording start signals corresponding to the designated magnification and recording position are also supplied into the output device 65.

As mentioned above, the invention was applied to an image processing system which reads an image based on the center line of original draft and records the image based on the center line of recording paper. However, the invention can be applied to still other image processing systems.

Firstly, if an image processing system is of a type which reads and records an image based on one side of an original draft (recording paper), the initial image reading position of CCDs 56 and 56' is identical to that of the initial image recording position (in the case of a laser printer, the initial position of emitting a laser beam for recording), consequently the invention is applicable without any disadvantages.

Secondly, if an image processing system is of a type which reads an image based on the center line of an original draft and records the image based on one side of a recording paper, the initial writing and reading addresses for an output buffer circuit 90 are as follows.

In this case, the initial writing address for line memories 100 and 101 is always 0th address. In contrast, the initial reading address cannot be determined solely based on magnification signals. It varies according to the size of an original draft.

Consequently, in such a type of image processing system the initial reading address is determined based on the signals indicating the size of original draft, as well as a magnification.

Figure 34:
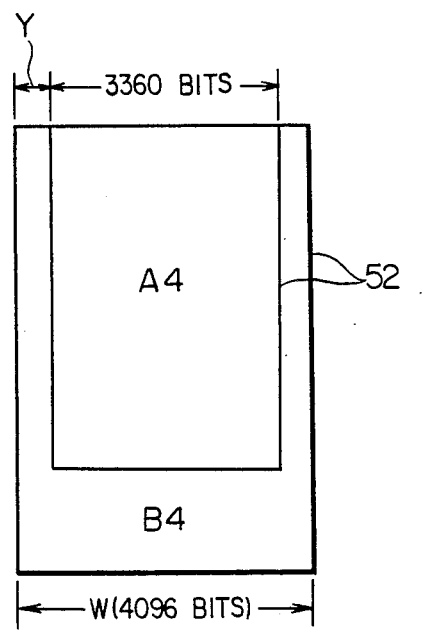
FIGS. 34 and 36 are diagrams independently illustrating an other example of image reading or image recording.

An example where an original draft 52 being read is A4-sized, as shown in FIG. 34, is described below.

As mentioned previously, if the recording density is 16 dots/mm, the bit number of a A4-sized paper in horizontal direction is as follows;

$$210 \text{ mm} \times 16 \text{ dots/mm} = 3360 \text{ bits}$$

and, if the maximum draft reading size is B4, the initial reading address for the line memories can be determined by multiplying the width Y, in FIG. 34, by magnification times.

Accordingly, the initial reading address in an equal magnification operation is as follows:

$$(4096 - 3360)/2 = 368\text{th bit}$$

The values of initial writing and reading addresses at arbitrary magnifications are listed in FIG. 35. In this case, the original draft is A4-sized.

Figure 36:
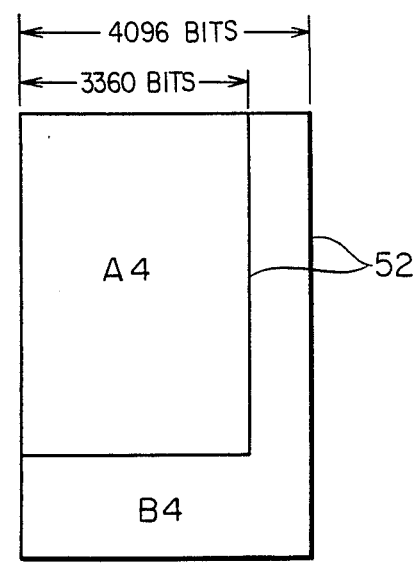

Thirdly, if an image processing system is of a type which reads an image based on one side of an original draft, as shown in FIG. 36, and records the image based on the center line l of a recording paper, the initial writing and reading addresses for the output buffer circuit 90 are determined as follows.

In this case, the initial writing address is determined based on the maximum bit number (3360 bits) of an A4-sized paper and the maximum bit number (4096 bits) of an B4-sized paper. That is;

Initial writing
address = (4096 − 3360 × magnification)/2

Additionally, the initial reading address, in this case, is the "0"th address.

If the initial writing address is a negative value (in an enlarging operation), this value is the initial reading address. Accordingly, the initial writing address, in this case, is the "0"th address.

The values of initial writing and reading addresses corresponding to arbitrary magnifications are shown in FIG. 37.

In this way, the initial writing and reading addresses can be varied in accordance with the base position for reading an original draft or for recording. Also, the initial writing address for the line memories 100 and 101 may be varied in accordance with the size of a recording paper.

In an above-mentioned embodiment, the invention was applied to a simple color photocopier, however, it goes without saying that, if applied to a multi-color copying machine being capable of recording a color image in diverse colors, the invention accordingly enables more colors to be designated.

In the above embodiment, the frequency of synchronizing clock signal CLK2 generated by the timing signal generating circuit 10 is set double that of the reference synchronizing clock signal, under the condition where an enlarging/reducing magnification is selected from 128/64 to 33/64 in 1/64 increments. However, the frequency of the former depends on a maximum magnification.

For example if a maximum magnification is 3.0, the frequency of synchronizing clock signal CLK2 is set triple that of the reference synchronizing clock signals. Accordingly, the frequency of synchronizing clock signal is changed in accordance with a maximum magnification adopted.

For the memories 13 and 16, RAMs may substitute ROMs. Additionally, an arithmetic circuit may be used as the memory 13.

The information on designated recording information is set in accordance with the information on a magnification and reading position. The information for designating recording position is used as data for controlling the initial writing and reading addresses of an output buffer circuit.

Controlling the initial writing or reading address in turn controlls the initial image-recording point on a recording paper. This enables an enlarged or reduced image to be recorded in the position externally designated.

Additionally, by automatically changing the initial writing or reading address in correspondence to an enlarging/reducing magnification, the size of recording paper and the like, instead of starting writing or reading image at the first address of output buffer circuit, the possibility of an image being recorded from one corner of a recording paper in an image reducing operation can be excluded. Especially, an image processing system recording an image based on the center line can correctly record a reduced image regardless of the size of a recording paper.

In an enlarging operation, the blank area is not enlarged, since the data before and after the enlarged image data are not used as the image data for recording. Accordingly, the image area is correctly recorded as required.

As described above, in an ordinary color recording mode, according to the invention, naturally, a color image corresponding to an original color draft 52 can be recorded, and when color-designated recording mode is selected, the draft can be recorded in a color designated by an operator.

Accordingly, the image recording in a specific color, as required, can provide a color image processing system featuring wide range of application.

Additionally, as the output buffer circuit 90 and others are controlled in correspondence to a designated magnification, designated recording area, and the like, an enlarged or reduced image can be recorded in an arbitrarily designated position. Accordingly, such an image processing system has the following advantages; a region of image an operator needs can be recorded in a required position of a recording paper, in a required size, and in a required color.

Needless to say, according to the invention, as the initial writing and reading addresses for line memories are controlled in accordance with a magnification, an enlarging or reducing operation can be carried out as effectively as an operation based on the center line of reading side, and, simultaneously, the recording is made based on the center line of a recording paper.

As a result, such an image processing system has the following advantages; there is no possibilities of an reduced image being recorded to one side of a recording paper and an image being recorded out of the transfer area of a recording paper, and even in an image enlarging operation, an image can be correctly recorded, as required, because a blank area is never enlarged.

Furthermore, according to the invention, as the interpolation data are generated by referring to the data tables, the image processing system have advantages worth mentioning: an image better in quality than obtainable from conventional methods; the high-speed processing is possible; and the like.

According to the invention, the interpolation data for an enlarging or reducing operation are generated by using interpolation tables. Consequently, this arrangement does not need the provision for an exposure control circuit and a variable oscillator, both being found on a conventional system, for controlling the exposure and the transfer clock signals. This in turn simplifies the system constitution. Naturally, the use of interpolation data prevents the quality deterioration of a recorded image.

Additionally, if the data selection signals SD are used, the similar signals SD written in the interpolation-data selection-signal writing circuit 310 having a large capacity are, as required, transferred to the interpolation data selection memory 320 and read out at a high-speed. Accordingly, a data ROM 311 can be also used as a ROM for storing the control program of the system control circuit 80. This simplifies the circuitry of the ROM and greatly reduces a cost.

According to the invention, an image processing such as enlarging or reducing is effected prior to multiple-value coding. This eliminates the deterioration of image quality at a specific magnification.

Furthermore, the color separation is carried out prior to the enlarging or reducing. This enables the correct color separation, regardless of an enlarging or reducing magnification. Therefore, it is not necessary to modify the color separation properties and the like in accordance with the magnification. Also, the color separation properties do not deteriorate, even if the color separation is effected using a single color separation map regardless of a magnification.

In addition, as the threshold value data for multiple-value coding are selected in correspondence to the density of an original draft 52, the image can be recorded in an optimum density.

What is claimed is:

1. An apparatus for processing plural image data obtained by photoelectric conversion of an original image, comprising:

memory means for storing a plurality of interpolation tables capable of producing interpolation data in accordance with a magnification operation of enlarging or reducing, each of which interpolation tables comprises interpolation data related to, respectively, sets of adjacent ones of said plural image data, wherein said plurality of interpolation tables differ relative to each other as to at least some of the interpolation data therein; and table selection means for selecting one of the plurality of interpolation tables in accordance with the nature of the original image;

whereby an original image having the nature of a line drawing causes a different interpolation table to be selected by the table selection means than does an original image having the nature of a photograph.

2. An apparatus for processing plural image data obtained by photoelectric conversion of an original image, comprising:

interpolating means for producing, from an interpolation table, interpolation data related to, respectively, sets of adjacent ones of said plural image data;

interpolation selecting means for outputting a selection signal to said interpolating means to select interpolation data in accordance with a magnification operation of enlarging or reducing;

said interpolation selecting means comprising;

(a) selection data-writing means for storing a plurality of selection signal tables each of which includes data based on a different magnification, and capable of outputting at least part of one of said selection signal tables in response to a designated magnification; and (b) selection signal memory means for storing said at least part of one of said selection signal tables in response to a designated magnification and thus replacing a previously stored such table;

wherein said interpolating means receives an output of the selection signal memory means and produces interpolation data in accordance with the selection signal.

3. The image processing apparatus of claim 2, wherein said selection data-writing means comprises a ROM (Read Only Memory) for storing in advance the selection signal tables.

4. The image processing apparatus of claim 3, wherein said selection signal memory means is a RAM (Random Access Memory) for storing the at least part of a selection table.

5. The image processing apparatus of claim 4, wherein said ROM is a ROM used in a microcomputer which constitutes a system control circuit for controlling said image processing apparatus.

6. The image processing apparatus of claim 2, wherein said interpolating means comprises a plurality of interpolation tables which differ from each other in terms of characteristics for producing the interpolation data between plural image data.

7. The image processing apparatus of claim 2, wherein said image processing apparatus further comprises an image reading means for reading an image data by a photoelectric conversion from an original image, an image recording means for recording the processed image data on a recording medium with a magnification operation of enlarging or reducing, and a position designating means for designating a reading area of the original image to be read and for designating a recording area of the recording medium.

8. The image processing apparatus of claim 7, wherein said image processing apparatus comprises a buffer circuit for storing the processed image data.

9. The image processing apparatus of claim 8, wherein said image processing apparatus comprises a control means for controlling a writing address and reading address of said buffer circuit in accordance with a magnification operation of enlarging or reducing.

10. The image processing apparatus of claim 9, wherein said control means controls the writing address and reading address of said buffer circuit in accordance with the designated recording area as well as the magnification operation of enlarging or reducing.

11. An apparatus for processing color image data obtained for a plurality of original image pixels in accordance with a designated magnification of enlarging or reducing, comprising:

image reading means for separating light from said original image into a set of plural color component images, and for photoelectrically converting the set of plural color component images into a set of plural color component signals for each pixel;

a first memory means for storing a first look-up table containing a plurality of density data associated, respectively, with a plurality of preselected colors;

means for addressing said first memory means with said set of plural color component signals to retrieve from said first look-up table density data associated therewith, respectively;

second memory means for storing a second look-up table containing a plurality of interpolation data for interpolating density data corresponding to a plurality of adjacent pixels, said plurality of interpolation data having different values varying for each respective; density data; and interpolation selection means for providing to said second memory means a selection signal corresponding to a designated magnification for retrieving from the second look-up table interpolation data related to a set of inputted density data and the designated magnification.

* * * * *